(12) United States Patent
Mackro

(10) Patent No.: US 11,480,203 B2
(45) Date of Patent: Oct. 25, 2022

(54) LATCHING DEVICE

(71) Applicant: PAKAYAK LLC, Higganum, CT (US)

(72) Inventor: Douglas V. Mackro, Higganum, CT (US)

(73) Assignee: PAKAYAK LLC, Higganum, CT (US)

( * ) Notice: Subject to any disclaimer, the term of this patent is extended or adjusted under 35 U.S.C. 154(b) by 84 days.

(21) Appl. No.: 17/089,823

(22) Filed: Nov. 5, 2020

(65) Prior Publication Data

US 2021/0053655 A1 Feb. 25, 2021

Related U.S. Application Data

(60) Continuation of application No. 16/374,012, filed on Apr. 3, 2019, now Pat. No. 10,829,183, which is a
(Continued)

(51) Int. Cl.
| | | |
|---|---|---|
| *F16B 2/18* | (2006.01) | |
| *F16B 2/08* | (2006.01) | |
| *B63B 34/23* | (2020.01) | |

(52) U.S. Cl.
CPC ............... *F16B 2/18* (2013.01); *B63B 34/23* (2020.02); *F16B 2/08* (2013.01)

(58) Field of Classification Search
CPC ..... B63B 7/04; B63B 35/71; B63B 2007/006; F16B 2/18; F16B 2/08; Y10T 292/087;
(Continued)

(56) References Cited

U.S. PATENT DOCUMENTS

| | | | |
|---|---|---|---|
| 1,578,472 | A | 3/1926 | Sawyer |
| 1,916,093 | A | 6/1933 | Cormier |

(Continued)

FOREIGN PATENT DOCUMENTS

| | | |
|---|---|---|
| CA | 2056083 A1 | 5/1993 |
| DE | 4033883 | 4/1992 |

(Continued)

OTHER PUBLICATIONS

"3D printed scale model" Pakayak.com, posted Jul. 12, 2015 (online), (site visited Jan. 5, 2018) Available from Internet <URL:https://pakayak.com/3d-printed-scale-model/>.
(Continued)

*Primary Examiner* — Anthony D Wiest

(74) *Attorney, Agent, or Firm* — Ware, Fressola, Maguire & Barber LLP

(57) ABSTRACT

A watercraft includes a plurality of separable body sections (2101, 2102, 2103, 2104, 2105, 2106) configured for assembly into a single assembled structure (2100) having a first length, and for packing into a packed structure (3000) having a second length smaller than the first length. The single assembled structure may be held together using latching devices, one or more of the latching devices including a latch unit comprising a latch support, a spring mount and a band spring, the band spring having a first spring end and a second spring end, wherein the latch support includes a latch and a first shaft positioned in relationship to the latch, the first shaft configured for rotatably mounting the first spring end of the band spring, and the spring mount includes a second shaft configured for rotatably mounting the second spring end of the band spring.

11 Claims, 46 Drawing Sheets

Related U.S. Application Data division of application No. 15/803,058, filed on Nov. 3, 2017, now Pat. No. 10,293,888, which is a continuation-in-part of application No. 29/585,129, filed on Nov. 21, 2016, now abandoned, and a continuation-in-part of application No. PCT/US2015/030557, filed on May 13, 2015.

(60) Provisional application No. 62/424,432, filed on Nov. 19, 2016.

(58) Field of Classification Search
CPC ......... Y10T 292/0871; Y10T 292/0874; Y10T 292/0875; Y10T 292/0911; Y10T 292/0918; Y10T 292/0951; Y10T 292/0957; Y10T 292/0959; Y10T 292/1049; Y10T 292/1083; Y10T 292/1091; Y10T 292/1092; Y10T 292/20; Y10T 292/202; Y10T 292/225; E05C 19/10; E05C 19/12; E05C 19/14
See application file for complete search history.

(56) References Cited

U.S. PATENT DOCUMENTS

| | | | |
|---|---|---|---|
| 2,040,373 | A | 5/1936 | Green |
| 2,443,768 | A | 6/1948 | House |
| 2,650,376 | A | 9/1953 | Sommer |
| 2,666,933 | A | 1/1954 | Engensperger |
| 2,741,782 | A | 4/1956 | Muller |
| 2,919,451 | A | 1/1960 | Long |
| 2,977,607 | A | 4/1961 | Roblee |
| 3,370,864 | A | 2/1968 | Burgoon |
| 3,744,071 | A | 7/1973 | Bossler, Jr. |
| 3,996,635 | A | 12/1976 | Wilkes et al. |
| 4,052,761 | A | 10/1977 | Rilling |
| 4,164,804 | A | 8/1979 | Fletcher |
| 4,800,832 | A | 1/1989 | Sulimierski |
| 5,261,346 | A | 11/1993 | Updyke |
| 5,868,097 | A | 2/1999 | Spickelmire |
| 6,006,691 | A | 12/1999 | Wilce |
| 7,854,211 | B2 | 12/2010 | Rixford |
| D634,255 | S | 3/2011 | Farber |
| D634,256 | S | 3/2011 | Farber |
| 8,316,788 | B2 | 11/2012 | Willis |
| 8,905,802 | B2 | 12/2014 | Ramelot et al. |
| 9,392,861 | B2 | 7/2016 | Maybin |
| 9,422,029 | B1 | 8/2016 | Niemier et al. |
| 9,708,041 | B2 | 7/2017 | Ohman et al. |
| 2008/0121166 | A1 | 5/2008 | Varon et al. |
| 2009/0178256 | A1 | 7/2009 | Toth |
| 2010/0024710 | A1 | 2/2010 | Malone |
| 2011/0140415 | A1* | 6/2011 | Flynn ............... F16L 23/06 285/320 |
| 2015/0367914 | A1 | 12/2015 | McDonough et al. |
| 2016/0176479 | A1 | 6/2016 | Iridoy et al. |

FOREIGN PATENT DOCUMENTS

| | | |
|---|---|---|
| DE | 10 2012 102 545 A1 | 9/2012 |
| FR | 729245 A | 7/1932 |
| GB | 735271 A | 9/1953 |
| KR | 20120018907 A | 3/2012 |
| KR | 20-2013-0007396 U | 12/2013 |

OTHER PUBLICATIONS

"Higganum Inventor Says: Pakayak! by Tanya Buzzi Moriarty" Haddam Bulletin—Sep. 2015 (online), (site visited Jan. 5, 2018) Available from Internet: <URL:https://pakayak.com/wp-content/uploads/2015/10/Haddam-Bulletin-Article-9-15.pdf>.

"Pakayak, a nesting kayak, is well engineered" By Tyler Cornell, Points East Sep. 2015 Issue, p. 86 (online), (site visited Jan. 5, 2018) Available from Internet: <URL: https://www.pointseast.com/points-east-archives-2015/>.

Notification of Transmittal of Form PCT/ISA/220 comprising the International Search Report (ISR) and the Written Opinion (1 page), Form PCT/ISA/210 comprising the ISR (2 pages), and Form PCT/ISA/237 comprising the Written Opinion of the International Search Authority (4 pages), for International Application No. PCT/US17/59889, dated Jan. 30, 2018, 7 pages total.

Notice of References Cited, co-pending U.S. Appl. No. 29/585,129, 2 pages.

"Pakayak Kickstarter Video" (Pakayak) Jun. 16, 2016 (Jun. 16, 2016) entire document, especially video 2:00-2:10, <URL:https://www.youtube.com/watch?v=Bc7Z5yqH_t8>, 1 page.

Machine translation of the description in DE 10 2012 102 545 A1, 10 pages.

Bibliographic Data (including English abstract) of DE 10 2012 102 545 A1, 2 pages.

Extended European Search Report dated Dec. 13, 2018, for PCT Regional Phase application EP 15 89 2026 of International Application No. PCT/US2015/030557, 9 pages.

\* cited by examiner

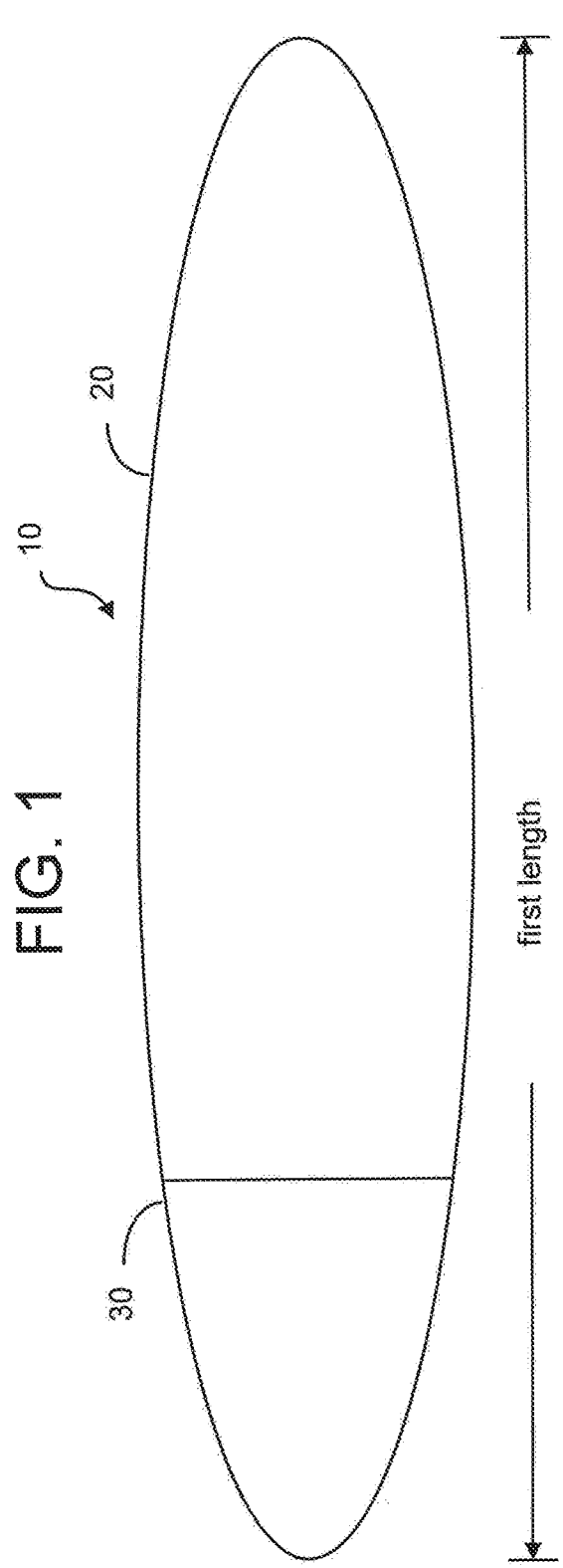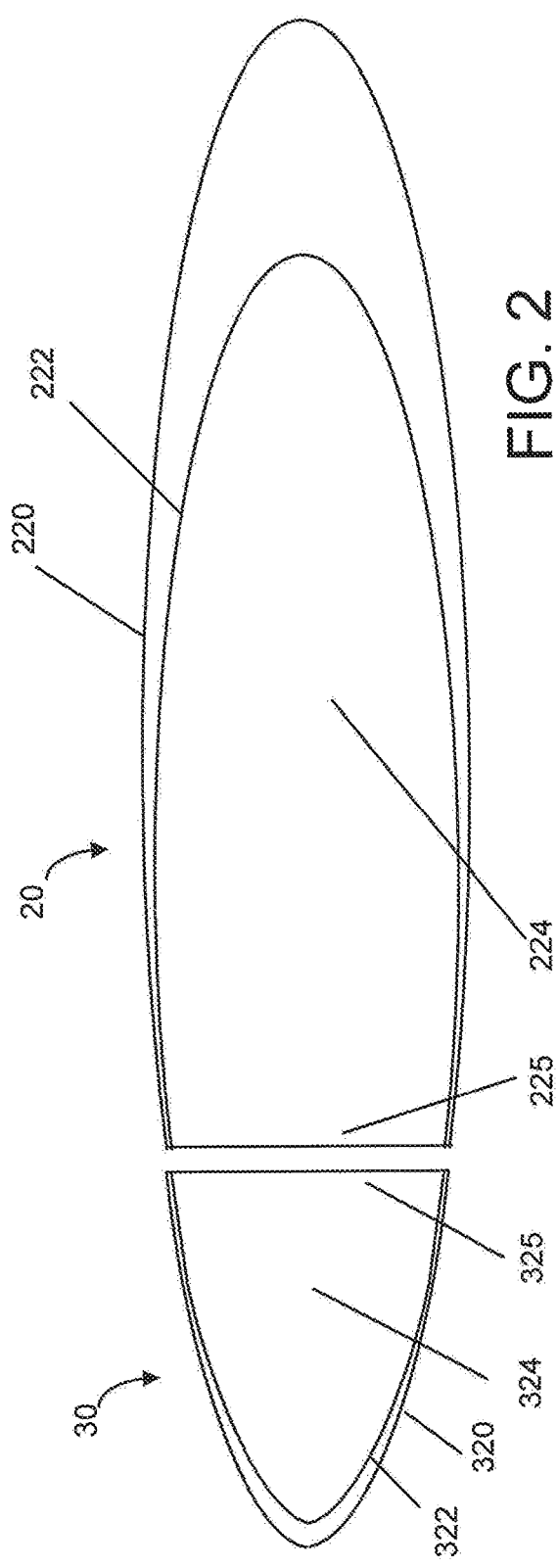

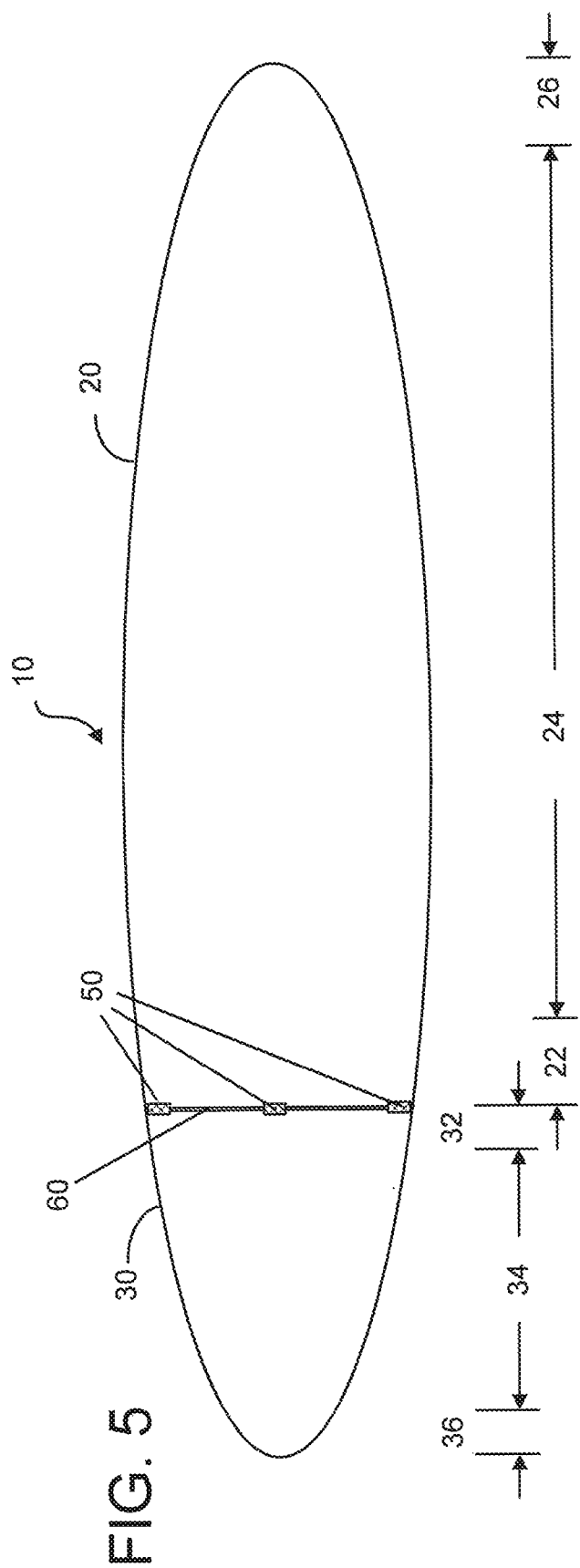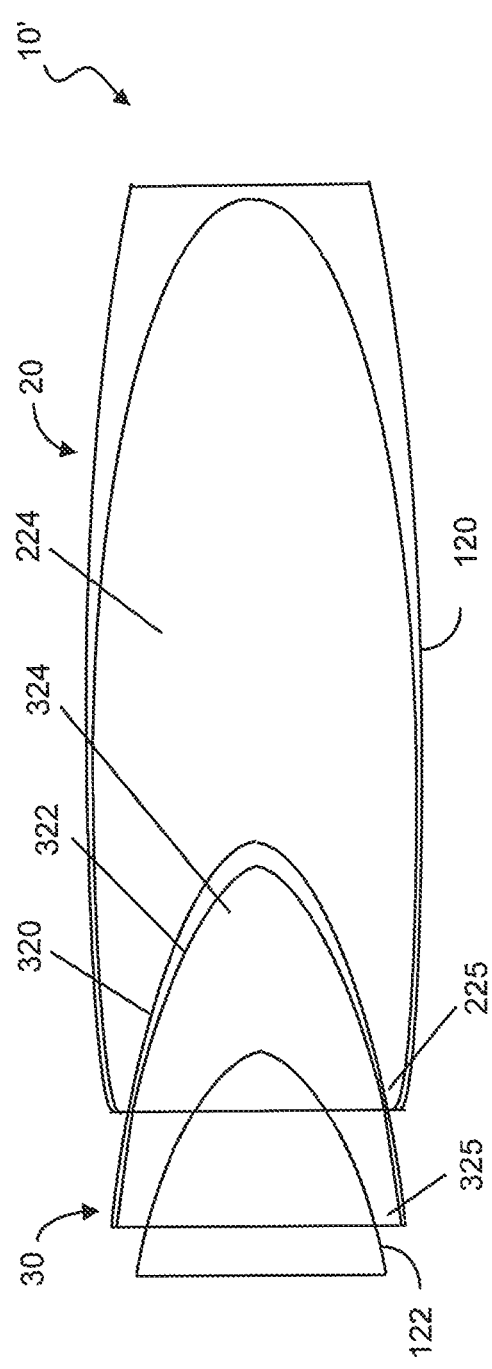

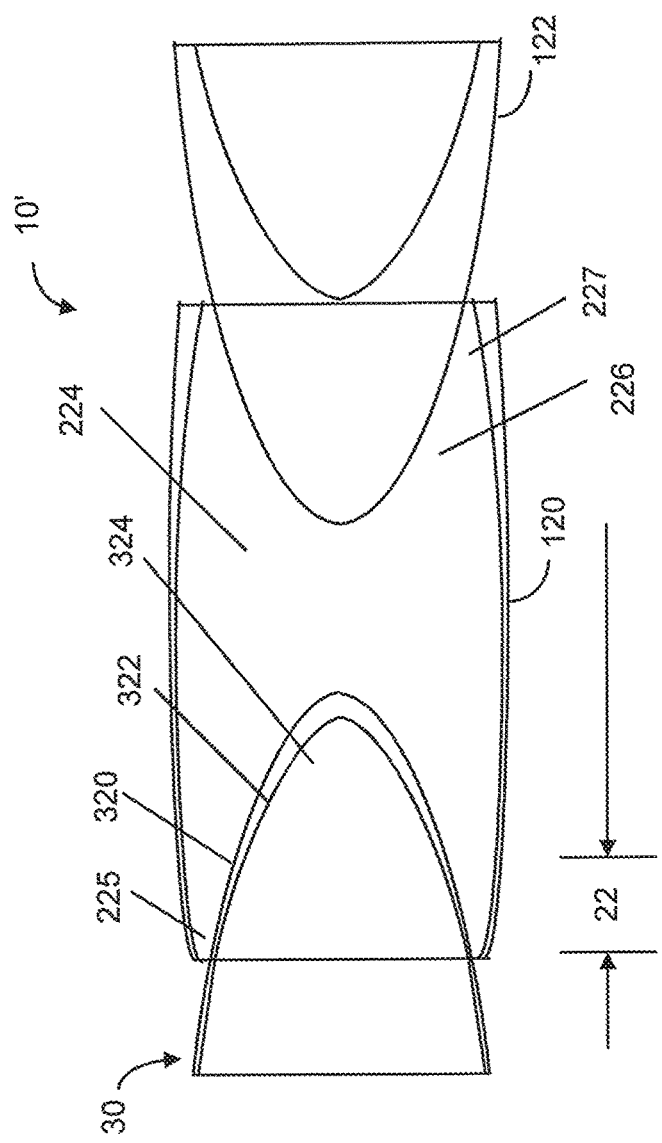

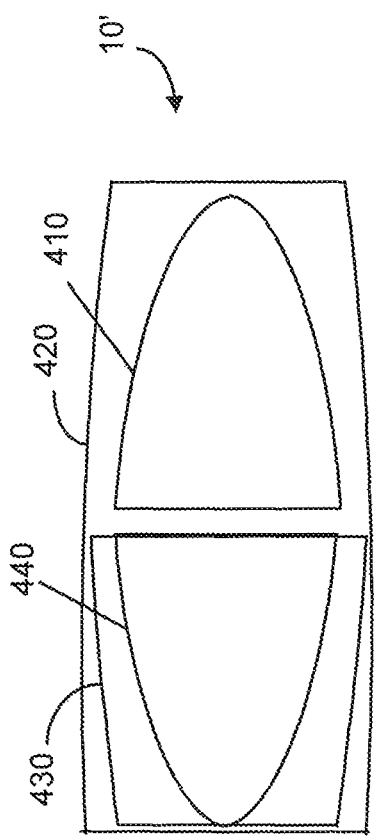
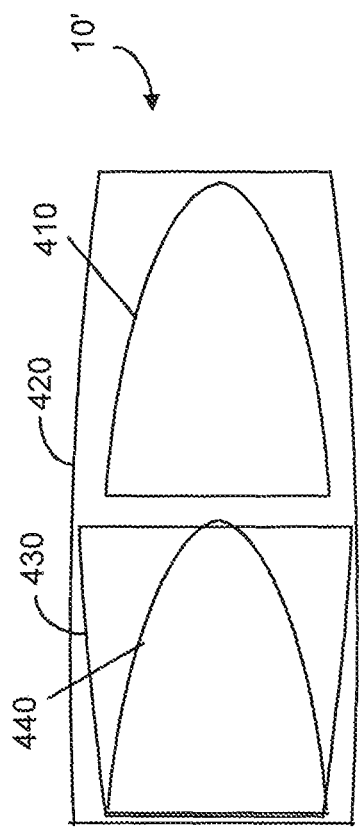
FIG. 10a
FIG. 10b

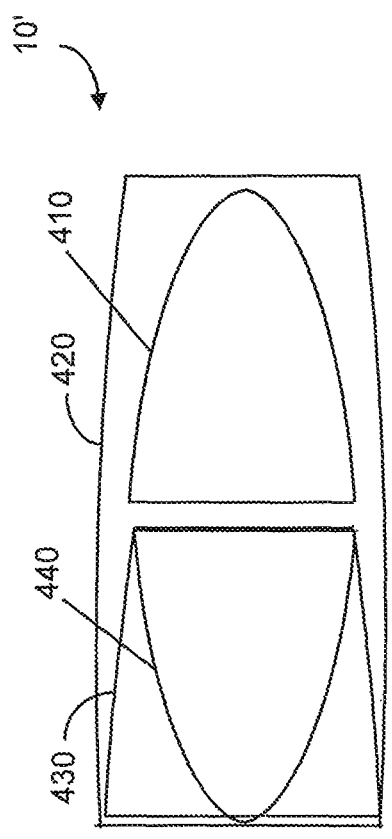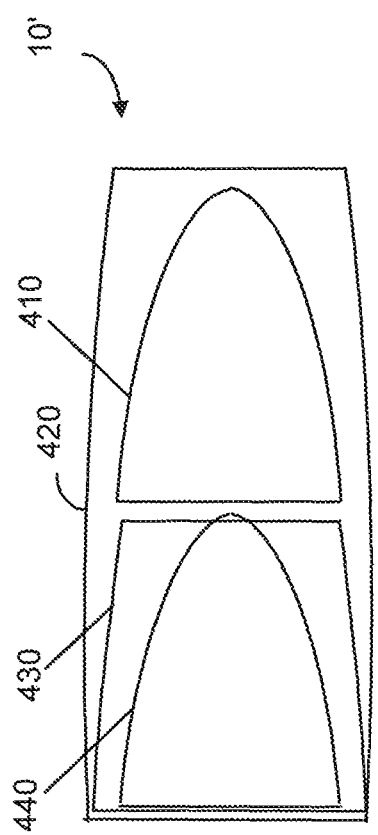

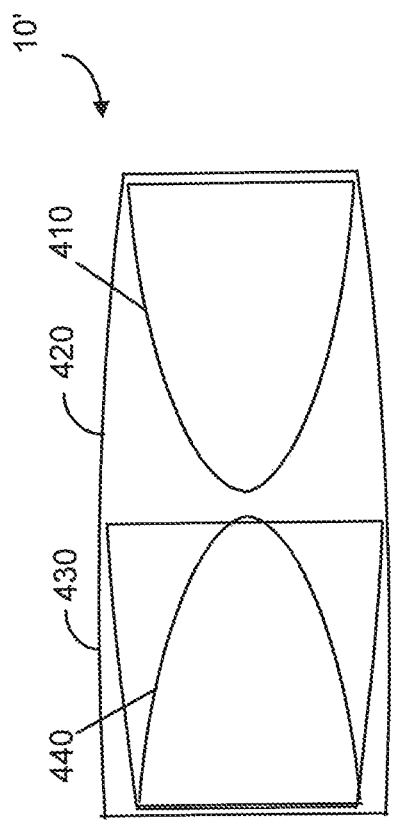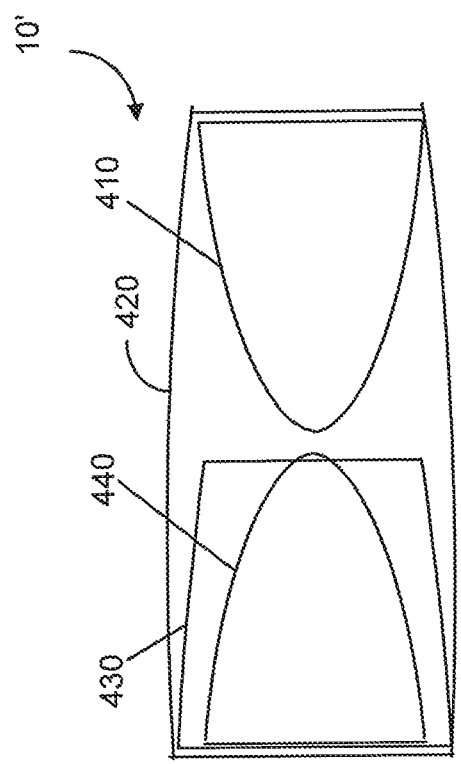

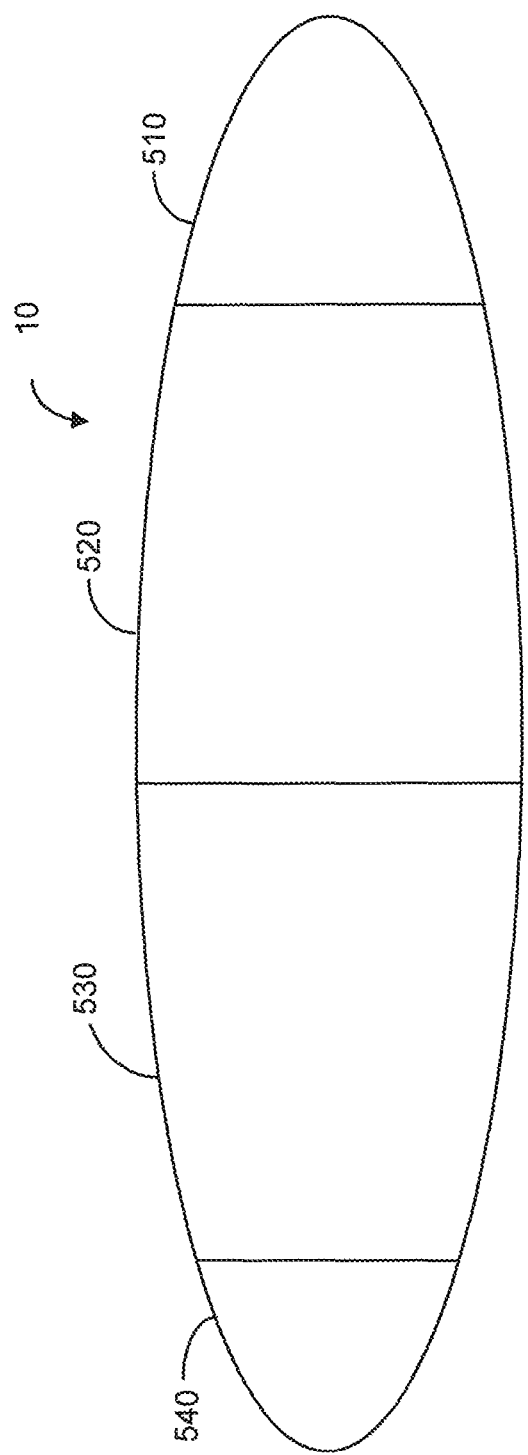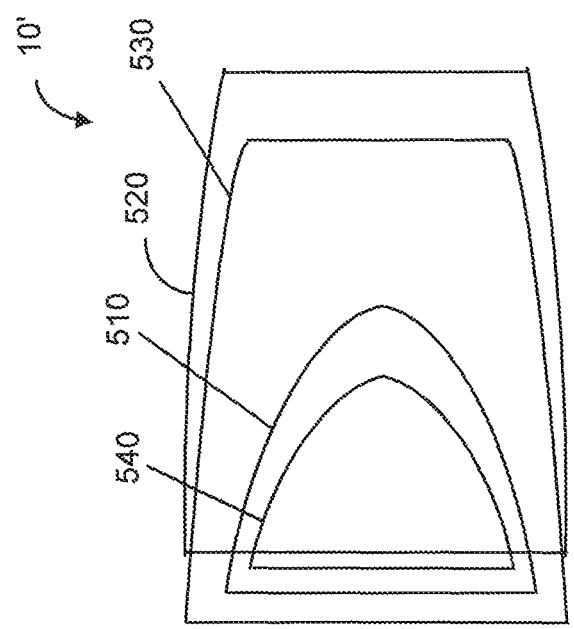
FIG. 11a
FIG. 11b

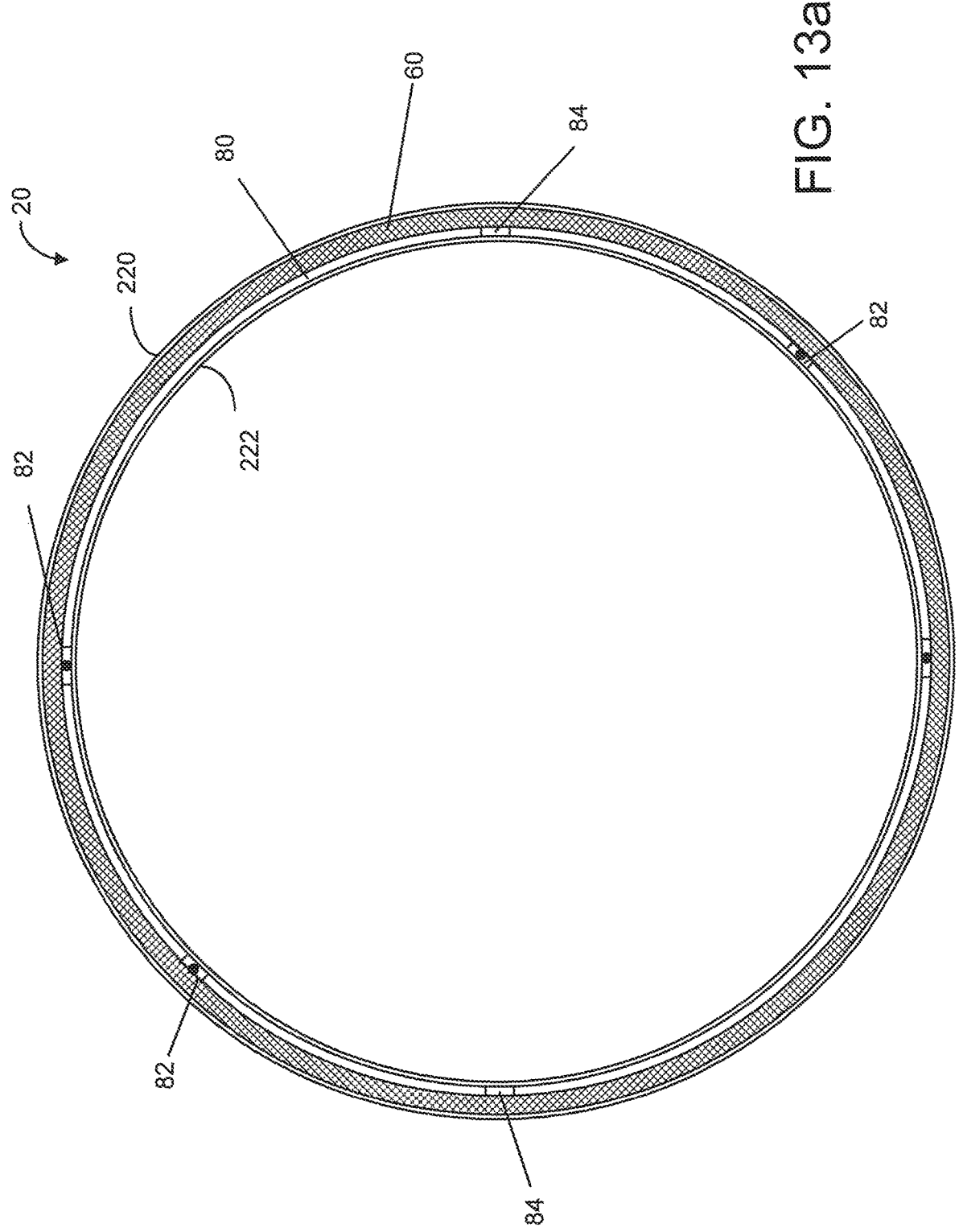

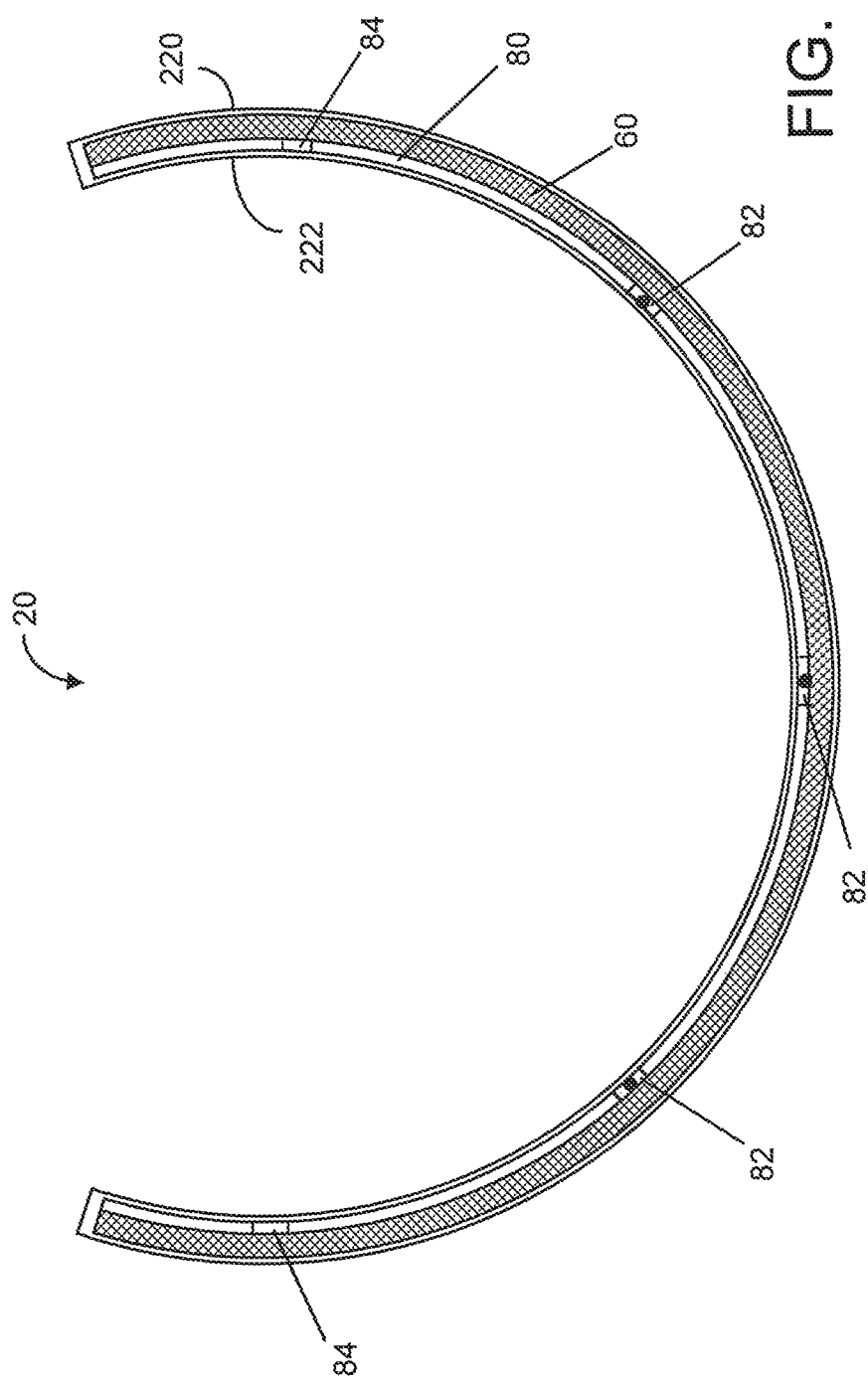

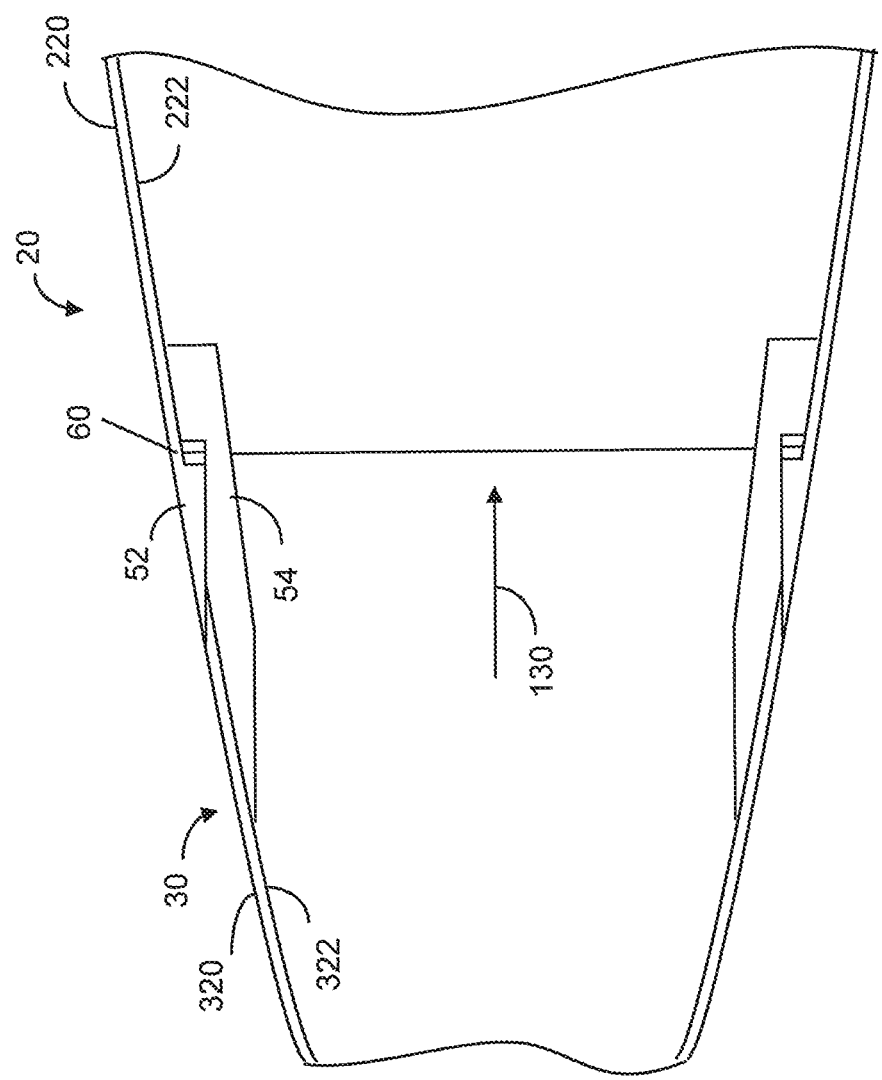

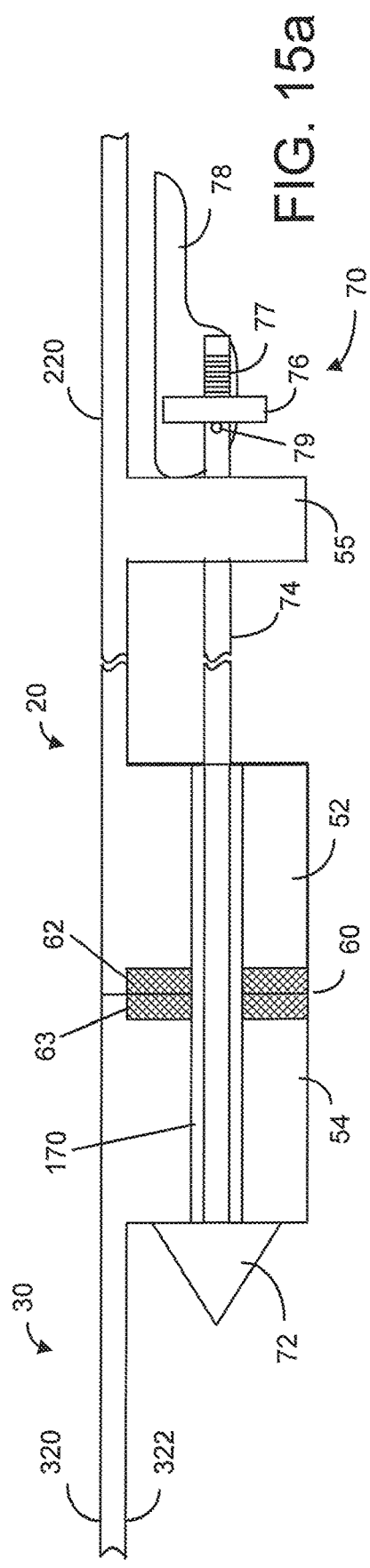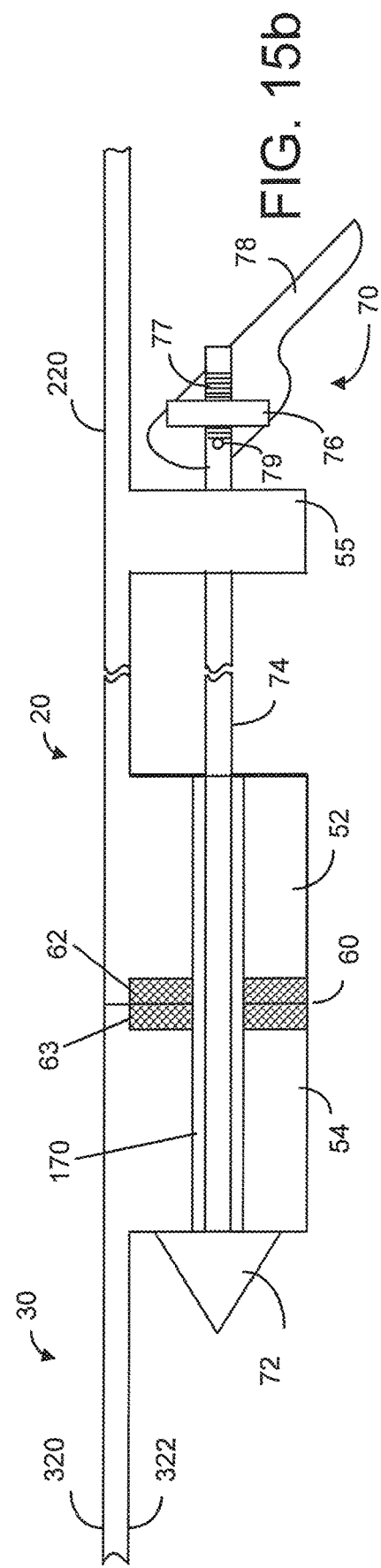

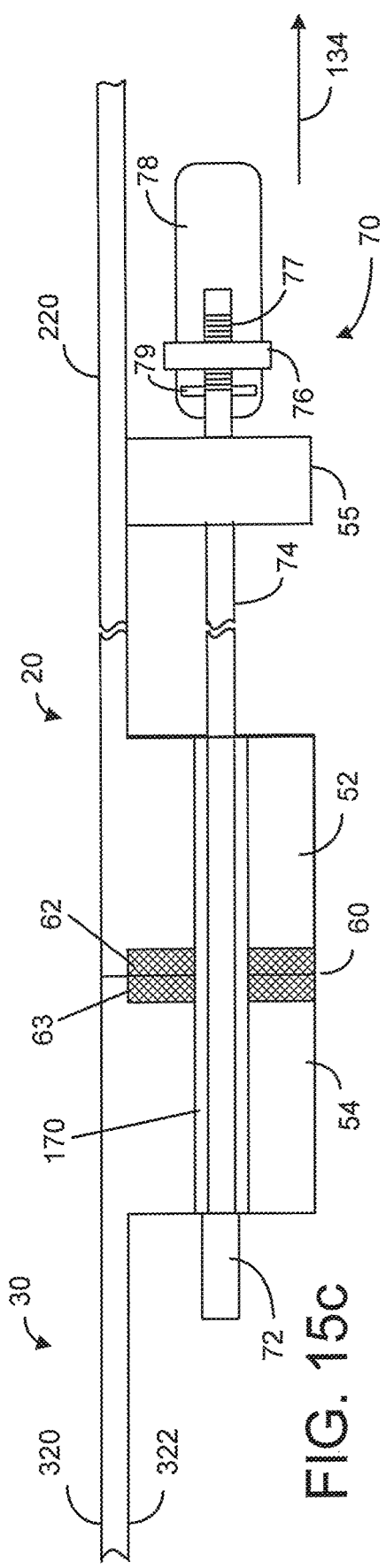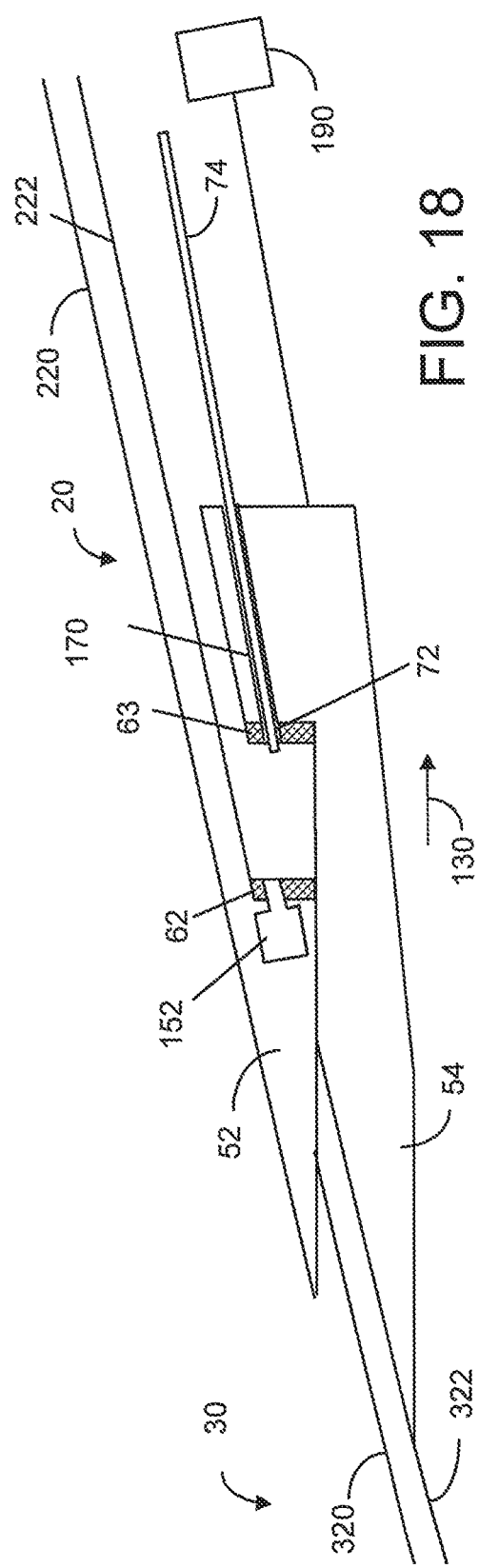

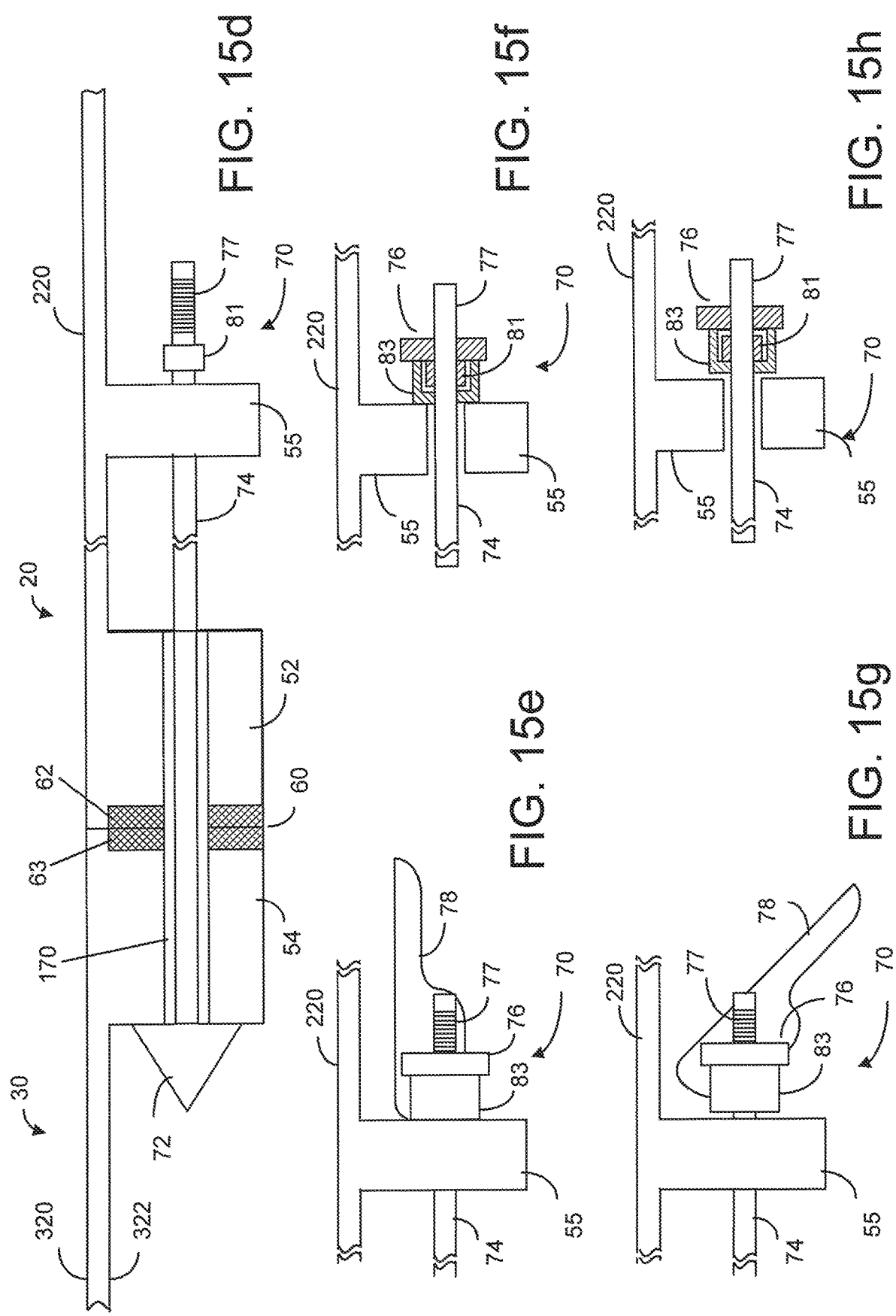

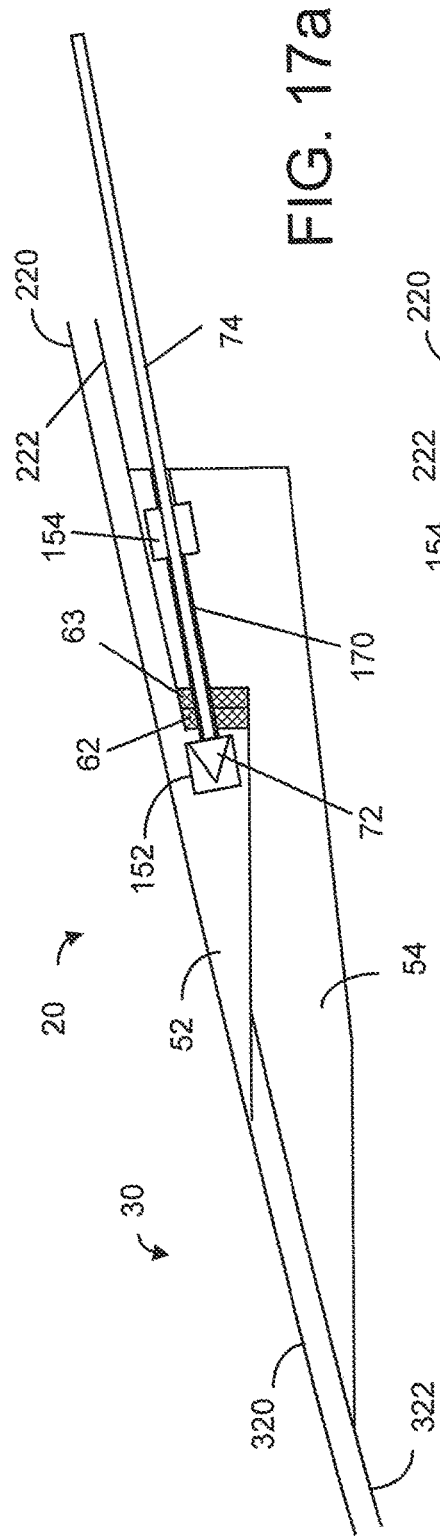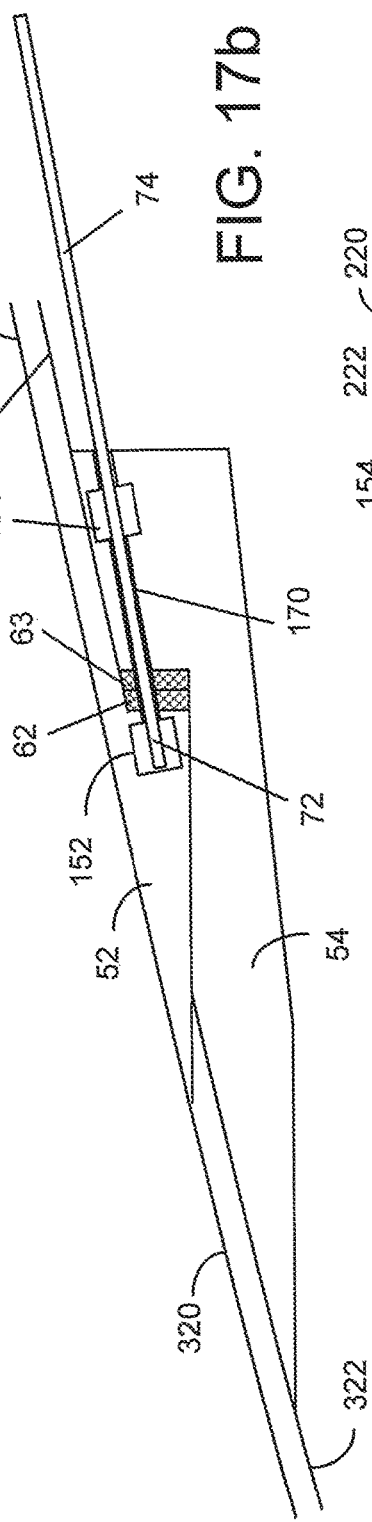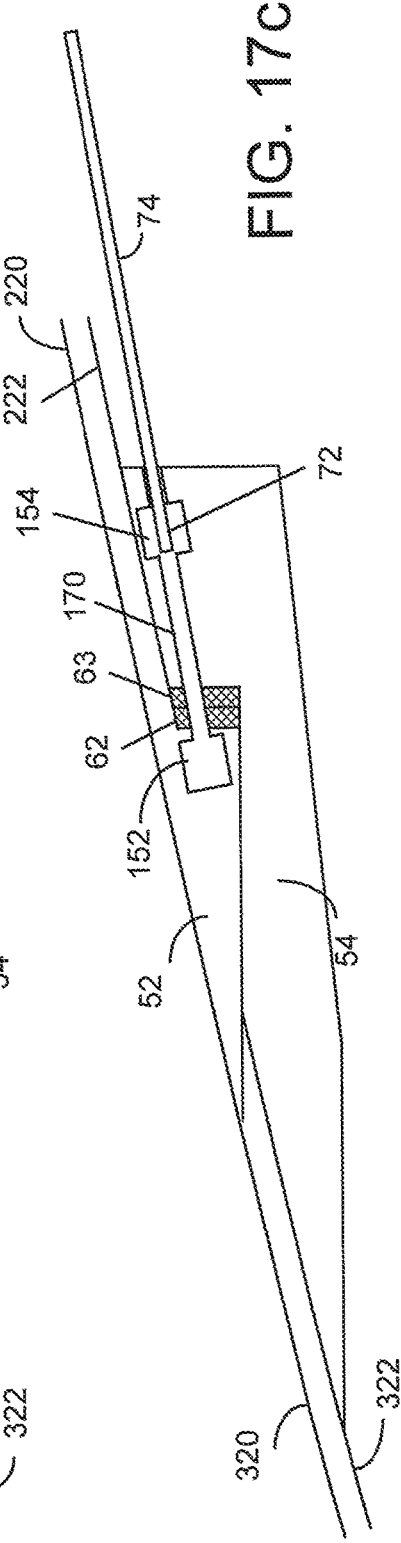

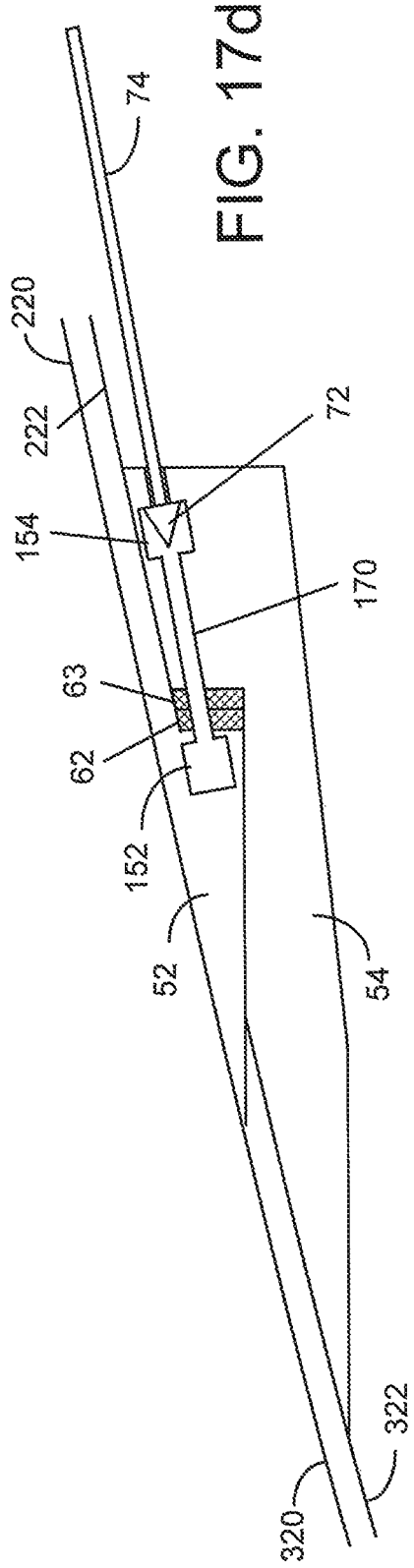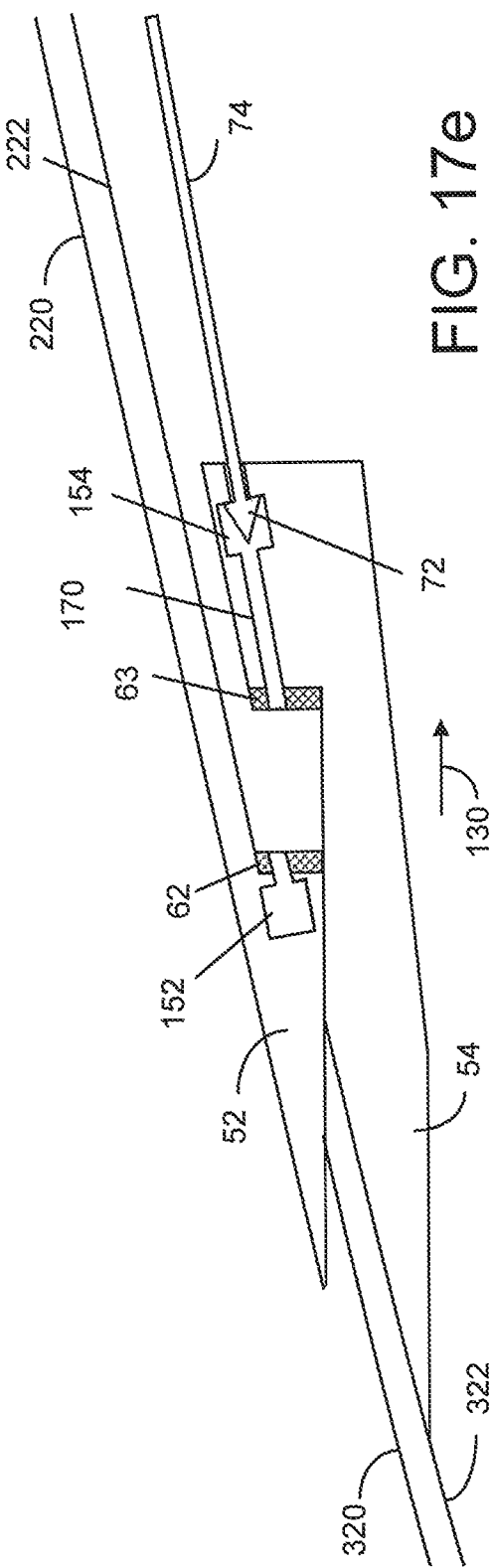

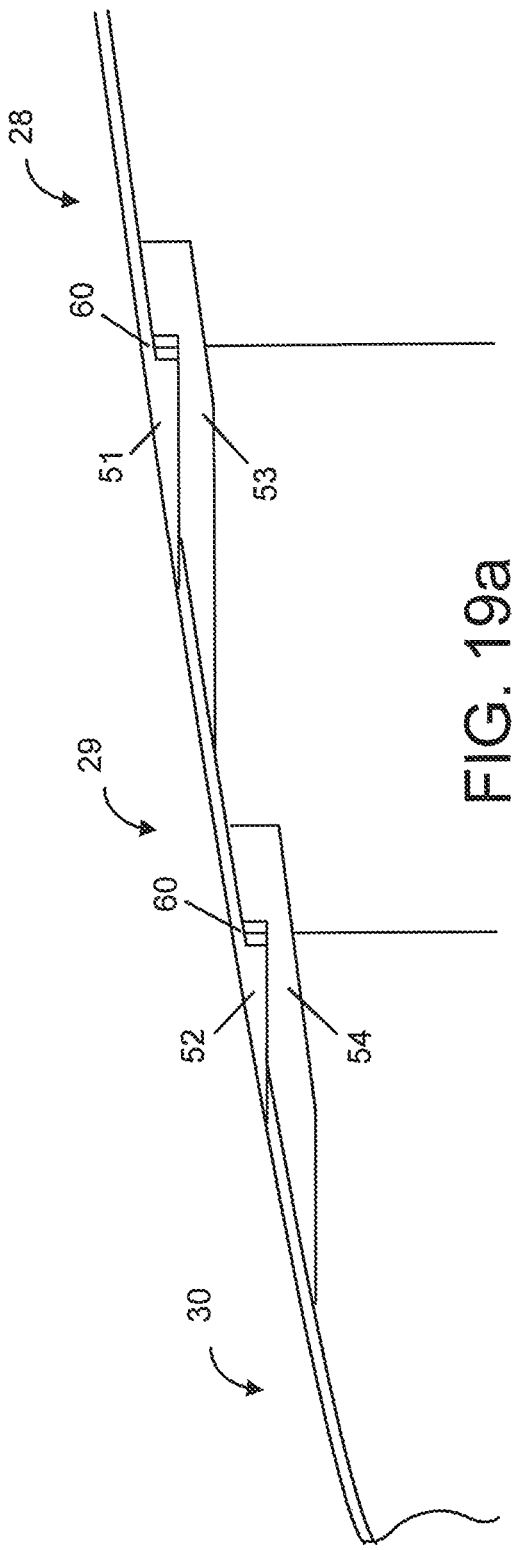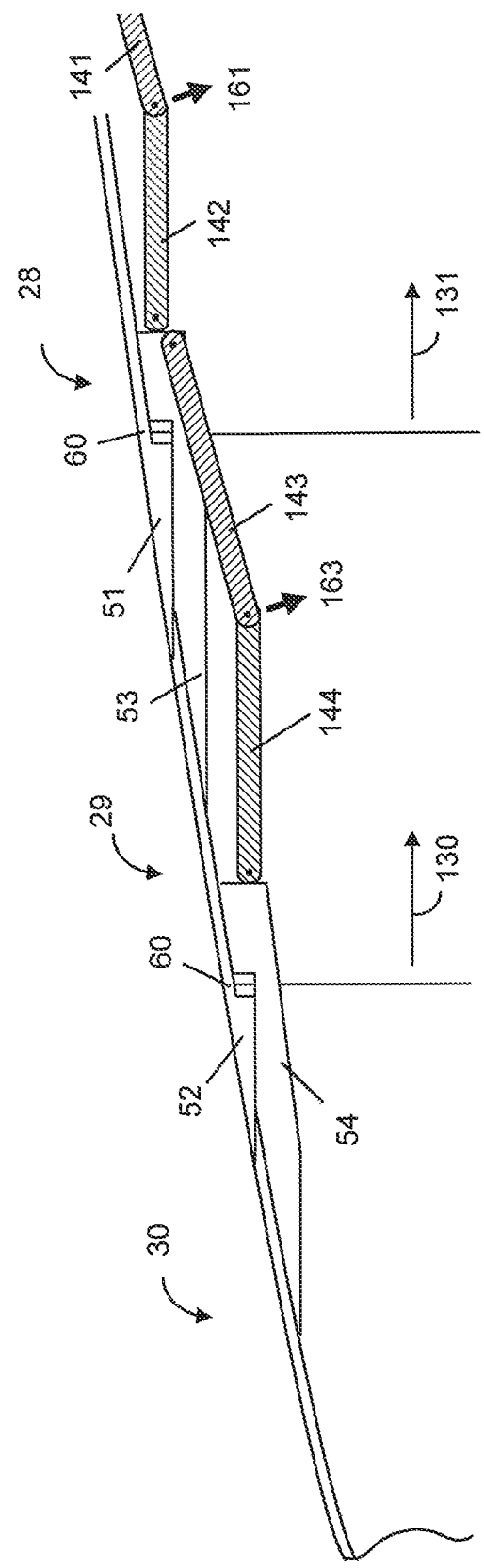

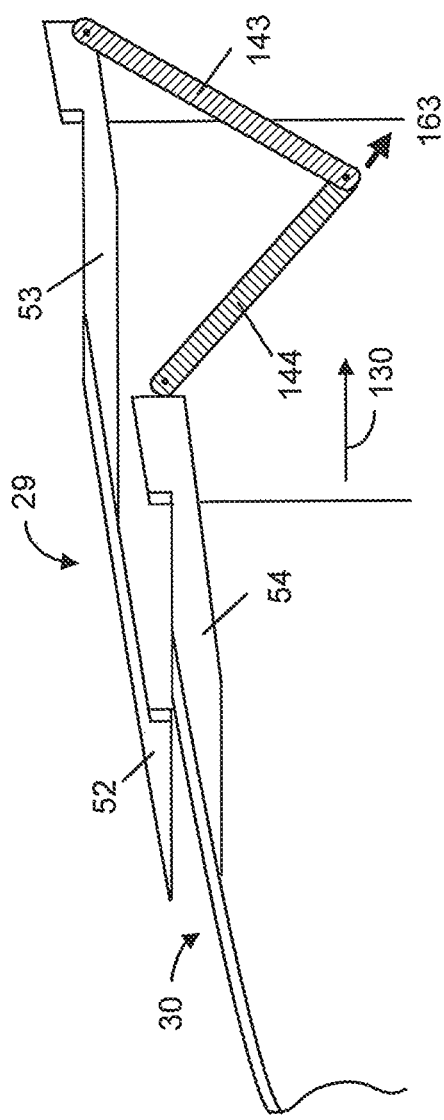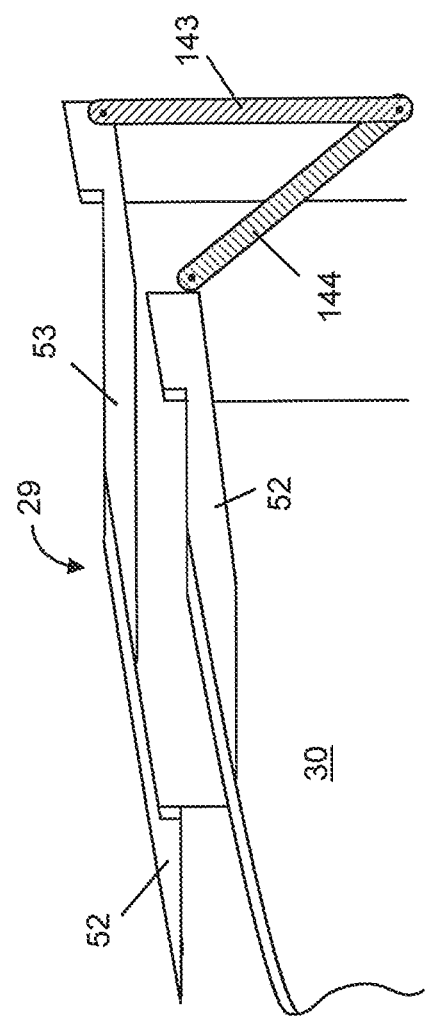

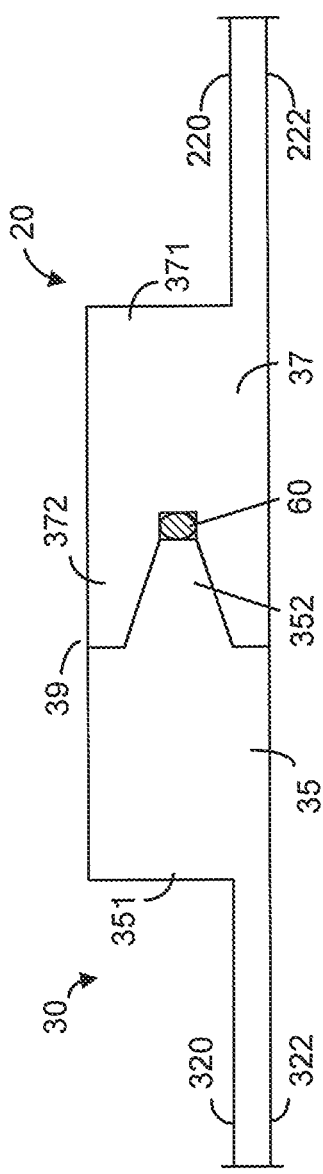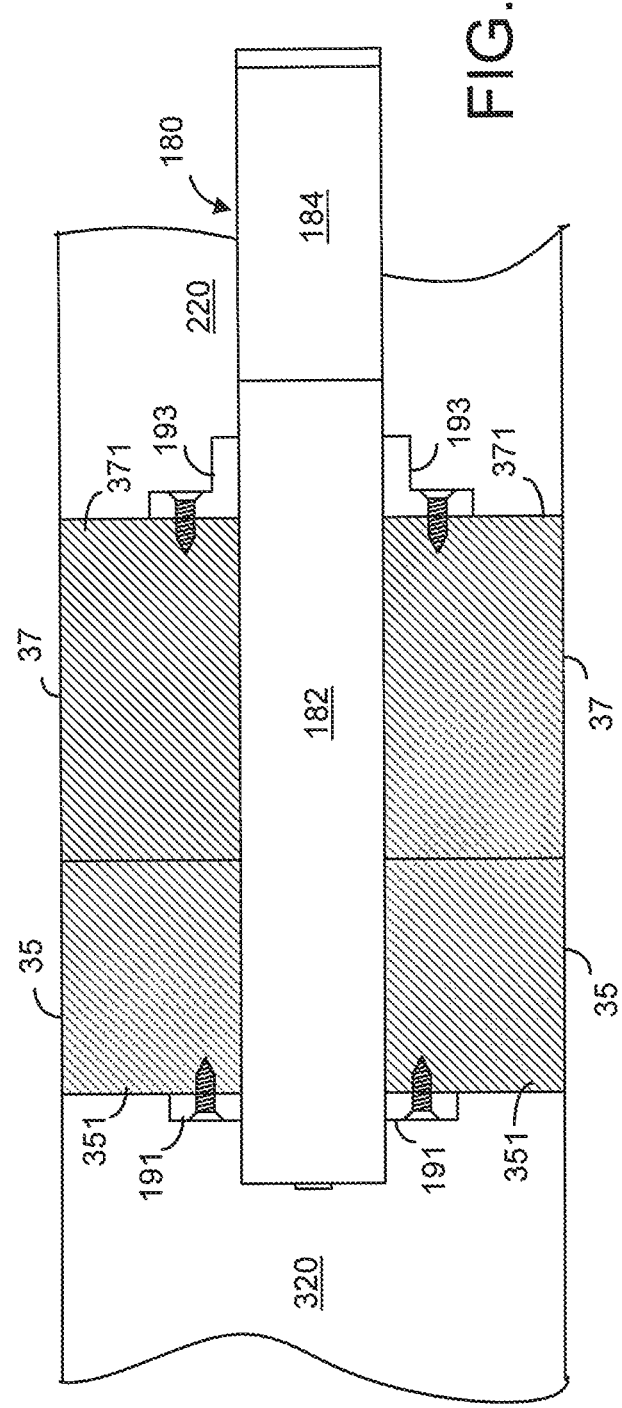

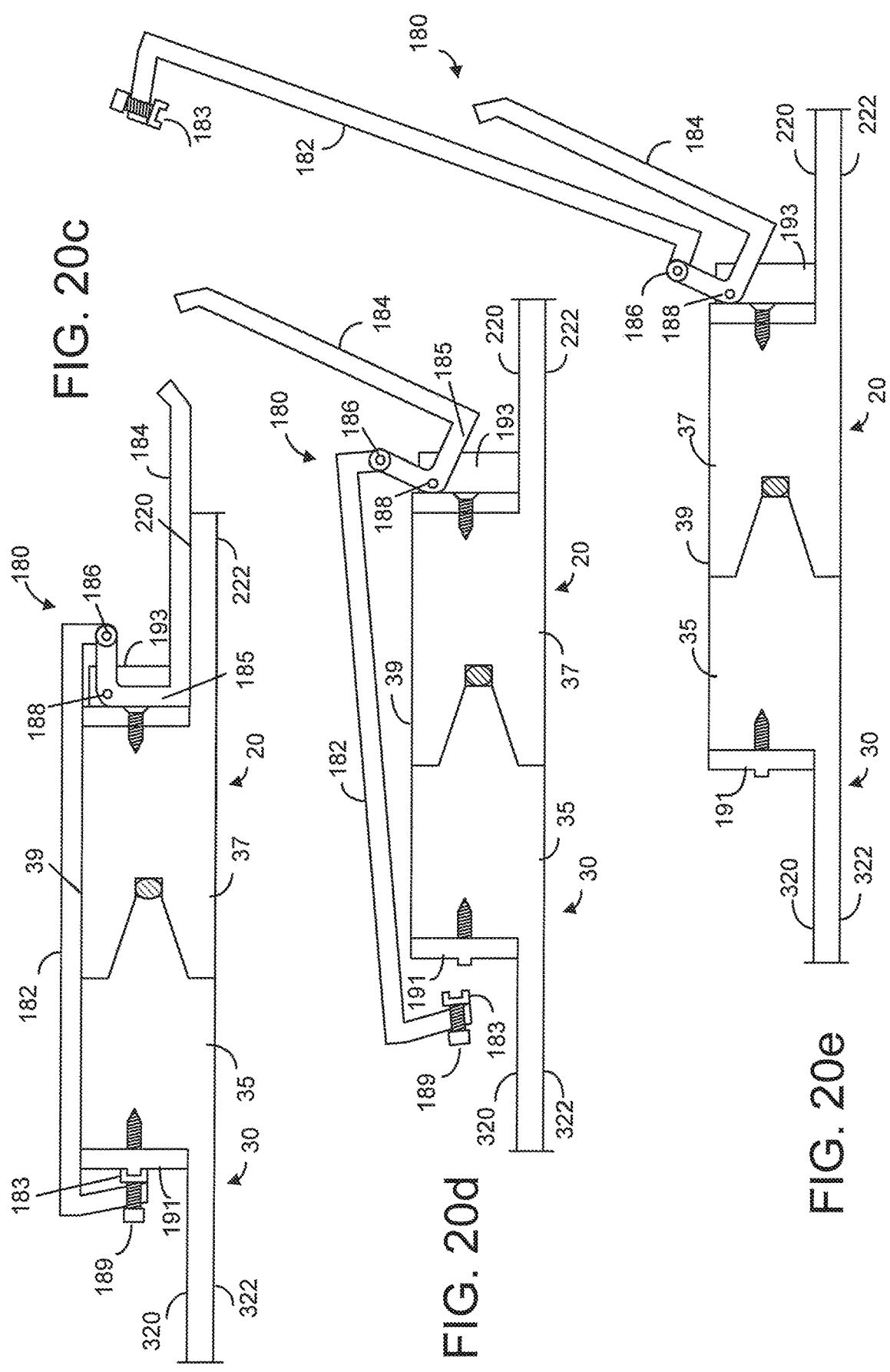

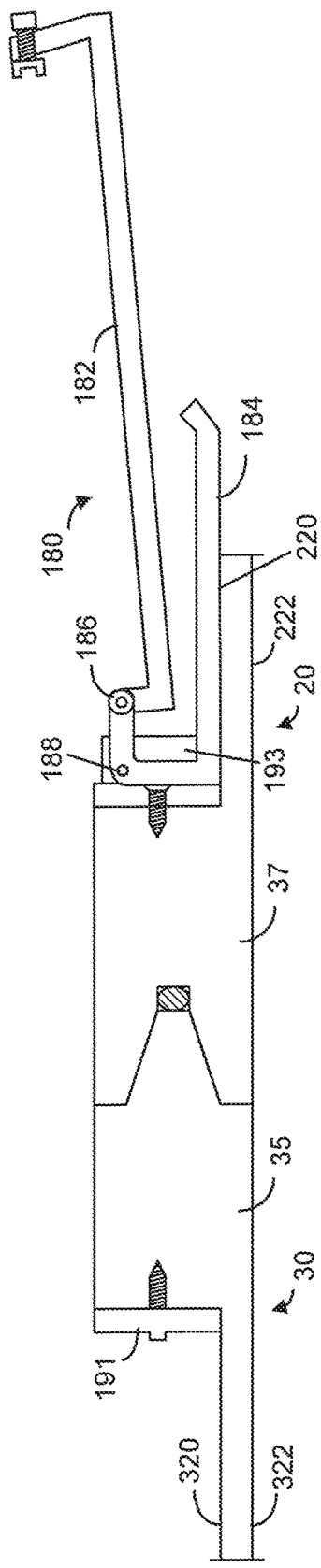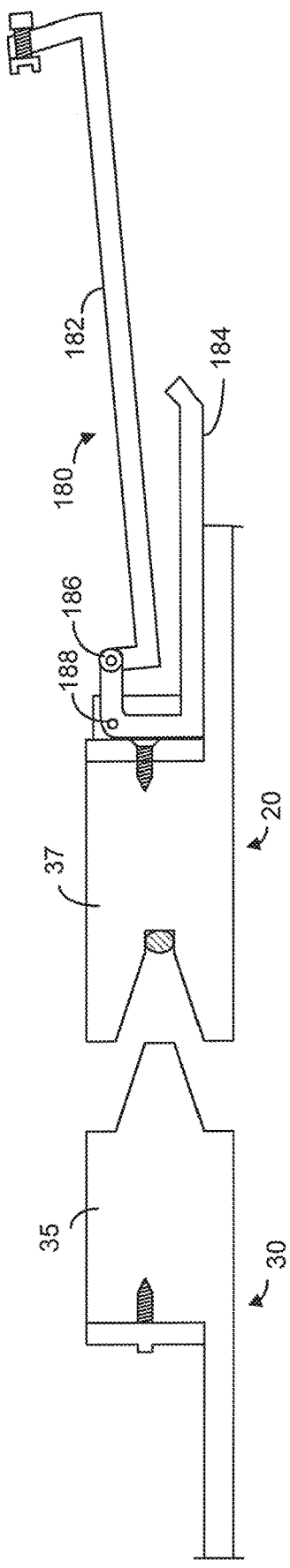

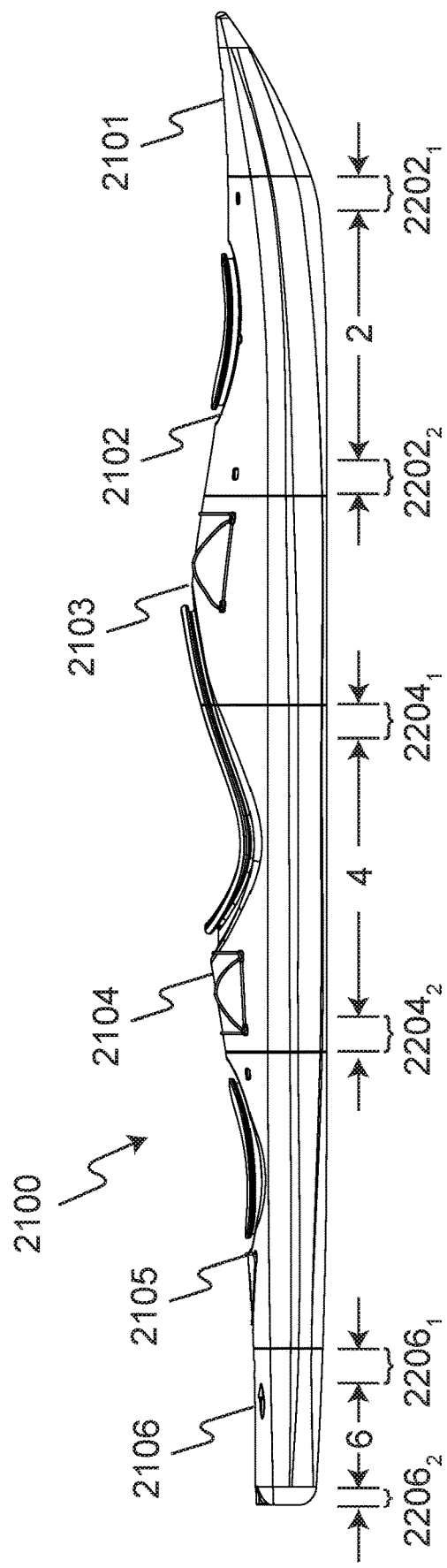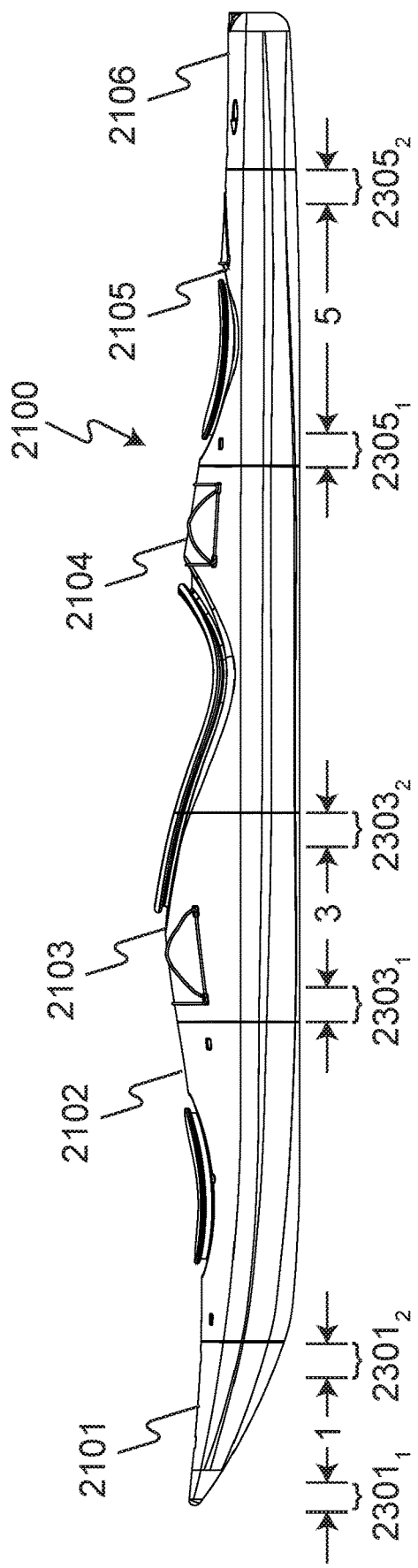

LATCHING DEVICE

RELATED APPLICATIONS

This application is a continuation of application Ser. No. 16/374,012 filed Apr. 3, 2019, which is a divisional of application Ser. No. 15/803,058 filed Nov. 3, 2017 (now U.S. Pat. No. 10,293,888) as a continuation-in-part of international application PCT/US2015/030557 filed May 13, 2015, wherein said application Ser. No. 15/803,058 claims benefit of provisional application 62/424,432 filed Nov. 19, 2016, and wherein said application Ser. No. 15/803,058 is also a continuation-in-part of design application 29/585,129 filed Nov. 21, 2016.

FIELD OF THE INVENTION

The present invention relates generally to a watercraft and, more specifically, to a watercraft that has two or more separable sections.

BACKGROUND OF THE INVENTION

A watercraft, such as a boat, kayak, canoe and dinghy, is usually constructed as a single body which is heavy and long. That makes it impractical to transport the watercraft inside an automobile. That is also the reason why most kayaks or canoes are carried on top of an automobile to be transported. Likewise, it is usually inconvenient for an individual to move a long kayak or canoe over a certain distance. When it comes time to store the watercraft after use, it may be moved to a commodious structure such as a garage or basement where it takes up a good deal of available storage space.

The present invention provides a watercraft that is easier to transport and store.

SUMMARY OF THE INVENTION

The present invention provides a full-length watercraft which can be taken apart and packed into a single packed structure having a smaller length. In general, the present invention provides various ways of packing body sections or components. One way is to take apart two adjacent body sections and turn one of the sections around so that the smaller section can be put inside the larger section. Another way is to release a securing mechanism between two adjacent body sections so that the smaller section can be slid into the larger section. When the watercraft has more than two body sections, it is also possible to slide smaller sections into adjacent larger sections without taking apart those body sections. Or, sections disassembled from an assembled watercraft may be reordered with some reoriented and all packed together in an order different from the assembled order. It is possible to slide the sections with motors or the like.

Thus, the scope of the present invention is to provide a watercraft having a plurality of separable body sections configured for assembling into a single assembled structure having a first length, and for packing into a packed structure having a second length smaller than the first length. The plurality of separable body sections may comprise a first body section and a second body section, the first body section comprising an exterior surface and an interior surface defining a cavity with an opening, wherein the second body section is dimensioned such that at least part of the second body section is locatable inside the cavity of the first body section to form the packed structure.

In one of the embodiments of the present invention, the first body section comprises a first inner end, an opposing first outer end and a first intermediate portion between the first inner end and the first outer end, and the second body section comprises a second inner end, an opposing second outer end and a second intermediate portion between the second inner end and the second outer end, and the second inner end is adjacent to the first inner end when said plurality of separable body sections form the single assembled structure.

In another embodiment of the present invention, the second outer end and at least part of the second intermediate portion are locatable inside the cavity when said plurality of separable body sections form the packed structure.

In yet another embodiment, the second inner end and at least part of the second intermediate portion are locatable inside the cavity when said plurality of separable body sections form the packed structure.

In a different embodiment, the second body section comprises a second exterior surface and a second interior surface defining a second cavity with a second opening, and the first body section comprises a plurality of separable sub-sections, said plurality of separable sub-sections comprising a first sub-section including the first inner end and a part of the first intermediate portion, and a second sub-section including the first outer end and a different part of the first intermediate portion, and wherein the second sub-section is dimensioned for placement into the second cavity of the second body section.

In another embodiment, the first body section comprises a plurality of separable sub-sections, said plurality of separable sub-sections comprising a first sub-section including the first inner end and a part of the first intermediate portion, and a second sub-section including the first outer end and a different part of the first intermediate portion, and the cavity comprises an inner cavity adjacent to the second sub-section, and wherein at least part of the second sub-section is dimensioned for placement into the inner cavity.

In some embodiments, the first body section comprises a first sub-section including the first outer end and a second sub-section including the second outer end, and the second body section comprises a third sub-section including the second inner end and a fourth sub-section including the second outer end, wherein the third sub-section is dimensioned such that at least part of the third sub-section is locatable inside the second sub-section, at least part of the first sub-section is locatable inside the third sub-section, and at least part of the fourth sub-section is locatable inside the first sub-section for forming the packed structure.

In some embodiments, the first body section comprises a first sub-section including the first outer end and a second sub-section including the second outer end, and the second body section comprises a third sub-section including the second inner end and a fourth sub-section including the second outer end, wherein each of the first, second, third and fourth sub-sections has a smaller end and an opposing larger end, and wherein the first, second, third and fourth sub-sections are dimensioned for forming the packed structure such that the smaller end of each of the first sub-section, the second sub-section and the third sub-section is adjacent to the smaller end of the fourth sub-section.

In one embodiment, the first body section comprises a first sub-section including the first outer end, a third sub-section including the first inner end, and a second sub-section between the first sub-section and the third sub-section, and the second body section comprises a fourth sub-section including the second inner end and a fifth sub-section including the second outer end, wherein the third sub-section comprises a cavity with a first opening adjacent to first inner end and an opposing second opening adjacent to the second sub-section, wherein the second sub-section is dimensioned for sliding into one part of the third sub-section through the second opening, the first sub-section is dimensioned for sliding into second sub-section, and wherein the fourth sub-section is dimensioned for sliding into another part of the third sub-section through the first opening, and the fifth sub-section is dimensioned for sliding into the fourth sub-section for forming the packed structure.

In various embodiments, the watercraft also has a locking assembly configured for securing the first inner end to the second inner end when said plurality of separable body sections form the single assembled structure, and a sealing part located between the first inner end and the second inner end for preventing water leakage into the interior of the watercraft when said plurality of separable body sections form the single assembled structure.

The aspects of the present invention as described above will become apparent upon reading the description taken in conjunction with the drawings.

In yet another embodiment, a watercraft may include six separable body sections configured for assembly into a single assembled structure having a first length, and for packing into a packed structure having a second length smaller than the first length, the six separable body sections comprising a first body section, a second body section, a third body section, a fourth body section, a fifth body section, and a sixth body section, each body section having an exterior surface and an interior surface defining a cavity with an opening, wherein to form the packed structure the sixth body section is dimensioned such that at least part of the first body section is locatable inside the cavity of the sixth body section, the fifth body section is dimensioned such that at least part of the sixth body section is locatable inside the cavity of the fifth body section, the second body section is dimensioned such that at least part of the fifth body section is locatable inside the cavity of the second body section, the fourth body section is dimensioned such that at least part of the second body section is locatable inside the cavity of the fourth body section, and the third body section is dimensioned such that at least part of the fourth body section is locatable inside the cavity of the third body section.

In still another embodiment, a watercraft may include a plurality of separable body sections configured for assembly into a single assembled structure having a first length, and for packing into a packed structure having a second length smaller than the first length, each body section having an exterior surface and an interior surface defining a cavity with an opening, wherein to form the packed structure at least one body section is dimensioned such that at least part of the at least one body section is locatable inside the cavity of another body section, and wherein the orientation of the at least one section is reversed by one hundred and eighty degrees from an assembled orientation of the at least one body section in the assembled structure.

The plurality of separable body sections may include an even number of body sections, wherein in the packed structure, with respect to the orientation of half of the body sections, the other half of the body sections are reversed by one hundred and eighty degrees from an assembled orientation thereof in the assembled structure.

The plurality of separable body sections may include six body sections including a first body section, a second body section, a third body section, a fourth body section, a fifth body section, and a sixth body section that are assembled into the assembled structure in first, second, third, fourth, fifth, and sixth body section order and that are packed into the packed structure in third, fourth, second, fifth, sixth, and first body section order. In the packed structure, with respect to the orientation of the third, second, and first body sections, the fourth, fifth, and sixth body sections may be reversed by one hundred and eighty degrees from an assembled orientation thereof in the assembled structure.

These additional embodiments of the present invention as described above will also become apparent upon reading the description taken in conjunction with the drawings.

BRIEF DESCRIPTION OF THE DRAWINGS

FIG. 1 shows a watercraft in a single, assembled structure, according to one embodiment of the present invention.

FIG. 2 shows the general construction of a watercraft as shown in FIG. 1.

FIG. 5 is a schematic representation of a sealing component and a locking assembly for assembling the sectional watercraft into a single assembled structure.

FIG. 7 shows how the three sections are packed into a packed structure, according to one embodiment of the present invention.

FIG. 8 shows how the three sections are packed into a different packed structure, according to another embodiment of the present invention.

FIG. 9 shows a watercraft having four separable sections assembled in a single assembled structure.

FIGS. 10a-10h show different ways to pack the four sections in the watercraft of FIG. 9 into a packed structure.

FIG. 11a shows a different watercraft having four sections.

FIG. 11b shows one way for packing the four sections in the watercraft of FIG. 11a into a packed structure.

FIG. 13a shows the sealing part on one of the adjacent body sections where the cross section of the body section is a complete loop.

FIG. 13b shows the sealing part on one of the adjacent body sections where the cross section of the body section is only a partial loop.

FIG. 14 shows the interface between two adjacent body sections, according to one embodiment of the present invention.

FIGS. 15a to 15c illustrate a locking assembly for securing two adjacent body sections, according to one embodiment of the present invention.

FIGS. 15d to 15h illustrate a locking assembly for securing two adjacent body sections, according to another embodiment of the present invention.

FIGS. 17a-17e illustrate how the locking assembly is engaged with and released from two adjacent body sections, FIG. 18 shows a movement mechanism used to move one of the locking blocks.

FIG. 19a shows three adjacent body sections of the watercraft.

FIGS. 19b-19d illustrate how two adjacent body sections are folded, according to a different embodiment of the present invention.

FIG. 20a illustrates how two adjacent body sections are mated and sealed.

FIGS. 20b-20g illustrate how the two adjacent body sections are locked and separated, according to one embodiment of the present invention

FIG. 22 is a right side view of the assembled kayak of FIG. 21;

FIG. 23 is a left side view thereof;

DETAILED DESCRIPTION OF THE INVENTION

The present invention provides a full-length watercraft which can be taken apart and packed into a single packed structure having a smaller length. As such, the watercraft can be put in an automobile or on a cart to be transported. According to various embodiments of the present invention, the watercraft has two or more separable body sections which can be secured into a single assembled structure and can be packed into a packed structure having a smaller length. In general, the present invention provides various ways in packing body sections. One way is to take apart two adjacent body sections and turn one of the sections around so that the smaller section can be put inside the larger section. Another way is to release a securing mechanism between the adjacent body sections so that the smaller section can be slid into the larger section.

In the various embodiments of the present invention, the watercraft can be a boat, a kayak, a canoe or the like. In case of a kayak, it can be a sit-on-top kayak or a conventional kayak that has one or two cockpits to allow one or more persons to sit in the cockpits.

Figure 3:
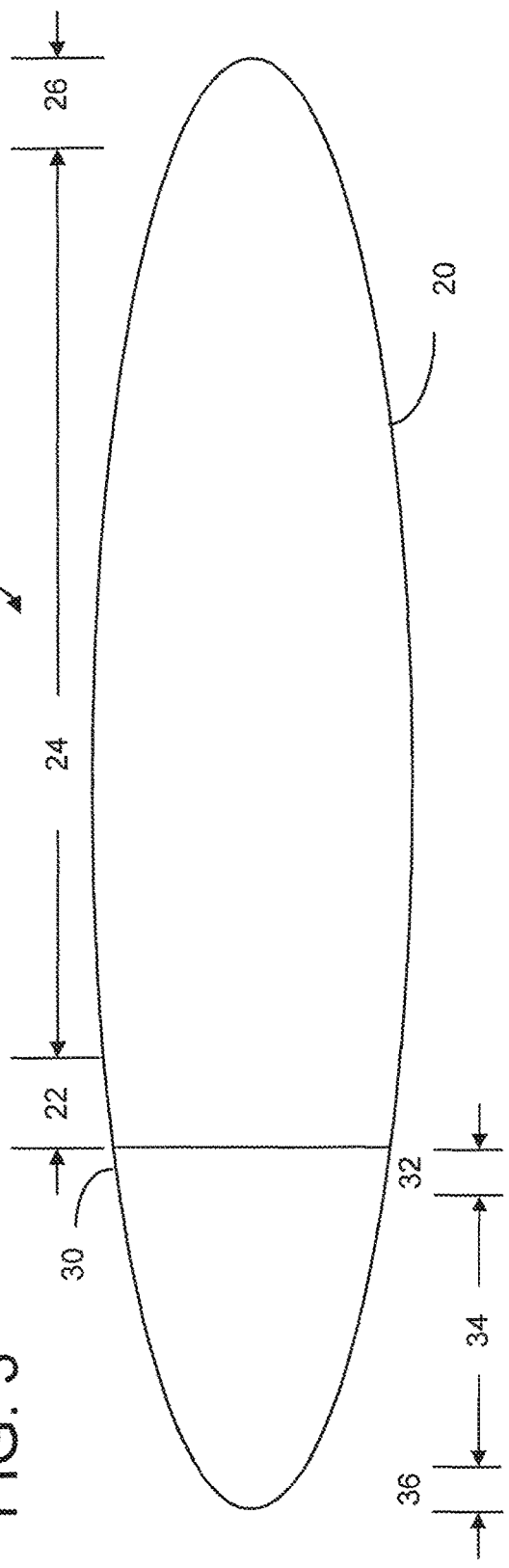
FIG. 3 shows various portions of a section in a sectional watercraft, according to the present invention.
Figure 4A:
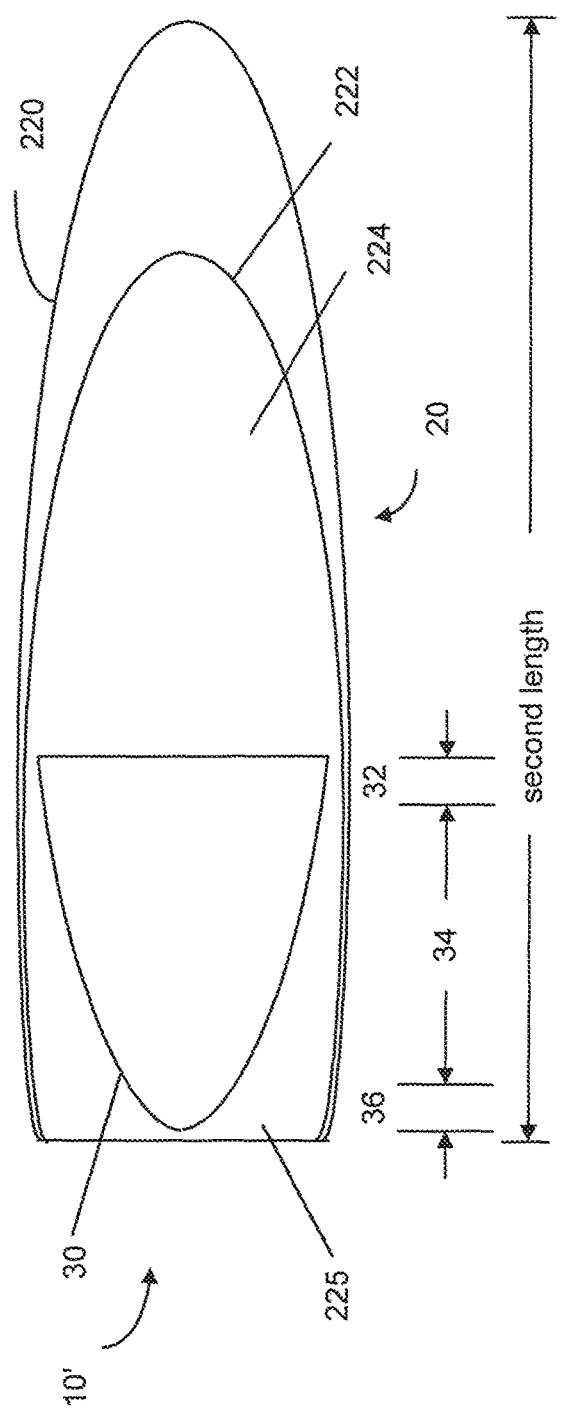
FIG. 4a shows how the sectional watercraft as depicted in FIGS. 2 and 3 is packed into a packed structure, according to one embodiment of the present invention.
Figure 4B:
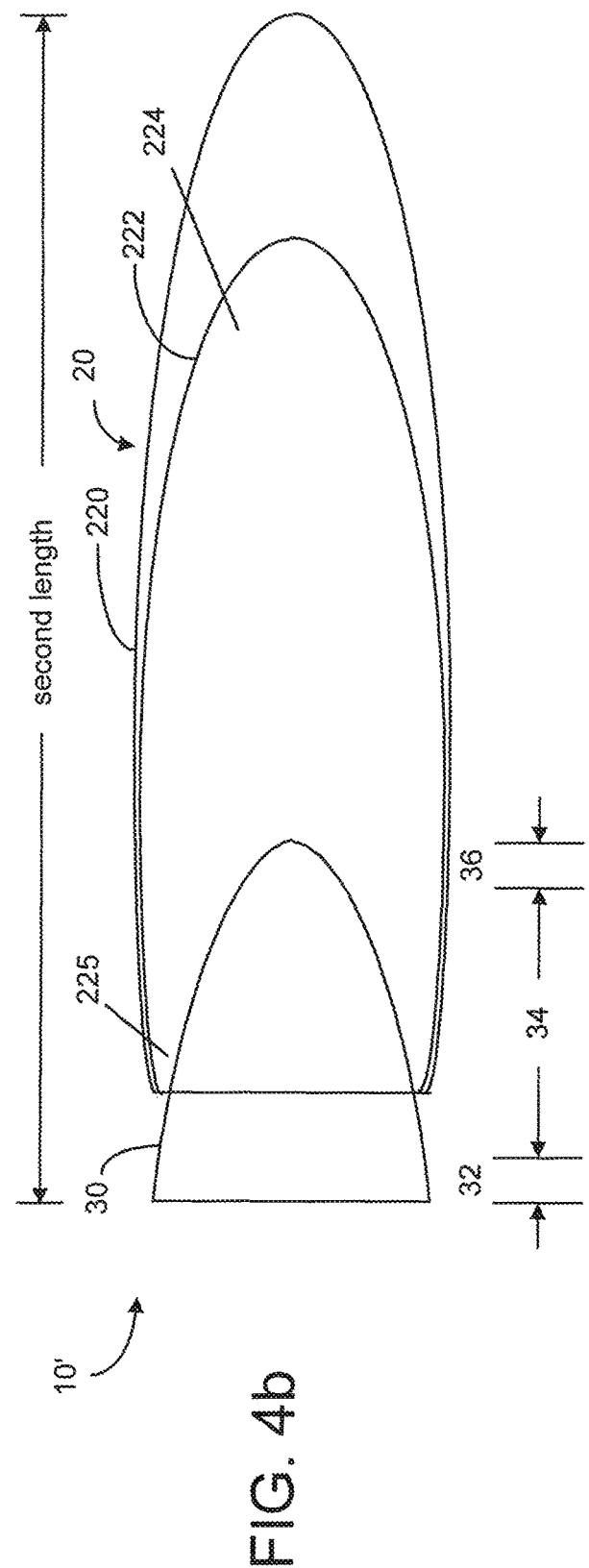
FIG. 4b shows how the sectional watercraft as depicted in FIGS. 2 and 3 is packed into another packed structure, according to a different embodiment of the present invention.

In one of the embodiments of the present invention, a watercraft has two separable body sections as shown in FIG. 1. As shown in FIG. 1, the watercraft 10 has a first body section 20 and a second body section 30 to be assembled into a single assembled structure having a full length. As can be seen in FIGS. 2 and 3, the first body section 20 has an exterior surface 220 and an interior surface 222 defining a cavity 224 with an opening 225. The second body section 30 has an exterior surface 320 and an interior surface 322 defining a cavity 324 with an opening 325. The second body section 30 is dimensioned such that at least part of the second body section 30 is locatable inside the cavity 224 of the first body section to form a packed structure, such as shown in FIG. 4a or 4b.

As shown in FIG. 3, the first body 20 has a first inner end 22, an opposing first outer end 26 and a first intermediate portion 24 between the first inner end and the first outer end. The second body section 30 has a second inner end 32, an opposing second outer end 36 and a second intermediate portion 34 between the second inner end and the second outer end. The second inner end 32 of the second body section 30 is adjacent to the first inner end 22 of the first body section when these body sections form the single assembled structure.

As mentioned earlier, there are various ways to pack the separable body sections into a packed structure, depending on the number of body sections and how adjacent body sections are joined. In the embodiment as shown in FIG. 4a, after a securing mechanism (not shown) between the first body section 20 and the second body section 30 is released, the smaller section 30 is slid into the larger section 20 through the opening 225. In the embodiment as shown in FIG. 4b, the two adjacent body sections 20 and 30 are taken apart and one of the sections are turned around, i.e., reoriented by a hundred and eighty degrees, so that the smaller section 30 can be put, at least partly, inside the larger section 20 through the opening 225. As can be seen from FIGS. 4a and 4b, the length of the packed structure 10' is smaller than the length of a single assembled watercraft 10 as shown in FIG. 1.

In order to secure two adjacent body sections together, a certain locking assembly has to be provided. In order to prevent water from leaking into the interior of the watercraft, a certain sealing part has to be provided. As shown in FIG. 5, a locking assembly 50 is provided for securing the first inner end 22 to the second inner end 32 and a sealing part 60 located between the first inner end 22 and the second inner end 32 is used for preventing water leakage into interior of the watercraft when the separable body sections 20, 30 form the single assembled watercraft 10. An exemplary locking assembly and sealing part is illustrated in FIGS. 13a and 13b.

Figure 6:
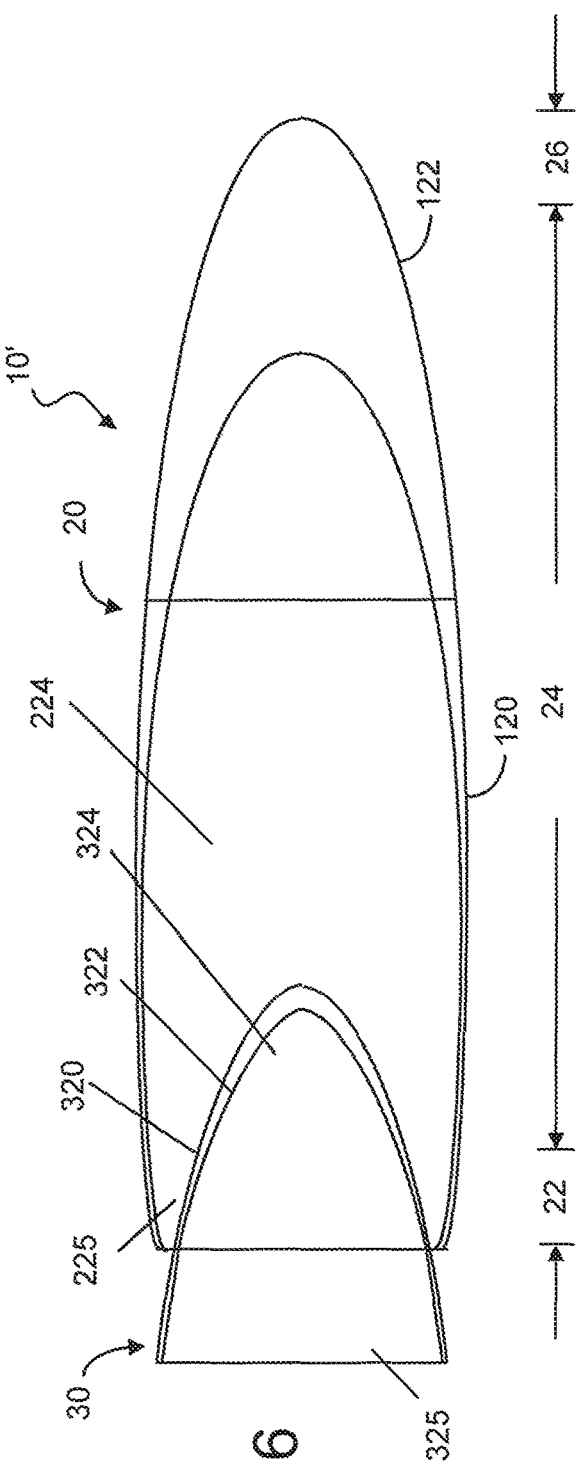
FIG. 6 shows a watercraft having three separable sections.

In one embodiment of the present invention, the watercraft has three separable body sections which can be packed into a packed size. As shown in FIG. 6, the first body section 20 has a first sub-section 120 and a second sub-section 122. The first sub-section 120 includes the first inner end 22 and a part of the first intermediate portion 24. The second sub-section 122 includes the first outer end 26 and a different part of the first intermediate portion 24. In this embodiment, the second sub-section 122 is smaller toward the first outer end 26 than the second body section 30 such that the second sub-section 122 can be placed, at least partly, into the second cavity 324 of the second body section 30 through the opening 325 as shown in FIG. 7 with a smaller size than in FIG. 6, with the opening of the second subsection forward of the cavity 224.

In a different embodiment, the first body section 20 is sectioned into two sub-sections differently. As shown in FIG. 8, the first sub-section 120 has now two openings 225 and 227 defined by the inner cavity 226. Before the first sub-section 120 and the second sub-section 122 are separated, the inner cavity 226 is adjacent to the second sub-section 122. In this embodiment, at least part of the second sub-section 122 is dimensioned to be placed into the inner cavity 226 through the opening 227.

Figure 10C:
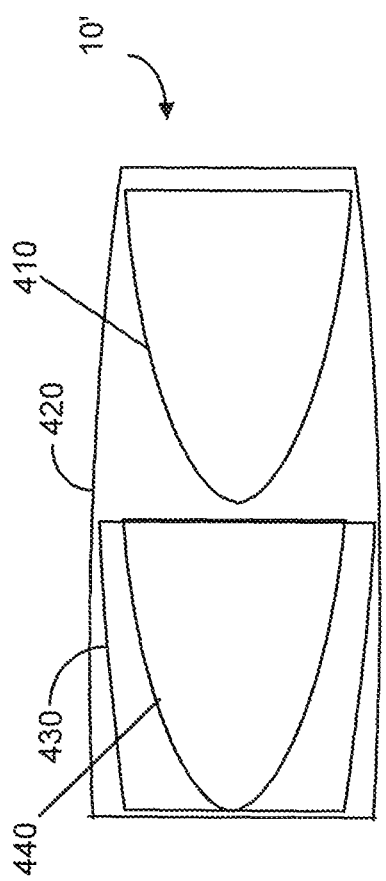
Figure 10D:
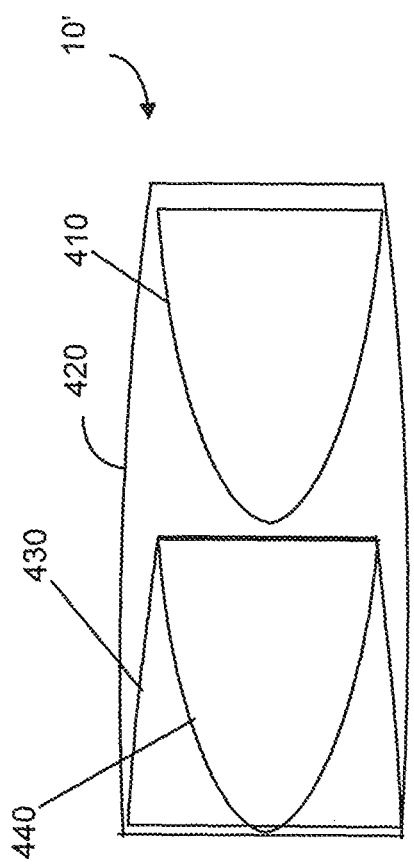

In another embodiment, the watercraft 10 comprises four separable body sections 410, 420, 430 and 440 as shown in FIG. 9. After the locking assembly (not shown) between two adjacent body sections is released, the four body sections can be packed into a packed structure 10' in many different ways. As shown in FIG. 10a, the first body section 410 is slid into one end of the second body section 420. Furthermore, the third body section 430 is slid into the other end of the second body section 420 and the fourth body section 440 is slid into the third body section 430. In the embodiment as shown in FIG. 10b, after the fourth body section 440 is separated from the third body section 430, the fourth body section 440 is turned around, i.e., rotated by one hundred and eighty degrees, before it is placed inside the third body section 430. In the embodiment as shown in FIG. 10c, after the first body section 410 is separated from the second body section 420, the first body section 410 is turned around before it is placed inside the second body section 420. In the embodiment as shown in FIG. 10d, after the first body section 410 is separated from the second body section 420, the first body section 410 is turned around before it is placed inside the second body section 420. After the fourth body section 440 is separated from the third body section 430, the fourth body section 440 is placed inside the third body section 430 which has been turned around. In the embodiment as shown in FIG. 10e, after the locking assembly between two adjacent body sections is released, only the third body section 430 is turned around for packing. In the embodiment as shown in FIG. 10f, after the locking assembly between two adjacent body sections in released, both the third body section 430 and the fourth body section 440 are turned around for packing. In the embodiment as shown in FIG. 10g, after the locking assembly between two adjacent body sections in released, the first body section 410 and the fourth body section 440 are turned around for packing. In the embodiment as shown in FIG. 10h, the first body section 410, the third body section 430 and the fourth 440 are turned around for packing.

In yet another embodiment of the present invention, the watercraft 10 comprises four separable body sections 510, 520, 530 and 540 as shown in FIG. 11a. After the locking assembly (not shown) between two adjacent body sections is released, all body sections are taken apart. As shown in FIG. 11b, the third body section 530 is turned around before it is placed at least partly into the second body section 520. In this embodiment, the first body section 510 is placed inside the third body section 530 and the fourth body section 540 is turned around and placed inside the first body section 510 to become a packed structure 10'.

Figure 12A:
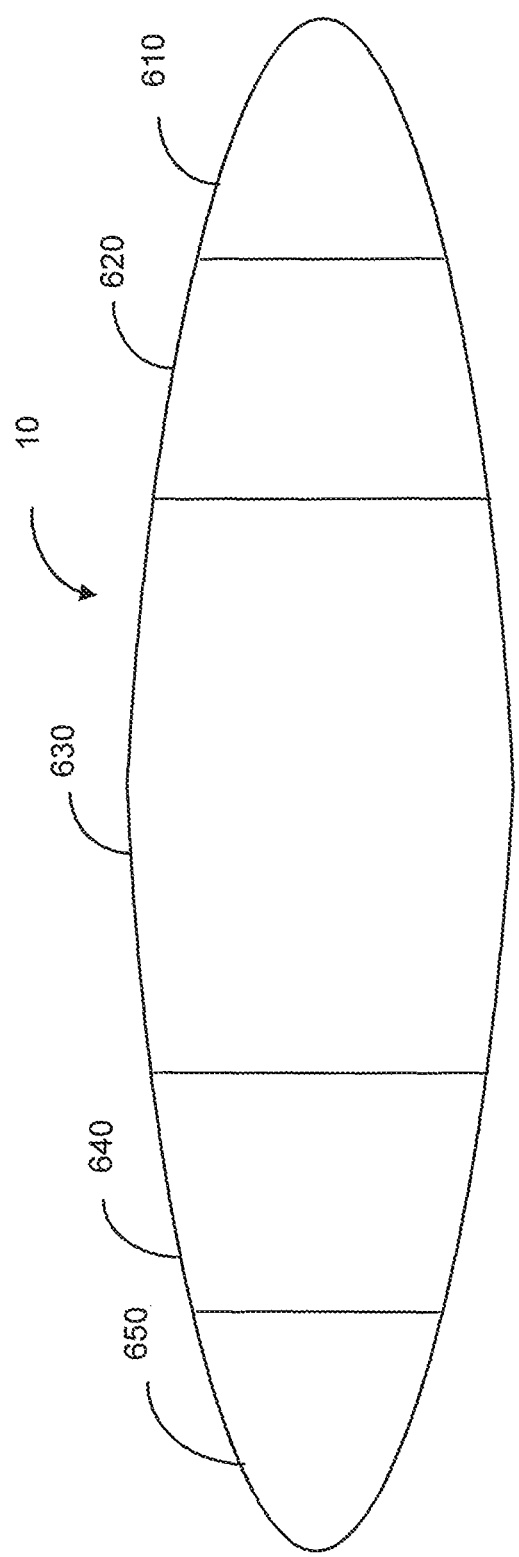
FIG. 12a shows a different watercraft having five sections.
Figure 12B:
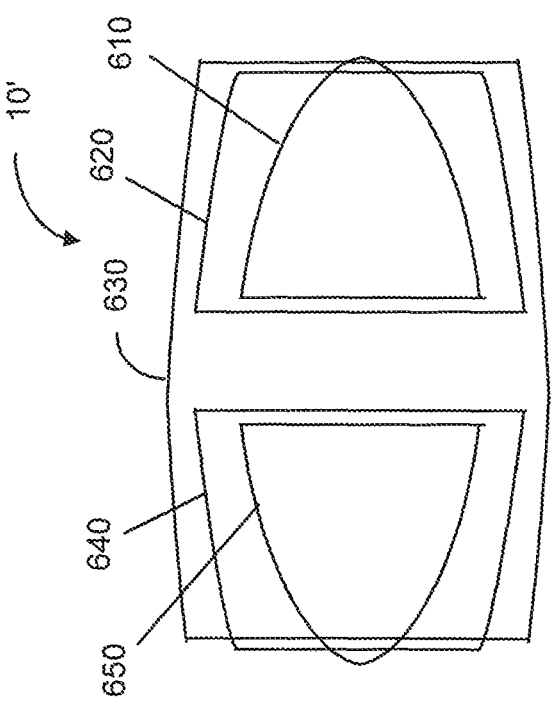
FIG. 12b shows one way for packing the five sections in the watercraft of FIG. 12a into a packed structure.
Figure 16:
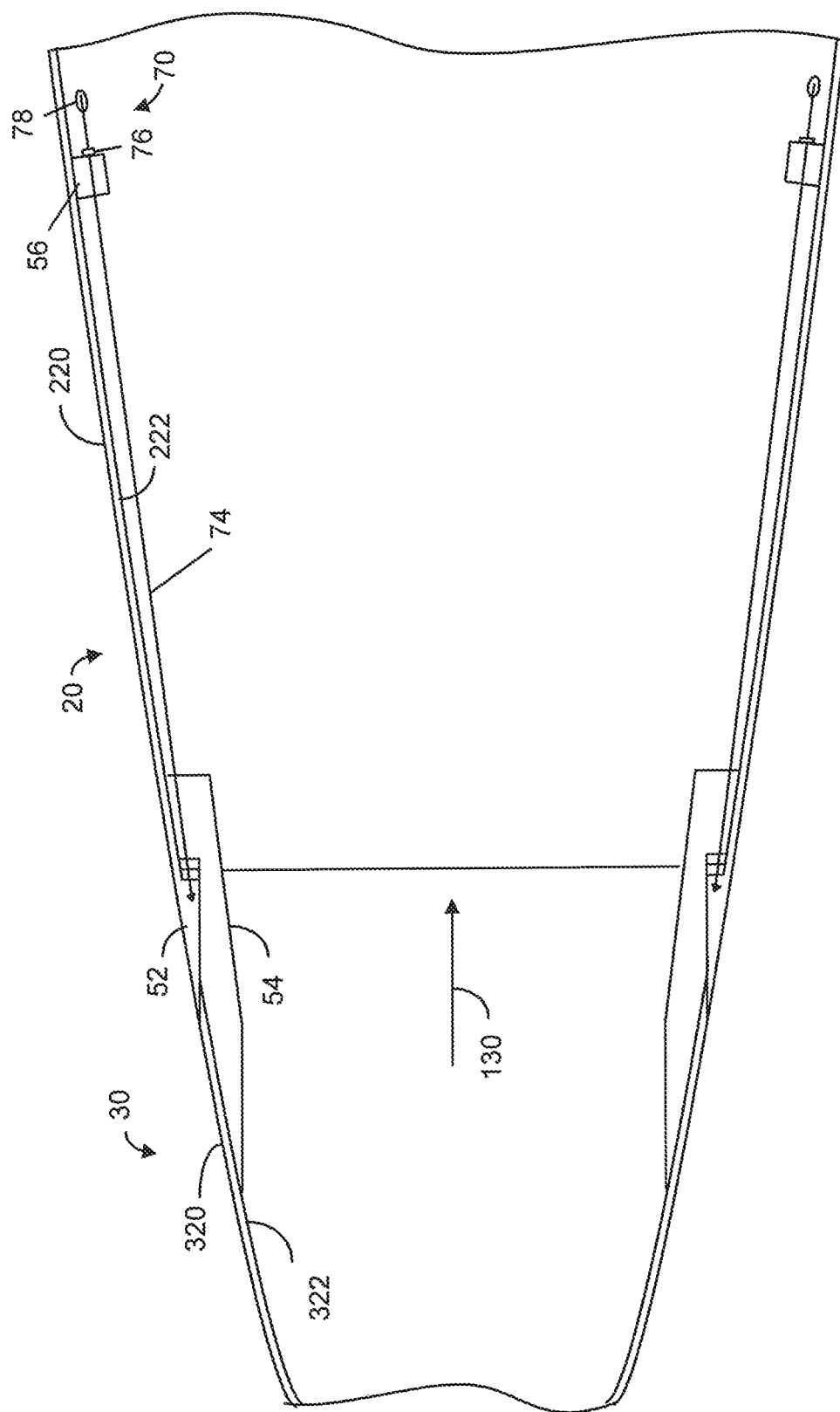
FIG. 16 shows how the locking assembly of FIGS. 15a and 15b is used at the interface of FIG. 14.

In a different embodiment of the present invention, the watercraft 10 comprises five separable body sections 610, 620, 630, 640 and 650 as shown in FIG. 12a. After the locking assembly (not shown) between two adjacent body sections is released, the smaller one of the two adjacent body sections is slid into the larger one. As shown in FIG. 12b, the second body section 620 is slid into one end of the third body section 630 and the fourth body section 640 is slid into the other end of the third body section 630. Furthermore, the first body section 610 is slid into the second body section 620, and the fifth body section 650 is slid into the fourth body section 640 to form a packed structure 10'. In this embodiment, none of the body sections are turned around relative to the other sections. Furthermore, it would not be necessary to move two adjacent body sections apart from each other, as can be seen in FIG. 14.

In various embodiments of the present invention, the adjacent body sections of a watercraft are separable for packing. Taking the embodiment as shown in FIG. 2 as an example, at least one of the body sections 20, 30 has a sealing part. As shown in FIG. 13a, the first body section 20 has a sealing part 60 in the full circumference between the exterior surface 220 and the interior surface 222. Furthermore, a tongue 80 is provided so that it can be joined by a matching part, such as groove, on the second body section 30 (not shown). Furthermore, some gaps 82, 84 are made in the tongue 80 so that the gaps can be joined with corresponding mating parts on the adjacent body section to achieve a positive alignment when the two adjacent body sections are assembled to form the single, assembled structure.

FIG. 13b shows the sealing part 60 and the tongue and groove features 80, 82, 84 when the joining area of the body section does not have a full circumference, as in the case of a canoe, or when the sectioning is done at a cockpit of a kayak, for example.

FIG. 14 shows the interface between two adjacent body sections, according to one embodiment of the present invention. As shown in FIG. 14, part of the first body section 20 has a hook-like locking block 52 to be engaged with another hook-like locking block 54 on the second body section 30.

Such a design allows the second body section 30 to be slid into the first body section 20 as indicated by the arrow 130. As such, it would not be necessary to move the two adjacent body sections apart when they are packed to form a packed structure. In order to prevent water from leaking into the watercraft through the interface, a sealing part 60 is provided between the two locking blocks 52, 54.

FIGS. 15a to 15c illustrate a locking assembly for securing two adjacent body sections, according to one embodiment of the present invention. As shown in FIGS. 15a to 15c, the first body section 20 has a first locking block 52 and the second body section 30 has a second locking block 54. As shown, a channel 170 is provided in the locking blocks 52 and 54. The two locking blocks 52 and 54 can be secured by a cam locking assembly 70. The cam locking assembly 70 comprises a rod 74 with an arrowhead-like locking blade 72 on one end and a cam locking handle 78 with a locking pin or shaft 79 on the other end. The cam locking assembly 70 is operable in three positions. In the first position as shown in FIG. 15a, the locking blade 72 is prevented from moving through the channel 170. In this position, a thumbscrew or locknut 76 is engaged with a threaded part 77 of the rod 74 and the locking shaft 79 for securing the first body section 20 to the second body section 30. The cam locking handle 78 provides an urging force against the block 55. In the second position as shown in FIG. 15b, with the cam locking handle 78 rotated in a clockwise direction to release the urging force against the block 55, the locknut 76 can be moved away from the locking shaft 79. Now the cam locking handle can be flipped over as shown in FIG. 15c. As such, the locking blade 72 is allowed to be retrieved through the channel 170 so that the first body section 20 and the second body section 30 can be separated from each other as indicated by the arrow 134. Furthermore, the entire locking assembly 70, including the locking blade 72, the rod 74, the thumbscrew 76, the locking shaft 79 and the cam locking handle 78, can be separated from the first body section 220, as indicated by the arrow 134. For sealing the gap between two adjacent body sections, a sealing part 60 having two sealing surfaces 62 and 63 is used, for example.

FIGS. 15d to 15h illustrate a locking assembly for securing two adjacent body sections, according to another embodiment of the present invention. As shown in FIGS. 15d to 15h, a fixedly attached block 81 and a slideable block 83 are used to replace the locking shaft 79 as shown in FIGS. 15a to 15c. When the cam locking assembly 70 is in the locking position, the locknut 76 is engaged with the threaded part 77 of the rod 74 to push the slideable block 83 against the block 55. The cam locking handle 78 provides an urging force against the block 55, as shown in FIGS. 15e and 15f. In the second position as shown in FIGS. 15g and 15h, with the cam locking handle 78 rotated in a clockwise direction to release the urging force against the block 55, the locknut 76 and the slideable block 83 can be moved away from the block 55. As with the embodiment as shown in FIGS. 15a to 15c, the cam locking handle can be flipped over to allow the locking blade 72 to be retrieved through the channel 170 so that the first body section 20 and the second body section 30 can be separated from each other as indicated by the arrow 134 (see FIG. 15c). It should be noted that the fixedly attached block 81 can be cylindrical (with a round cross section) or polygonal (with a polygonal cross section). Likewise, the inner part of the slideable block 83 can be dimensioned accordingly.

The cam locking assembly 70 can also be used to secure two adjacent body sections as shown in FIG. 14. Now referring to FIGS. 16, and 17a-17e, the locking blade 72 is engaged with the locking block 52 and the rod 74 is engaged in the locking block 54. In addition, the first body section 20 also has a locking block 56 to be engaged with the thumbscrew 76 for securing the first and second body sections together. As shown in FIGS. 17a-17e, the locking block 52 on the first body section 20 has a first chamber 152 dimensioned to accommodate the locking blade 72, and the locking block 54 on the second body section 30 has a first chamber 154 dimensioned to accommodate the locking blade 72.

As with the embodiment as shown in FIGS. 15a and 15b, the cam locking assembly 70 is operable in the first position and in the second position. As shown in FIG. 17a, the cam locking assembly is operated in the first position in that the locking blade 72 is prevented from moving out of the first chamber 152 through the channel 170. In this position, a thumbscrew or locknut 76 can be adjusted against the locking block 56 for securing the second body section 30 to the first body section 20 (see FIG. 16). As shown in FIG. 17b, the cam locking assembly in the second position in that the locking blade 72 is turned side-wide so that the locking blade 72 is allowed to move out of the first chamber 152 through the channel 170. FIG. 17c shows that the locking blade 72 has moved into the second chamber 154. If the cam locking assembly is changed from the second position to the first position as shown in FIG. 17d, the locking blade 72 is prevented from moving out of the second chamber 154. As such, it is possible to pull the locking block 54 away from the locking block 52 so that the second body section 30 is moved toward the first body section 20 for packing as indicated by the arrow 130 (see also FIG. 16).

It should be noted that the separation of the various body sections and the assembling of the body sections into an assembled structure or a packed structure can be carried out by one or more movement means, such as motors. For example, after the locking blocks 52, 54 have been released from the cam locking assembly 70 (see FIG. 16), a motor 190 can be used to move the locking block 54 away from the locking block 52 so that the second body section 30 is moved toward the first body section 20 for packing as indicated by the arrow 130, as shown in FIG. 18.

FIG. 19a shows three adjacent body sections of a sectional watercraft, similar to those shown in FIG. 14. As shown in FIG. 19a, the three adjacent body sections are sections 28, 29 and 30. Part of the body section 28 has a locking block 51 to be engaged with a locking block 53 of the body section 29. Part of the body section 29 has a locking block 52 to be engaged with a locking block 54 of the body section 30. As such, the body section 30 can be slid into the body section 29, which can also be slid into the body section 28 to form a packed structure, for example. In one embodiment of the present invention, two adjacent body sections are linked with foldable arms for packing purposes. As shown in FIG. 19b, the body sections 29, 30 are linked by a pair of foldable arms 143, 144 and the body sections 28, 20 are linked by a pair of foldable arms 141, 142. When the foldable arms 143, 144 are moved along the direction 163, the body section 30 can be moved toward the body section 29 along the direction 130. Likewise, when the foldable arms 141, 142 are moved along the direction 161, the body section 29, together with body section 30, can be moved toward the body section 28 along the direction 131. FIGS. 19c and 19d show how the body section 30 is further moved into the body section 29. It should be noted that the folding of the arm pair 141, 142 and the arm pair 143, 144 can be carried out by a motor or other movement means.

In a different embodiment of the present invention, two adjacent body sections are clamped by a locking clamp when the watercraft is in an assembled structure. The locking clamp can be released so as to separate the two adjacent body sections one from another, when needed. To illustrate this different embodiment, the two adjacent body sections 20 and 30 as shown in FIGS. 1 and 2 are used to demonstrate how the locking clamp can be applied on these two body sections. As shown in FIG. 20*a*, the first body section 20 has a mating block 37 to face with a mating block 35 of the second body section 30. Mating block 35 is substantially flush with the exterior surface 322 of the second body section 30 but extended further into the interior of the second body section 30 as indicated by the interior surface 320. Likewise, mating block 37 is substantially flush with the exterior surface 222 of the first body section 20 but extended further into the interior of the first body section 20 as indicated by the interior surface 220. The interior sides of mating blocks 35 and 37 provide a surface 39 to support a locking clamp 180 as shown in FIGS. 20*b* and 20*c*. Mating block 35 has a first end 351 and an opposing second end 352. Mating block 37 has a first end 371 and an opposing end 372. The second end 352 of mating block 35 has a tongue configured to be engaged with a groove on the second end 372 of mating block 37. A sealing part 60, which can be a neoprene O-ring, for example, is secured between the tongue and the groove. As shown in FIGS. 20*b* and 20*c*, a latch bracket 191 is secured to the first end 351 of mating block 35 and a clamp mount 193 is secured to the first end 371 of mating block 37. As shown in FIG. 20*c*, locking clamp 180 has two clamp parts 182, 184 rotatably connected to each other by a pin 186. As shown in FIGS. 20*c* to 20*g*, clamp part 184 is rotatably mounted on clamp mount 193 by a pivot 188. Clamp part 182 has two opposing ends, one end is connected to clamp part 184 and the other end has a locking cup 183 configured to be engaged with latch bracket 191 via a tension adjustment screw 189. Clamp part 184 has a folded section 185 adjacent to clamp mount 193. When locking clamp 180 is used to keep mating blocks 35 and 37 in a locked position, clamp part 182 is lowered so that locking cup 183 is fully engaged with latch bracket 191. As clamp part 184 is pushed toward the interior surface 222 of the first body section 20, folding section 185 presses against mating block 37 while clamp part 182 rests on surface 39 as shown in FIG. 20*c*. With tension adjustment screw 189 being properly adjusted, clamp part 184 applies an urging force on mating block 37 against mating block 35 so as to keep the first body section 20 and the second body section 30 in a locked position.

To separate the first body section 20 from the second body section 30, clamp part 184 is rotated away from the interior surface 220 so as to disengage locking cup 183 of clamp part 182 from latch bracket 191, as shown in FIG. 20*d*. Clamp part 182 can then be rotated further away from surface 39 toward clamp part 184 as shown in FIG. 20*e*. As both clamp parts 182 and 184 are lowered towards the interior surface 222 as shown in FIG. 20*f*, clamp part 182 can be used to pull mating part 37 away from mating part 35, as shown in FIG. 20*g*.

Figure 21:
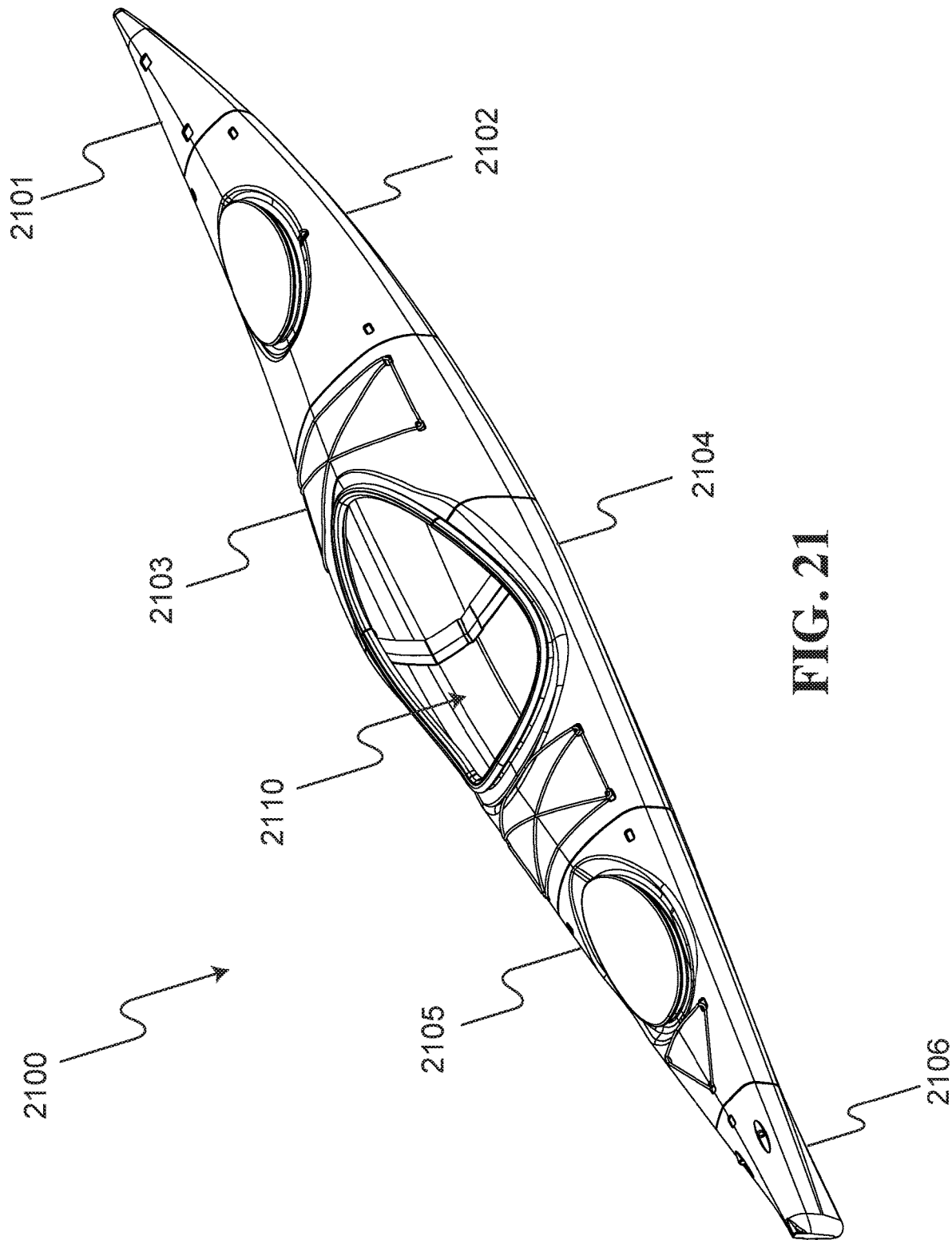
FIG. 21 is a perspective view of a kayak assembled from kayak components.

FIG. 21 is a perspective view of an exemplary watercraft having more than the five separable body sections of FIG. 12*a*. In the illustrated embodiment of FIG. 21, a kayak 2100 is shown as having been assembled from six separable body sections or components 2101, 2102, 2103, 2104, 2105, 2106, numbered respectively from right to left. The illustrated embodiment shows a kayak with a single cockpit 2110 but could take another form such as a kayak with two cockpits or a larger cockpit to fit more than one person, a catamaran section configured as a kayak, or even a canoe with an elongated opening along the entire length with gunwales along top side bulwarks defining the opening.

FIG. 22 is a right side view of the assembled kayak of FIG. 21.

FIG. 23 is a left side view thereof.

Figure 24:
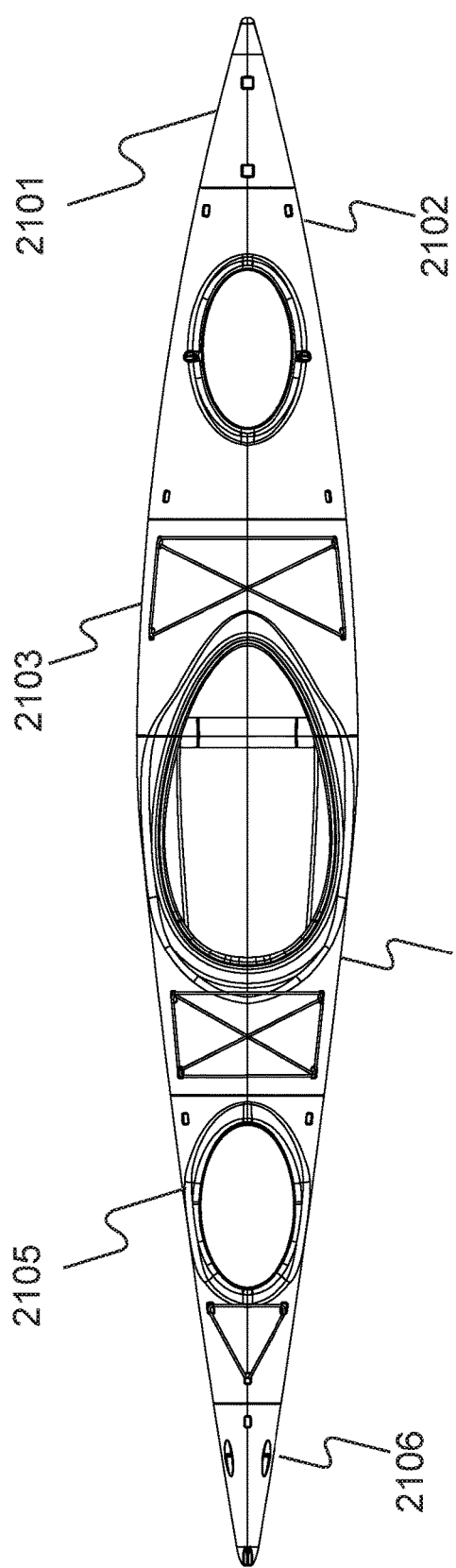
FIG. 24 is a top view thereof.

FIG. 24 is a top view thereof.

Figure 25:
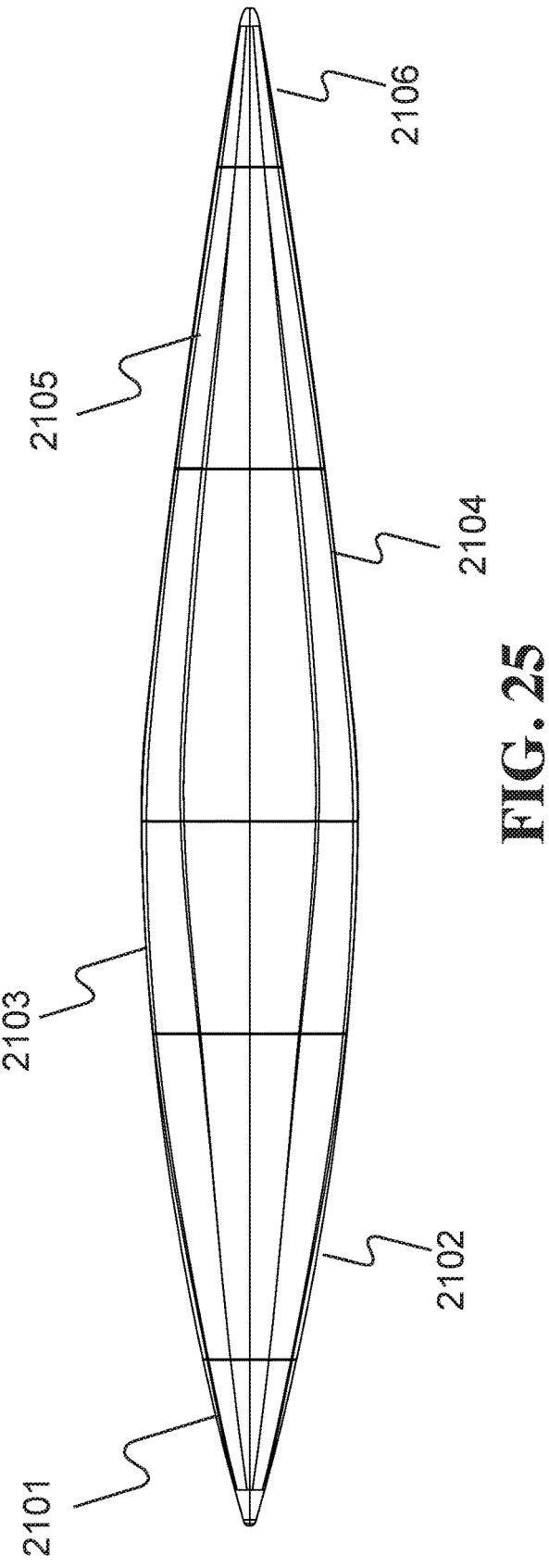
FIG. 25 is a bottom view thereof.

FIG. 25 is a bottom view thereof.

Figure 26:
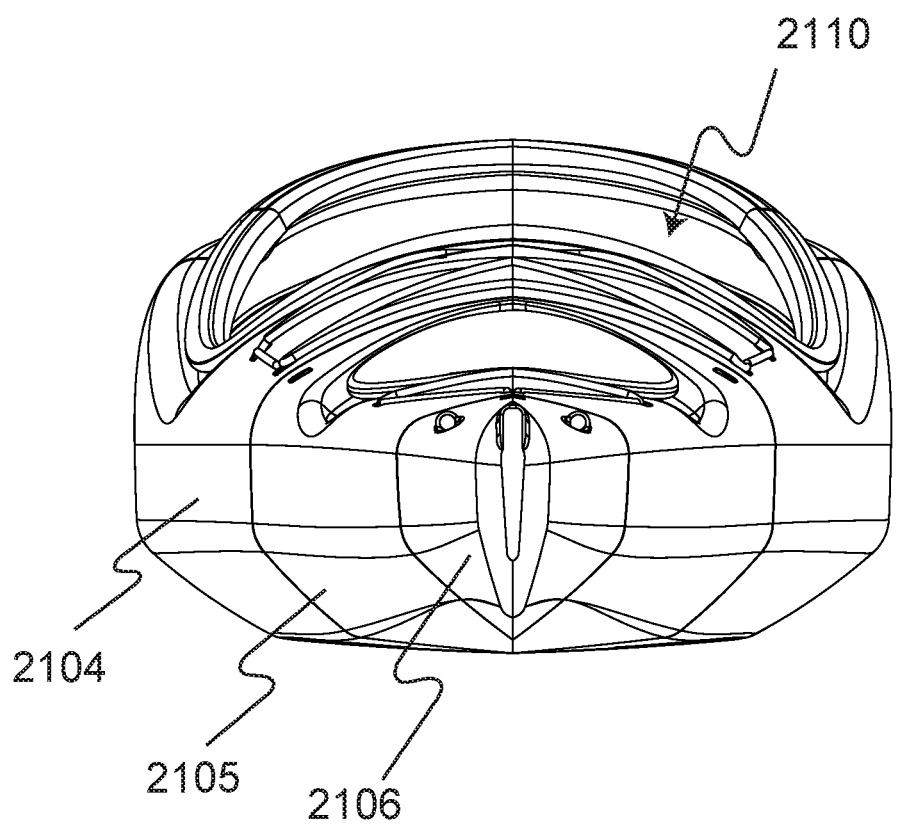
FIG. 26 is a stern view thereof.

FIG. 26 is a stern view thereof.

Figure 27:
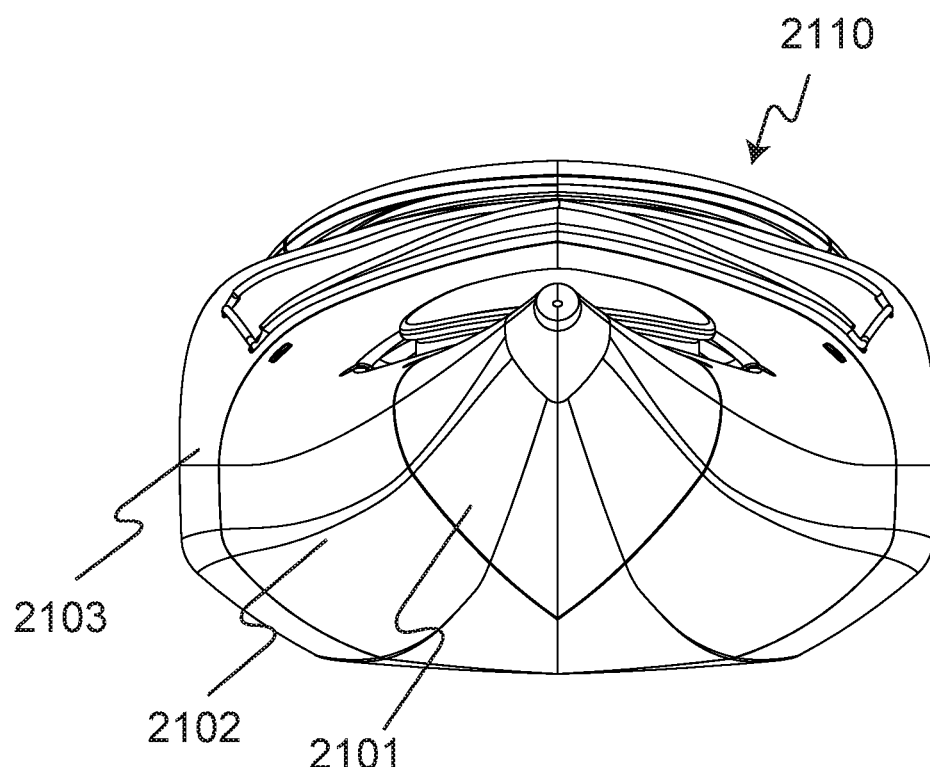
FIG. 27 is a bow view thereof.

FIG. 27 is a bow view thereof.

Figure 28:
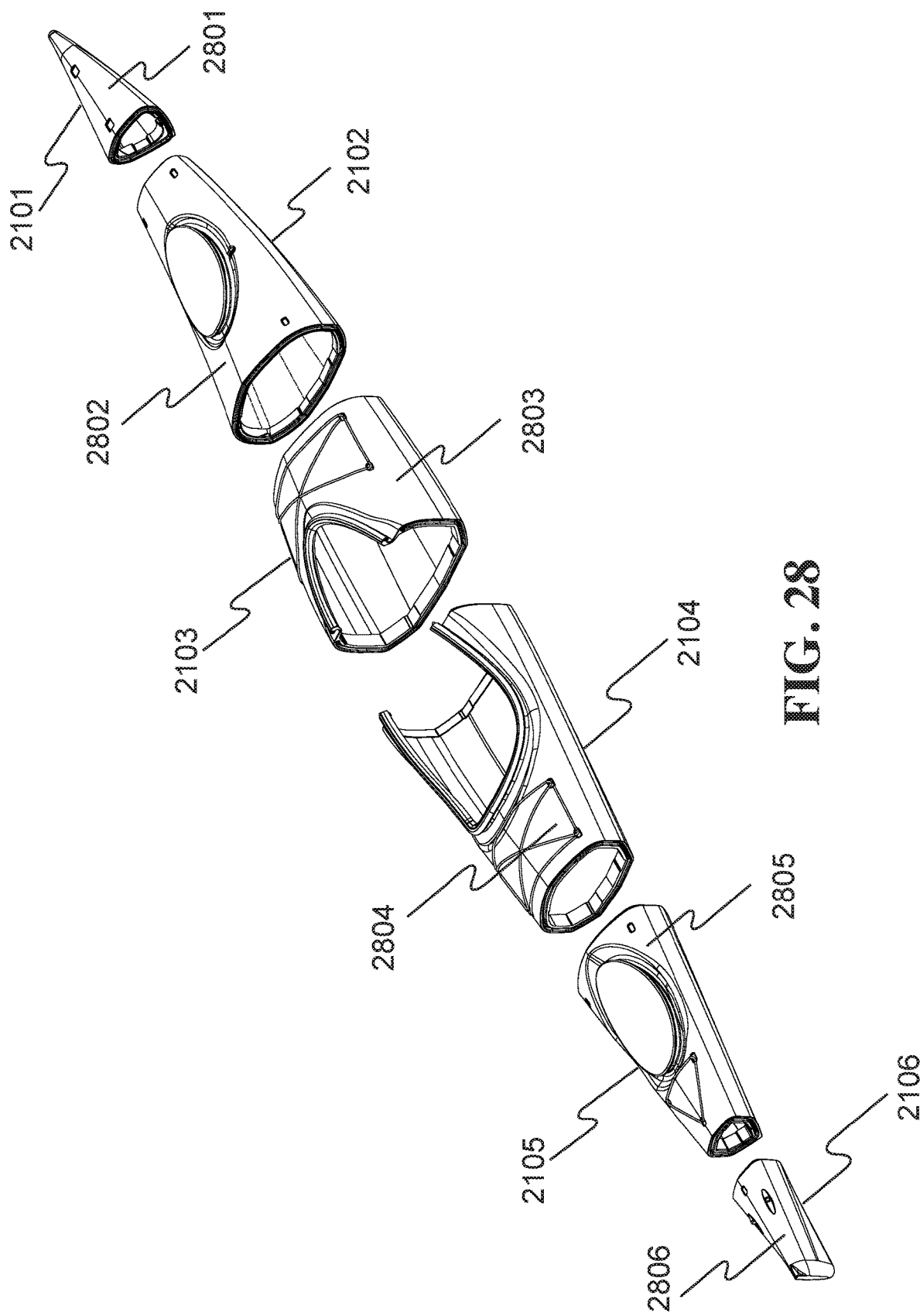
FIG. 28 is an exploded perspective view of the kayak of FIG. 21 showing the kayak components disassembled in order of assembly.

FIG. 28 is an exploded perspective view of the kayak of FIG. 21 showing the kayak body sections or components disassembled in order of assembly. The six body sections each have an exterior surface and at least one opening defining a cavity having an inner surface within the given body section. For instance, FIG. 28 shows exterior surfaces 2801, 2802, 2803, 2804, 2805, and 2806 associated with the first, second, third, fourth, fifth, and sixth body sections 2101, 2102, 2103, 2104, 2105, and 2106, respectively.

Figure 29:
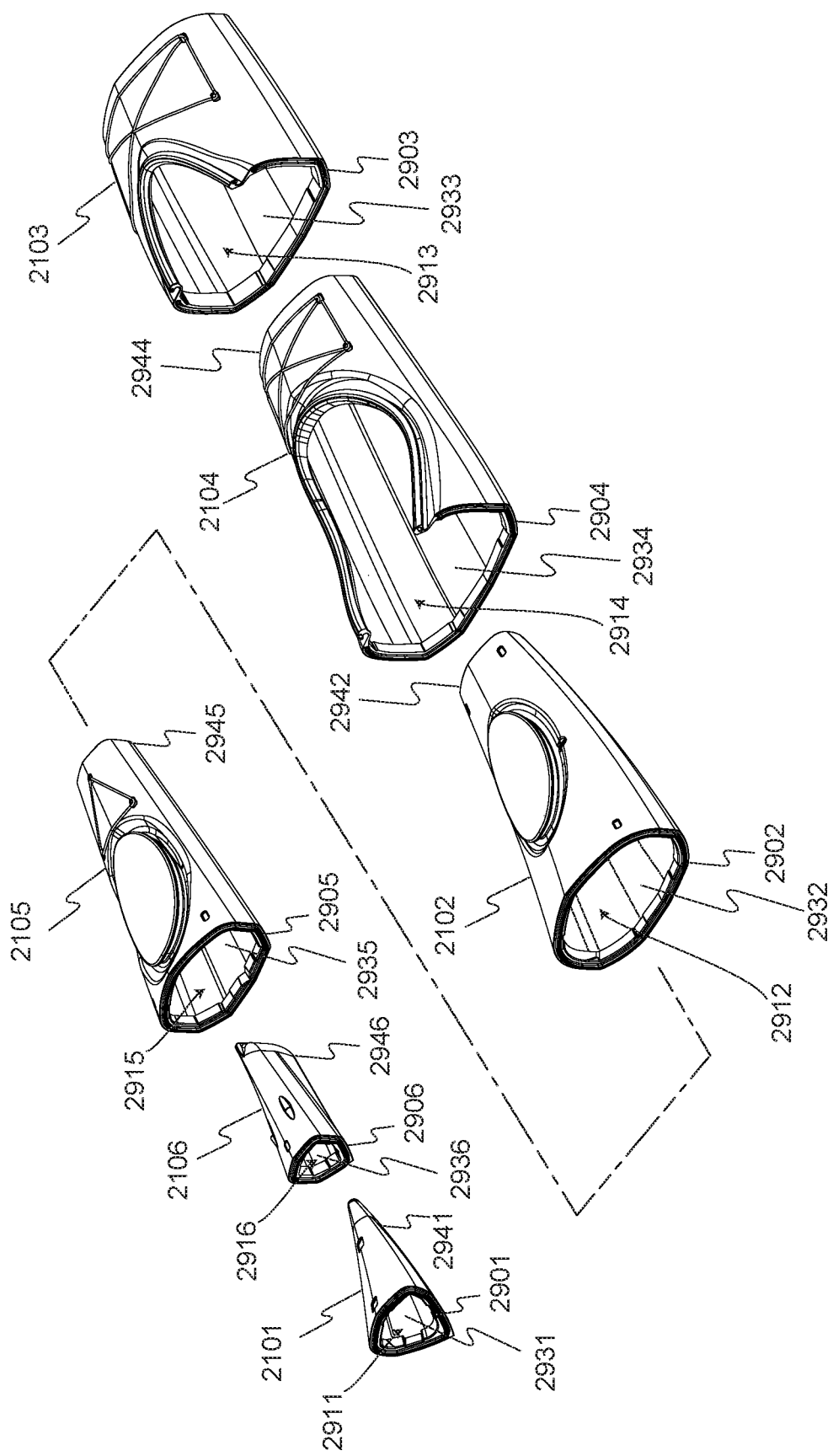
FIG. 29 is an exploded perspective view showing the kayak components of FIG. 28 rearranged in order of packing.

FIG. 29 is an exploded perspective view showing the kayak components of FIG. 28 rearranged in order of packing. The body sections are arranged with the third, fourth, second, fifth, sixth, and first body sections 2103, 2104, 2102, 2105, 2106, 2101 in respective right to left packing order with respective insertion ends 2944, 2942, 2945, 2946, 2941 pointing to the right and aimed for insertion through openings 2903, 2904, 2902, 2905, 2906 into cavities 2913, 2914, 2912, 2915, 2916 of the respective body sections 2103, 2104, 2102, 2105, 2106. The fourth, fifth, and sixth body sections 2104, 2105, 2106 are turned around, i.e., rotated one hundred and eighty degrees from the orientation shown in FIG. 28. The other three sections 2103, 2102, 2101 keep the same orientation. The right to left rearrangement of the six body sections 2103, 2104, 2105, 2102, 2106, 2101 of FIG. 29 each have the at least one respective opening 2903, 2904, 2902, 2905, 2906 defining a respective cavity 2913, 2914, 2912, 2915, 2916, 2911 having a respective inner surface 2933, 2934, 2932, 2935, 2936, 2931 within the given body section. Each cavity as shown from right to left is receptive through a respective opening 2903, 2904, 2902, 2905, 2906 to insertion of a body section to its left so that the inner surfaces of cavities 2913, 2914, 2912, 2915, 2916 of the respective body sections 2103, 2104, 2102, 2105, 2106 face respective exterior surfaces 2804, 2802, 2805, 2806 of respective body sections 2104, 2102, 2105, 2106, 2101. When packed as shown in the order shown in FIG. 29, a packed kayak configuration results, as is shown in FIGS. 30-36. Of course, the body sections may be nested with each other as shown in any order as long as the overall order of FIG. 29 is used. For instance, section 2102 may first be inserted in section 2104. Section 2101 might then be inserted in section 2106. Section 2105 might then be inserted in the cavity 2912 of section 2102 which is already packed in the cavity 2914 of section 2104. The packed sections 2101, 2106 may then be inserted into the cavity 2915 of section 2105 which is already packed into sections 2102, 2104. The packed sections 2101, 2106, 2105, 2102, 2104 may then be inserted into the cavity 2913 of section 2103 to form the packed configuration 3000 shown in FIGS. 30-36. Regardless of the sequence in which they are packed, the end result is that they are packed into the packed structure in third, fourth, second, fifth, sixth, and first body section order or, equivalently looked at from the opposite direction, the reverse order.

Figure 30:
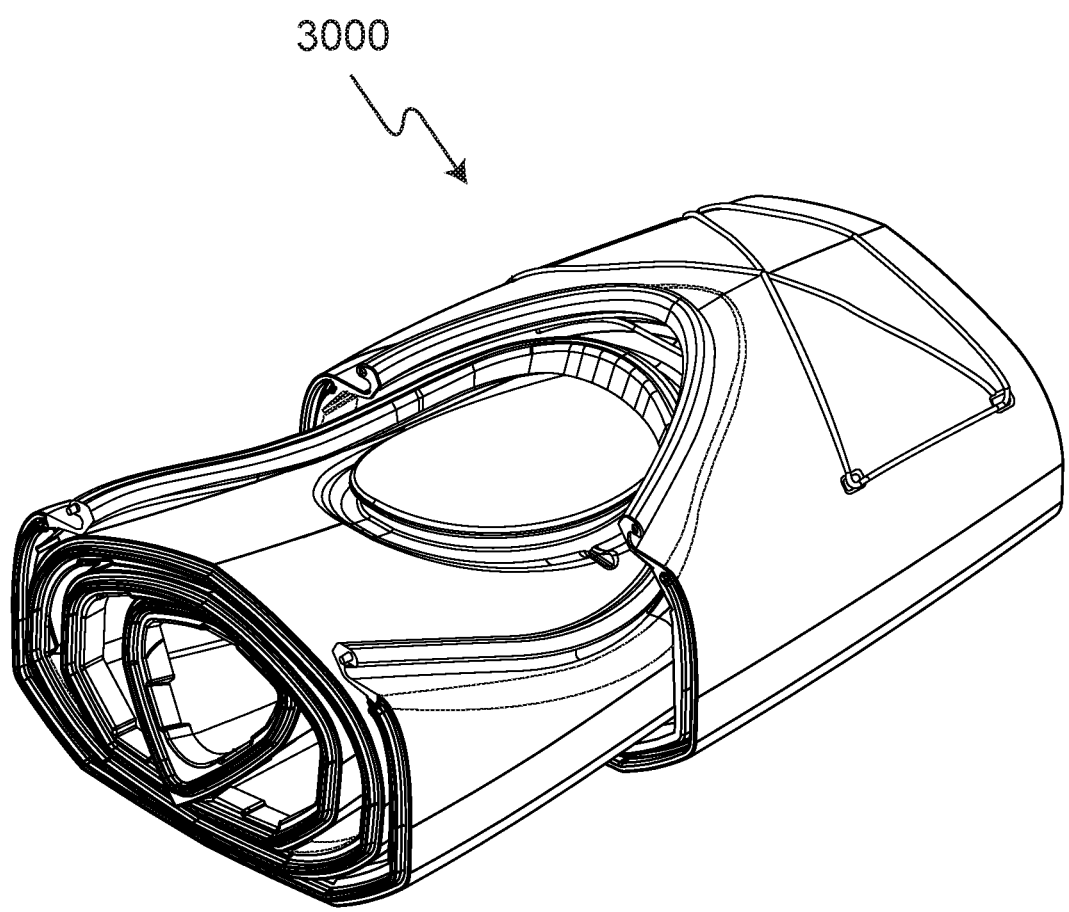
FIG. 30 is a perspective view of the kayak components of FIG. 29 assembled in a packed kayak configuration.
Figure 31:
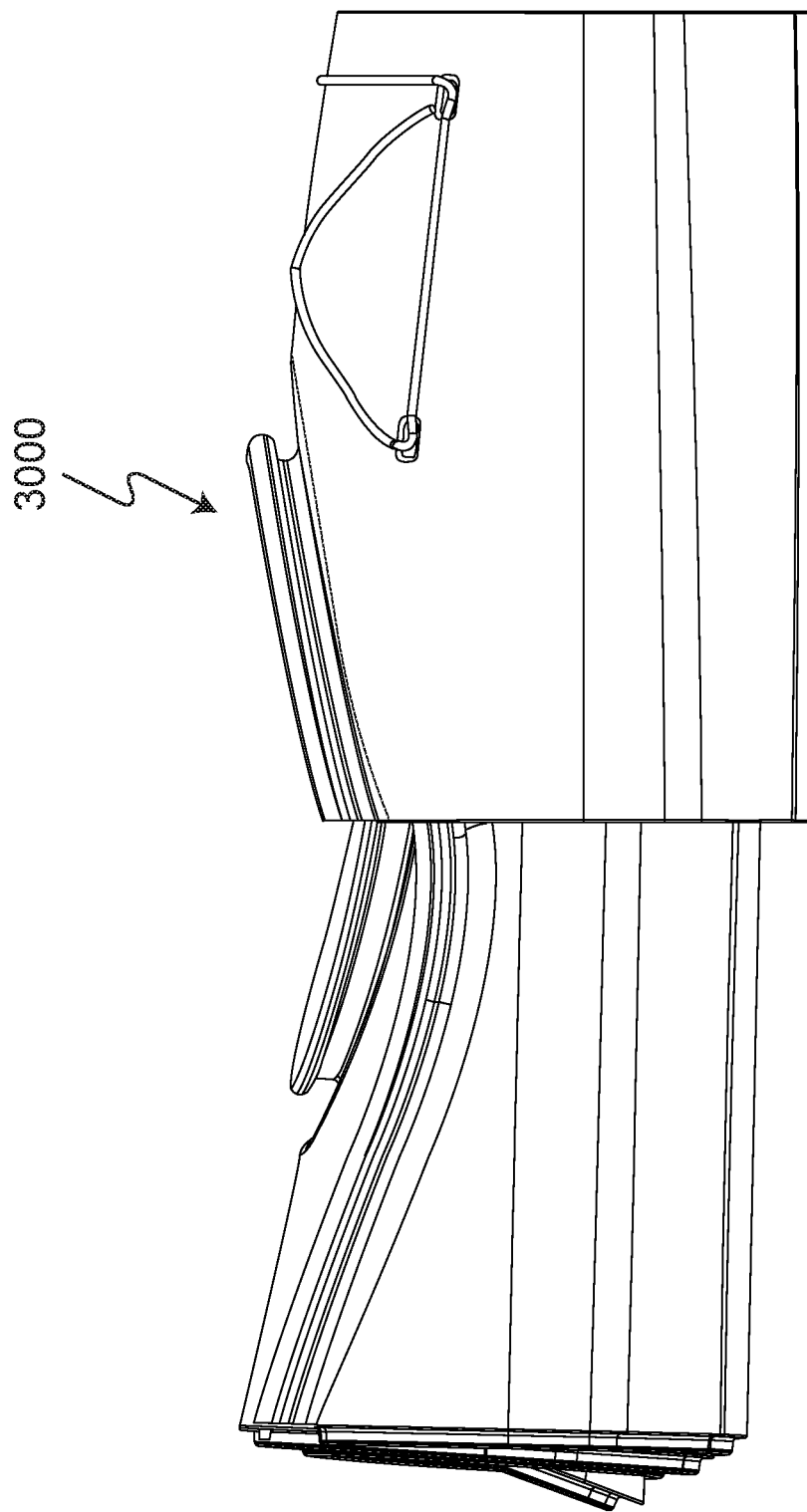
FIG. 31 is a right side view of the packed kayak configuration of FIG. 30.
Figure 32:
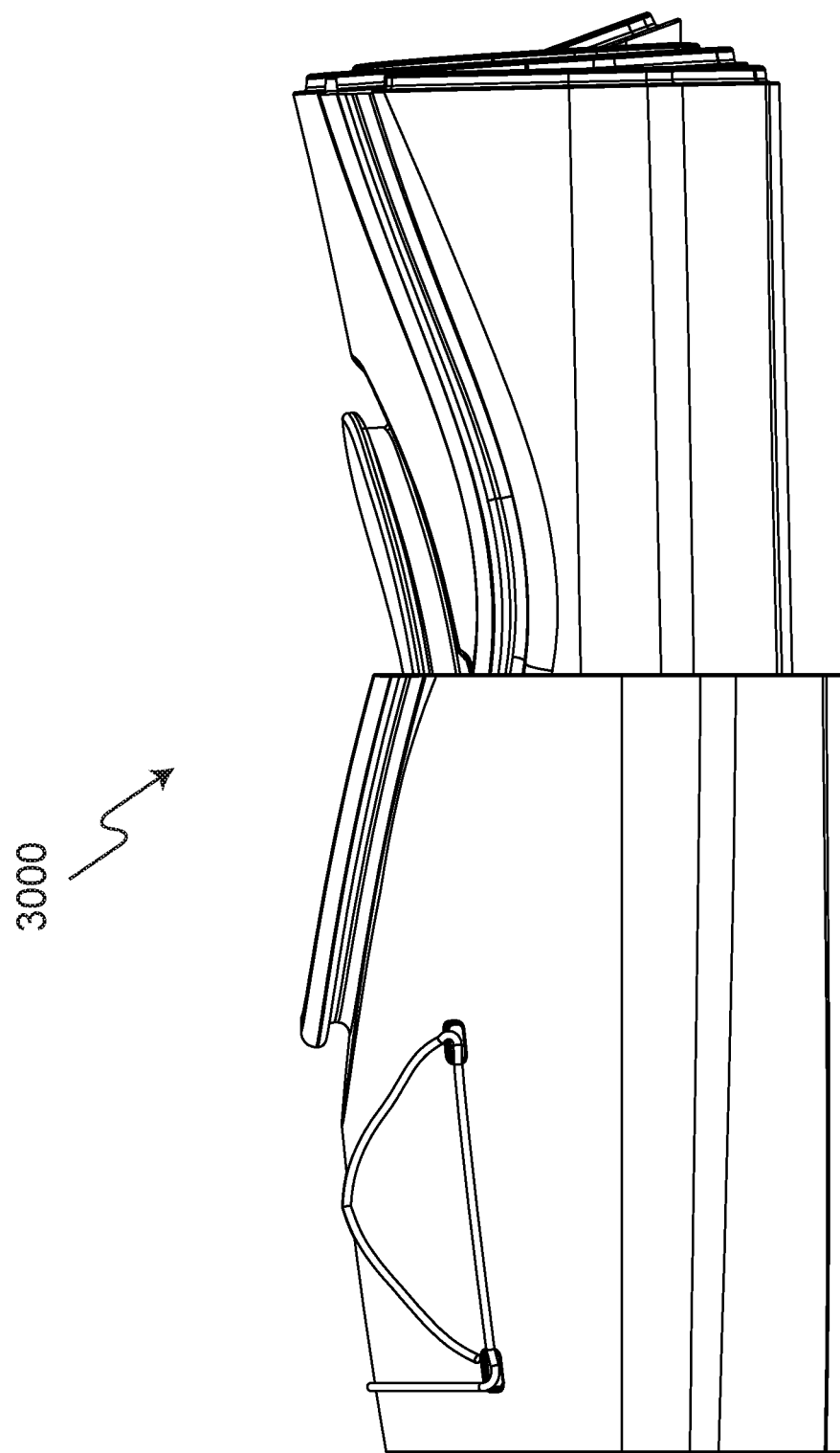
FIG. 32 is a left side view thereof.
Figure 33:
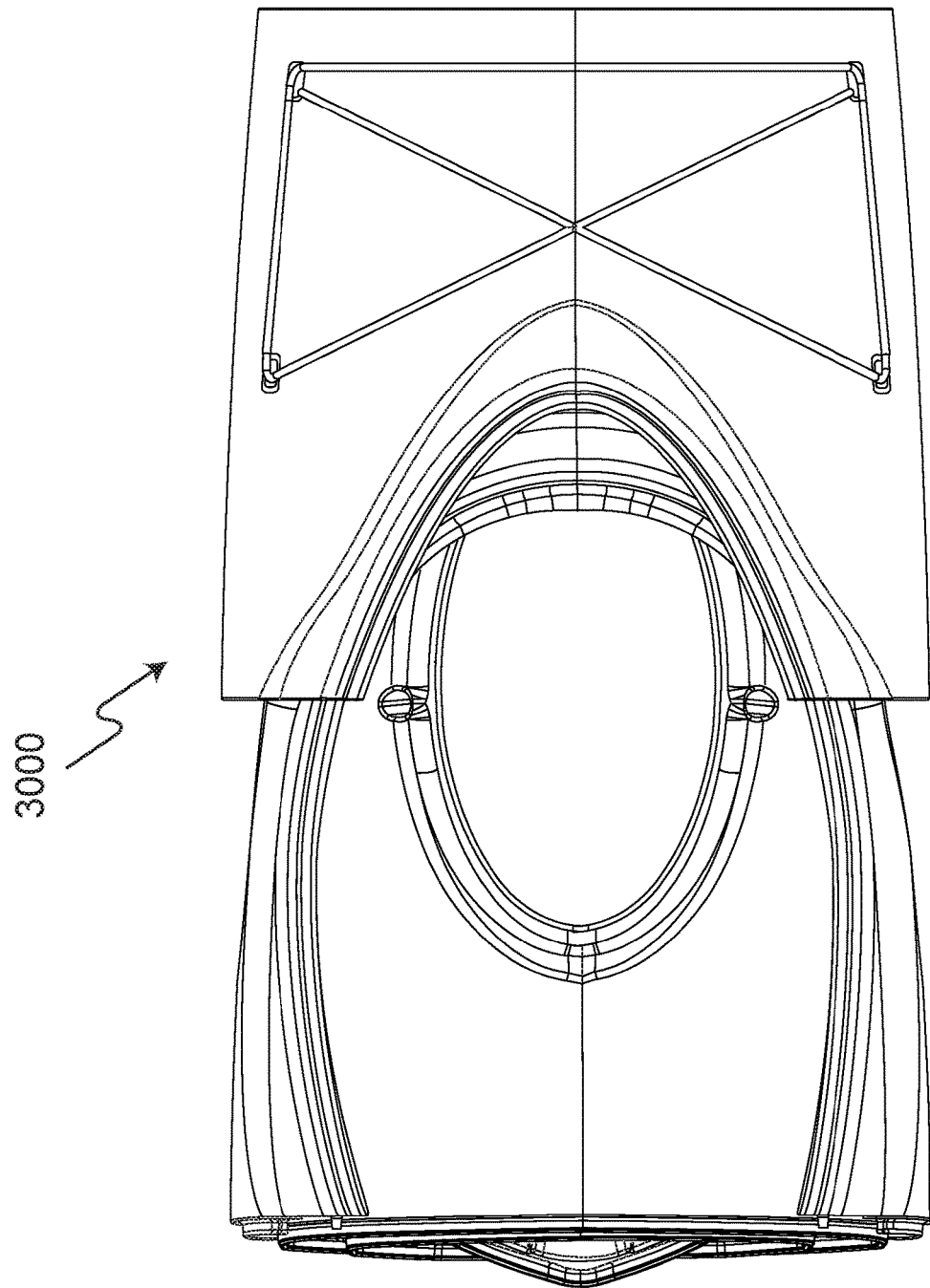
FIG. 33 is a top view thereof.
Figure 34:
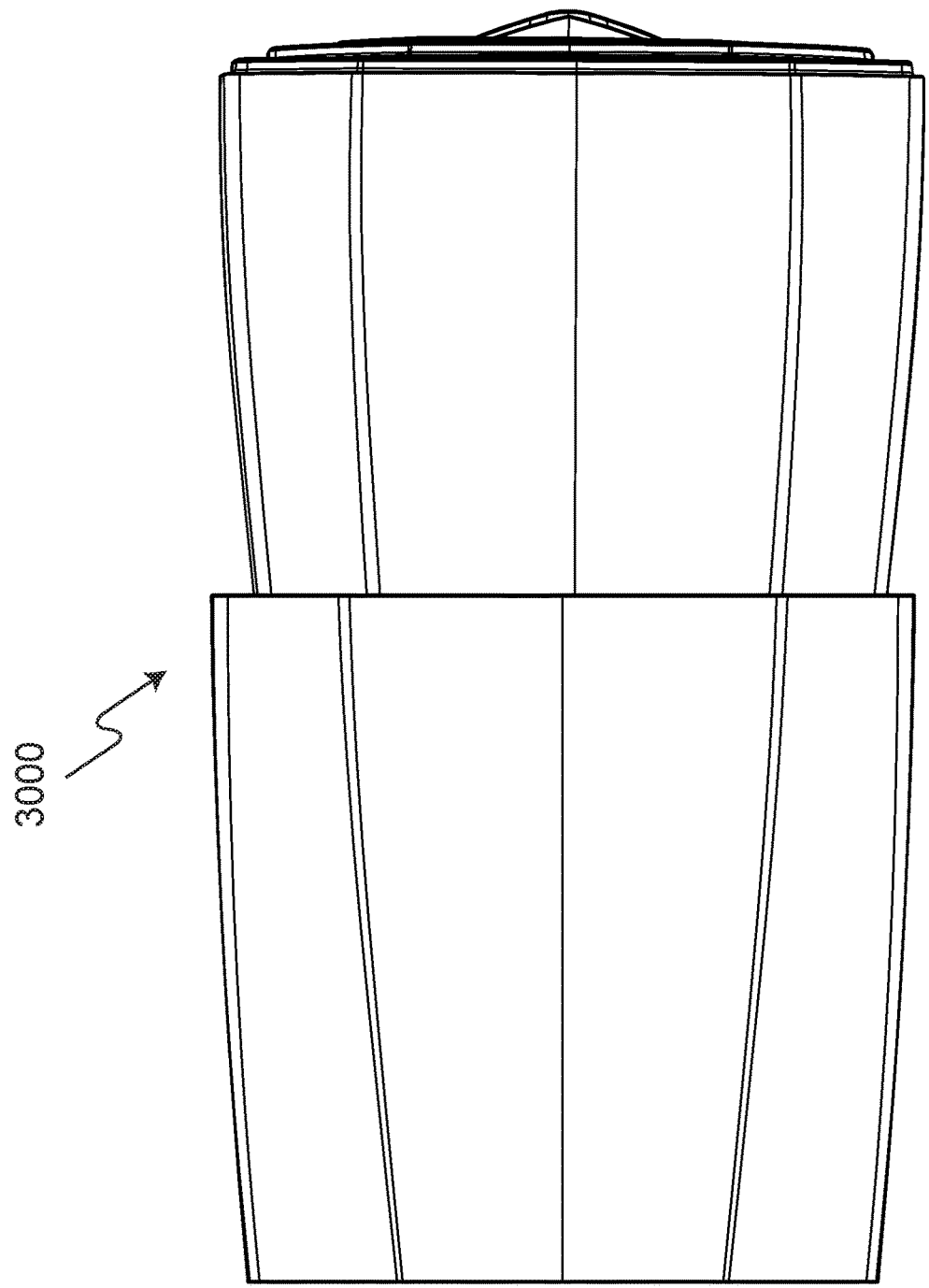
FIG. 34 is a bottom view thereof.
Figure 35:
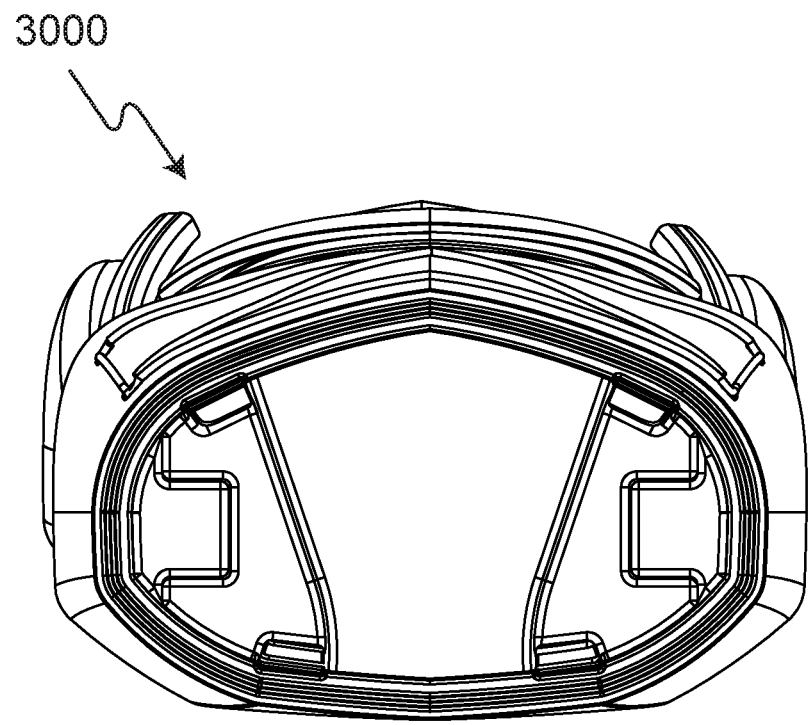
FIG. 35 is a rear view thereof.
Figure 36:
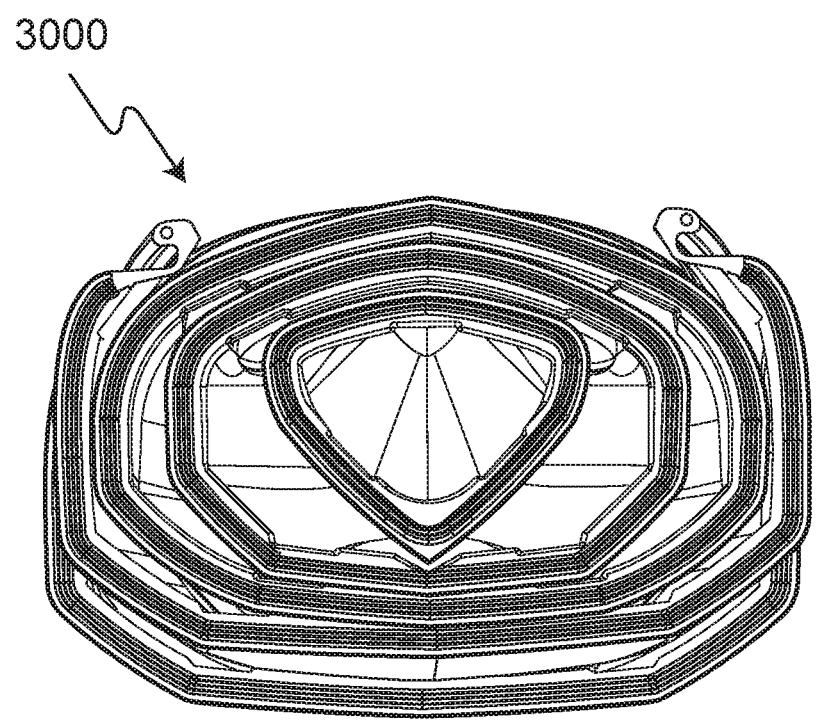
FIG. 36 is a front view thereof.

FIG. 30 is a perspective view of the kayak body sections or components of FIG. 29 assembled in the packed kayak configuration 3000;

FIG. 31 is a right side view of the packed kayak configuration of FIG. 30;

FIG. 32 is a left side view thereof;

FIG. 33 is a top view thereof;

FIG. 34 is a bottom view thereof;

FIG. 35 is a rear view thereof; and FIG. 36 is a front view thereof.

Thus, according to various embodiments of the present invention, the watercraft has two or more body sections. In some of the embodiments, two adjacent body sections are taken apart before the smaller one of the adjacent sections can be placed into the larger one. In some of the embodiments, two adjacent body sections can be packed into a smaller size without being taken apart. Likewise, when the watercraft has three or more body sections, it is also possible to slide the sections on the two ends inward to form a packed size without being taken apart. But there are many more ways to pack the body sections, depending upon how the body sections are dimensioned.

Referring back to FIG. 14, the sections may be held together by at least one latching device. A latching device, according to an embodiment of the present invention, has a latch unit and a striker unit to be separately mounted on or embedded in the two sections to be joined together so as to be drawn toward each other for engagement by the user.

Figure 37A:
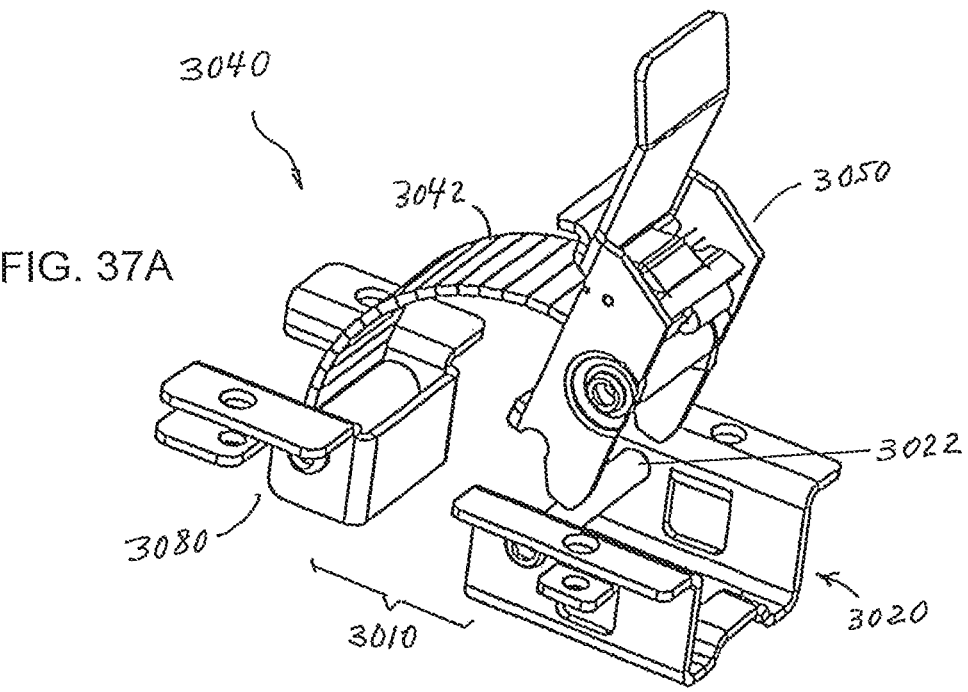
FIG. 37A is a trimetric view of a latching device, according to an embodiment of the present invention.
Figure 37B:
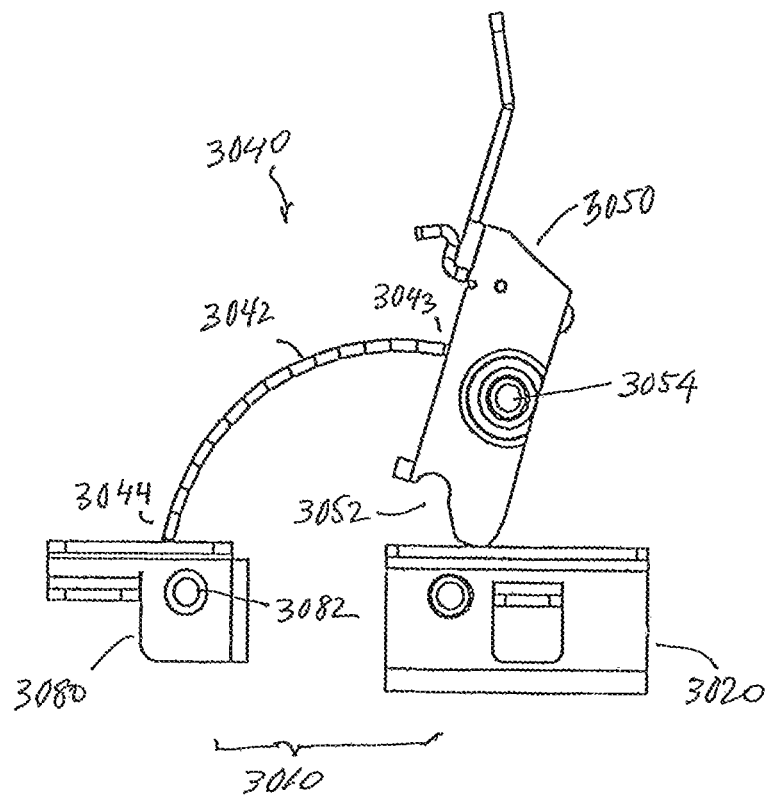
FIG. 37B is a side view of the latching device.

FIG. 37A is a trimetric view of such a latching device 3010, according to an embodiment of the present invention and FIG. 37B is a side view of the latching device 3010. As seen in FIGS. 37A and 37B, the latching device 3010 has a striker unit 3020 and a latch unit 3040, separable from each other. The striker unit 3020 has a striker 3022. The latch unit 3040 has a latch support 3050, a spring mount 3080 and a band spring 3042. The band spring 3042 has a first spring end 3043 and a second spring end 3044. The latch support 3050 has a first shaft 3054 and a latch 3052 dimensioned to engage with the striker 3022. The first shaft 3054 is configured for rotatably mounting the first spring end 3043 of the band spring 3042. The spring mount 3080 has a second shaft 3082 configured for rotatably mounting the second spring end 3044 of the band spring 3042.

Figure 38A:
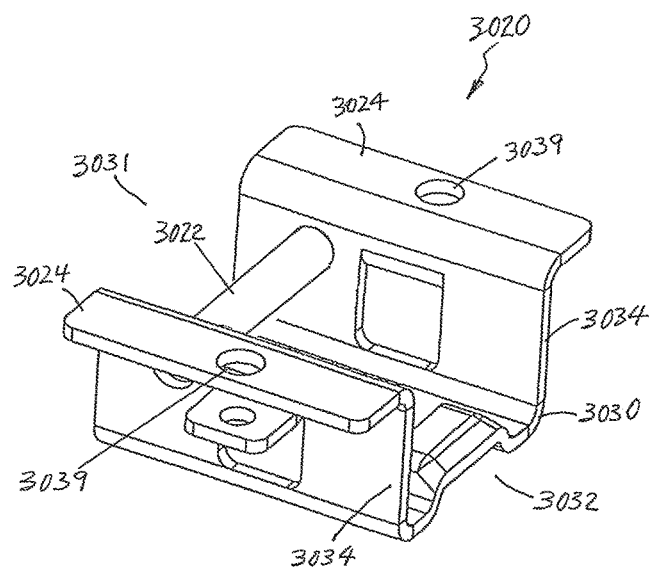
FIG. 38A is a trimetric top view of the striker unit, according to an embodiment of the present invention.
Figure 38B:
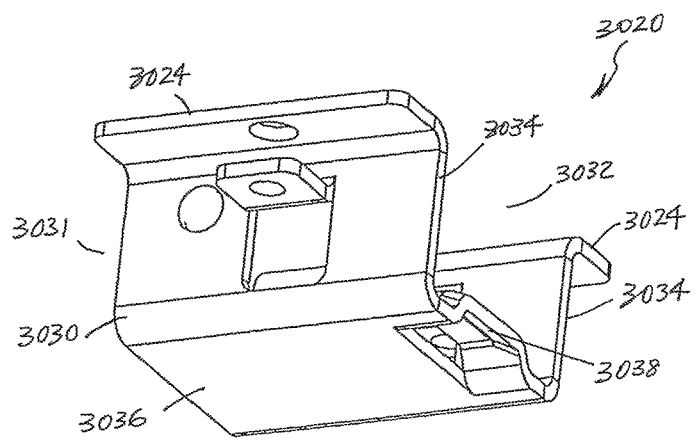
FIG. 38B is a trimetric bottom view of the striker unit.

FIG. 38A is a trimetric top view of the striker unit, according to an embodiment of the present invention, and FIG. 38B is a trimetric bottom view of the striker unit. As seen in FIGS. 38A and 38B, the striker unit 3020 has a channel plate 3030 formed from two spaced-apart channel walls 3034 and a connecting plate 3036. The channel plate 3030 has a first channel end 3031 and a second channel end 3032. The channel plate 3030 is dimensioned to receive the latch support 3050 (see FIG. 37A) between the channel walls 3034. The striker 3022 is mounted on the channel walls 3034 near the first channel end 3031. The striker unit 3020 has a catch 3038 formed on the connecting plate 3036 near the second channel end 3032. The striker unit 3020 also has two mounting pads 3024, each of which has a mounting hole 3039 for mounting the striker unit 3020 to a surface.

FIGS. 39A to 39G are different views of the latch unit, according to embodiment of the present invention.

Figure 39A:
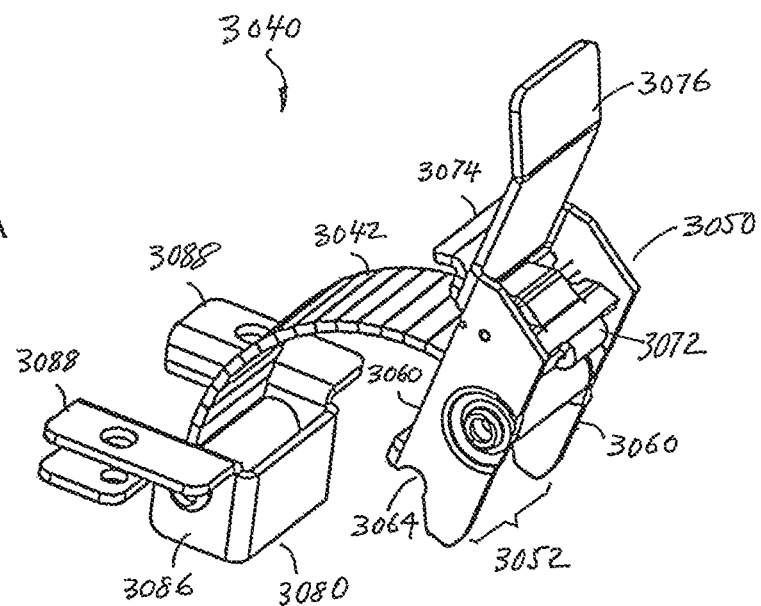
FIG. 39A is a trimetric view of the latch unit, according to an embodiment of the present invention.
Figure 39B:
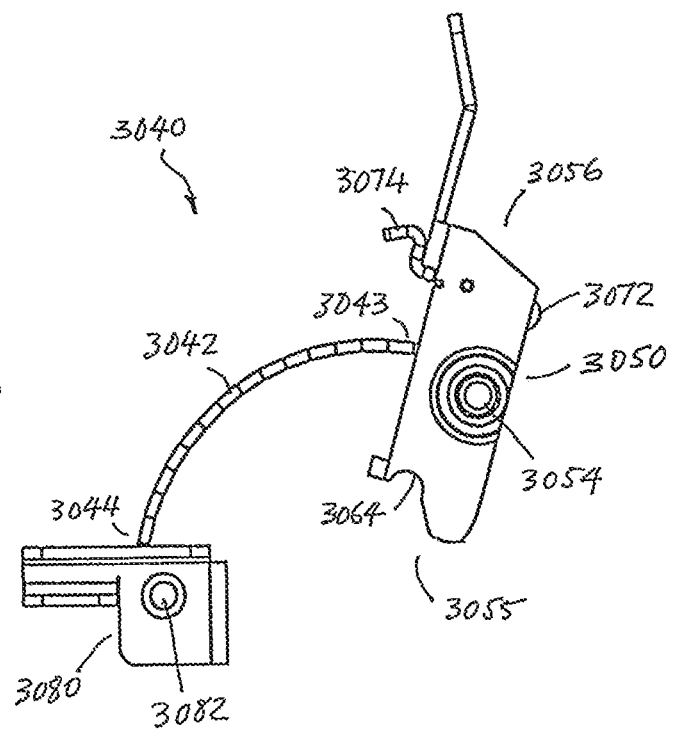
FIG. 39B is a side view of the latch unit.
Figure 39C:
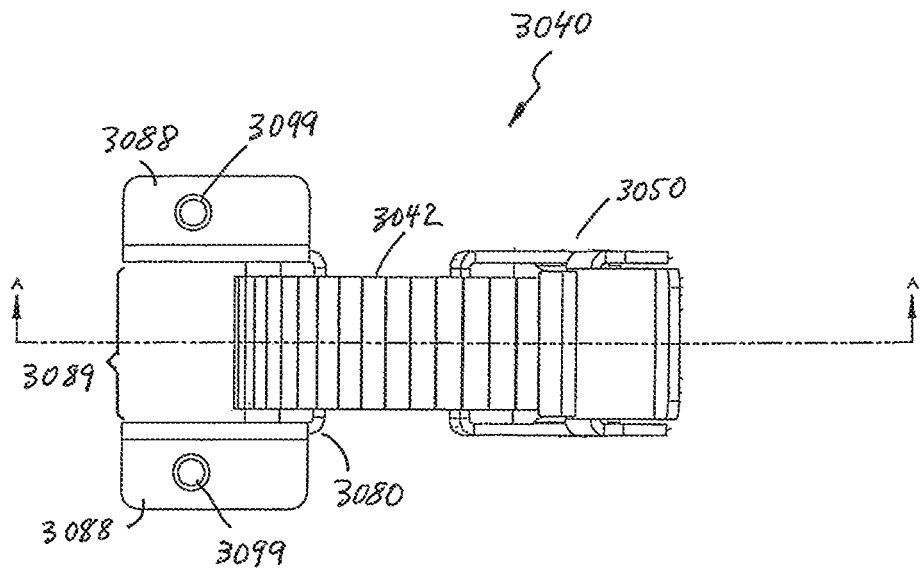
FIG. 39C is a top view of the latch unit.
Figure 39D:
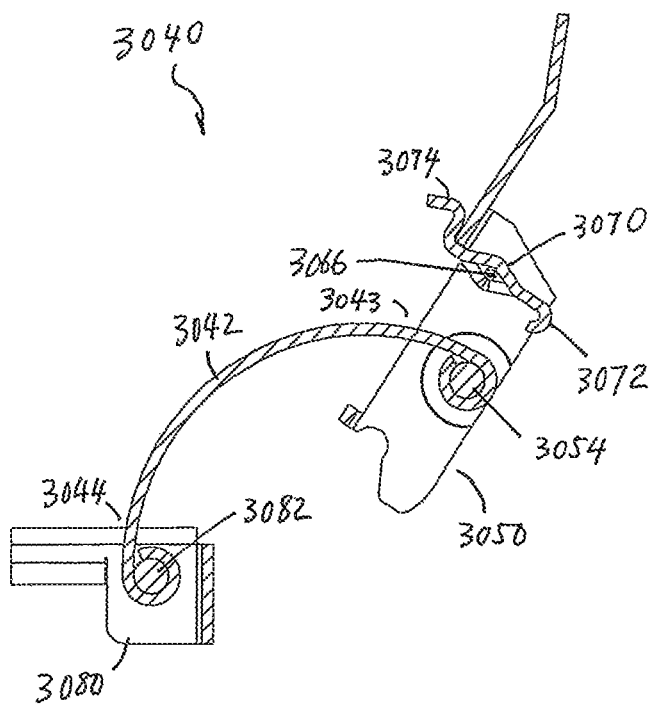
FIG. 39D is a cross sectional view of the latch unit.
Figure 39E:
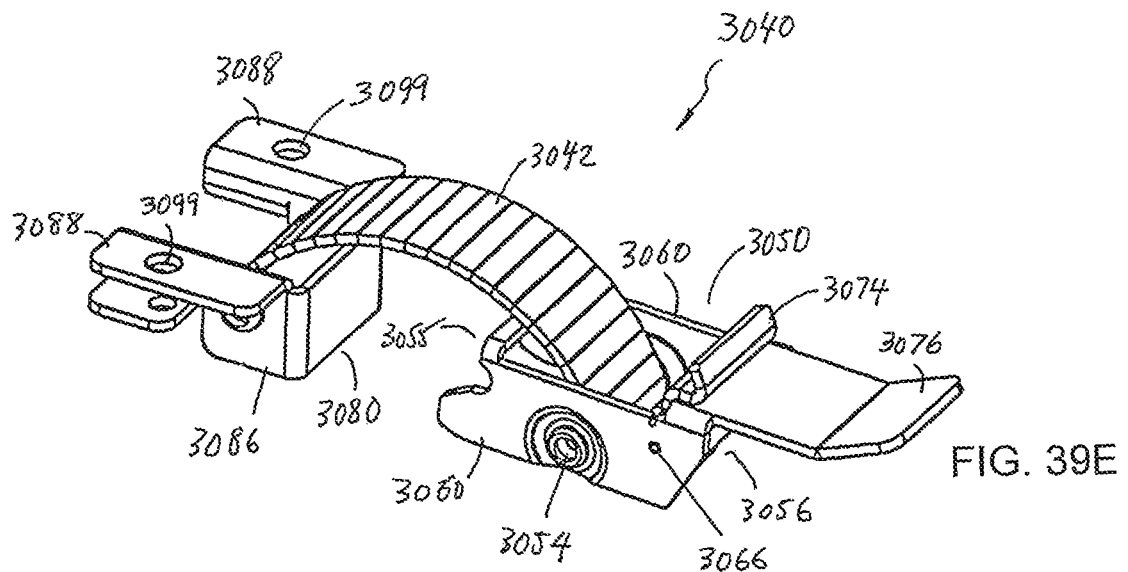
FIG. 39E is another trimetric view of the latch unit.
Figure 39F:
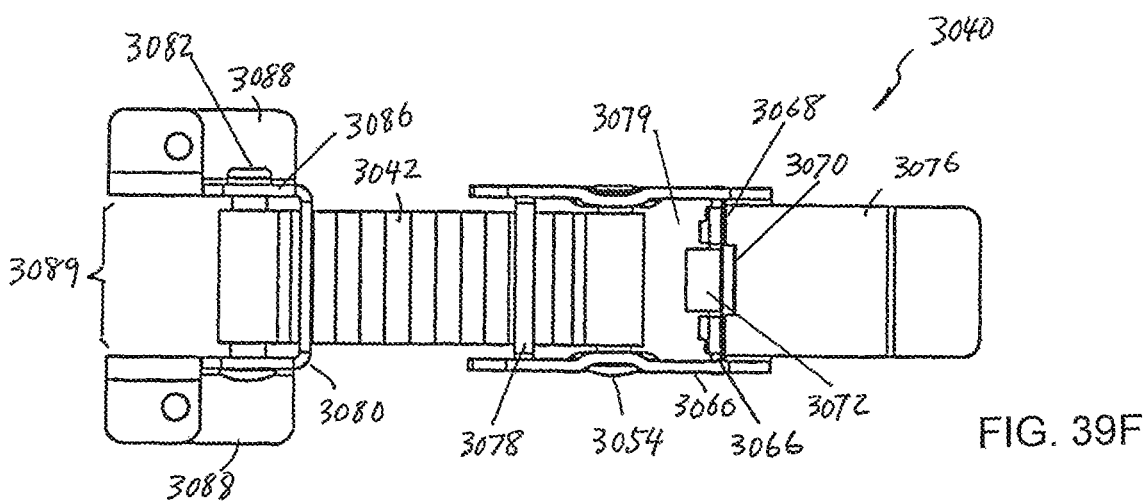
FIG. 39F is a bottom view of the latch unit.
Figure 39G:
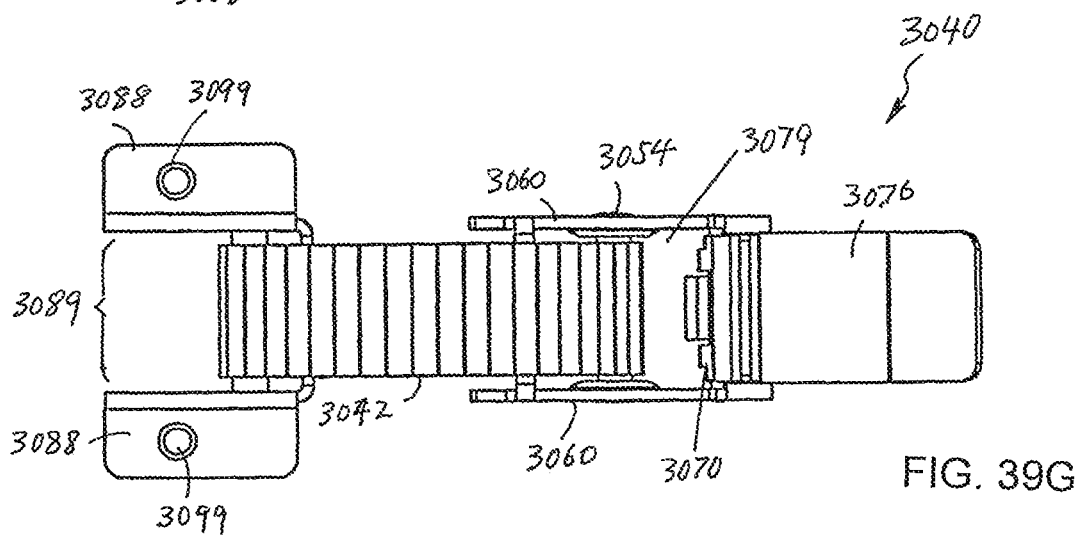
FIG. 39G is a top view of the latch unit as shown in FIG. 39E.

FIG. 39A is a trimetric view of the latch unit 3040, according to an embodiment of the present invention; FIG. 39B is a side view of the latch unit, FIG. 39C is a top view of the latch unit and FIG. 39D is a cross sectional view of the latch unit 3040. FIG. 39E is a different trimetric view of the latch unit. FIGS. 39F and 39G are bottom and top views of the latch unit 3040.

As seen in FIGS. 39A to 39G, the spring mount 3080 has two spaced-apart mounting walls 3086 for mounting the second shaft 3082. The latch support 3050 has a first support end 3055 and a second support end 3056. The latch support 3050 has two spaced-apart supporting walls 3060 configured for mounting the first shaft 3054 between the first support end 3055 and the second support end 3056. Each of the supporting walls 3060 has a recess 3064 made thereon for forming the latch 3052 at the first support end 3055 of the latch support 3050. The recess 3064 on each of the supporting walls 3060 is dimensioned to engage with the striker 3022 (see FIG. 37A).

Figure 40A:
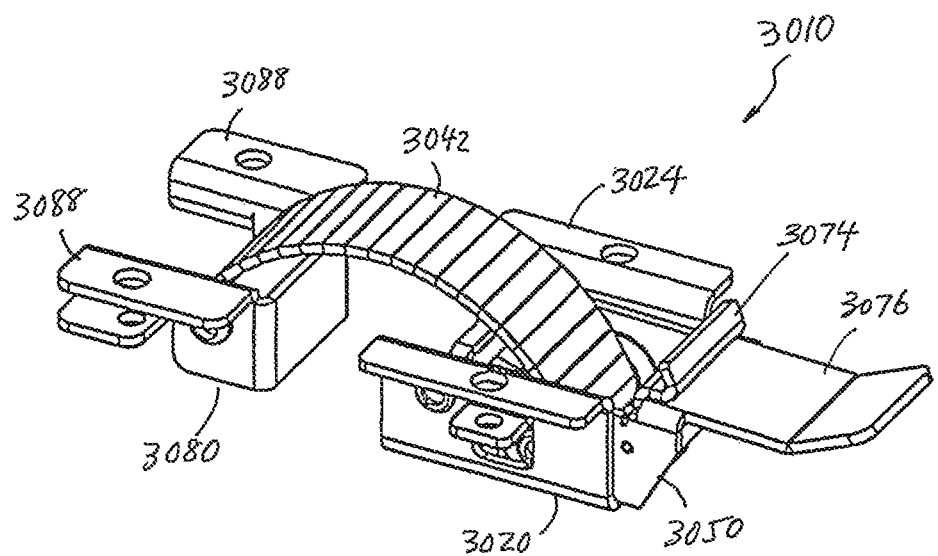
FIG. 40A is a trimetric view of the latching device when the latch support is engaged with the striker unit.

According to an embodiment of the present invention, the latch support 3050 has a pin 3066 mounted on the supporting walls 3060 near the second support end 3056. The pin 3056 is arranged for rotatably mounting a pivoting member 3070. One end of the pivoting member 3070 has a hook 3072 and the other end of the pivoting member 3070 has a lift 3074. In an embodiment of the present invention, a pin spring 3068 (see FIG. 39F) is mounted on the pin 3066 to urge the hook 3072 to move toward the first support end 3055. When the latch 3052 is caused to engage with the striker 3022 so as to establish an engagement between the latch support 3050 and the striker unit 3020 (see FIG. 40A), the hook 3072 of the pivoting member 3070 is arranged to engage with the catch 3038 (see FIG. 38B) on the connecting plate 3036 of the channel plate 3030. The pin spring 3068 is arranged to provide an urging force on the hook 3072 for securing the engagement between the latch support 3050 and the striker unit 3020. To release the latch support 3050 from the striker unit 3020, the lift 3074 can be used to rotate the pivoting member 3070 against the urging force of the pin spring 3068 so as to disengage the hook 3072 from the catch 3038. According to an embodiment of the present invention, the latch support 3050 has a lever 3076 fixedly attached to the supporting walls 3060 at the second support end 3056. The lever 3076 is arranged to assist the disengagement of the latch support 3050 from the striker unit 3020 while the lift 3074 is used to rotate the pivoting member 3070 against the urging force of the pin spring 3068.

According to one embodiment of the present invention, the spring mount 3080 has two mounting pads 3088 separately connected to the mounting walls 3086. Each of the mounting pads 3088 has a mounting hole 3099. The mounting pads 3088 are spaced from each other to provide a gap 3089 therebetween to allow the band spring 3042 to rotate about the second shaft 3082 within the gap 3089.

FIG. 39D is a cross sectional view of the latch unit 3040, showing how the first spring end 3043 of the band spring 3042 is mounted on the first shaft 3054 of the latch support 3050 and how the second spring end 3044 is mounted on the second shaft 3082 of the spring mount 3080. As seen in FIG. 39D, the pivoting member 3070 is pivotally mounted on the pin 3066 with the lift 3074 and hook 3072 located on different ends of the pivoting member 3070.

FIG. 39E is a different trimetric view of the latch unit 3040 and FIGS. 39F and 39G are bottom and top views of the latch unit as shown in FIG. 39E.

As seen in FIGS. 39E to 39G, the latch support 3050 has a pin spring 3068 mounted on the pin 3066 in relationship to the hook 3072 of the pivoting member 3070. According to an embodiment of the present invention, the latch support 3050 also has a connecting bridge 3078 connected between the supporting walls 3060 at the first support end 3055 to define an opening 3079 between the connecting bridge 3078 and the pivoting member 3070. The opening 3079 allows the band spring 3042 to move within the opening 3079 while the band spring 3042 is rotated about the first shaft 3054.

Figure 40B:
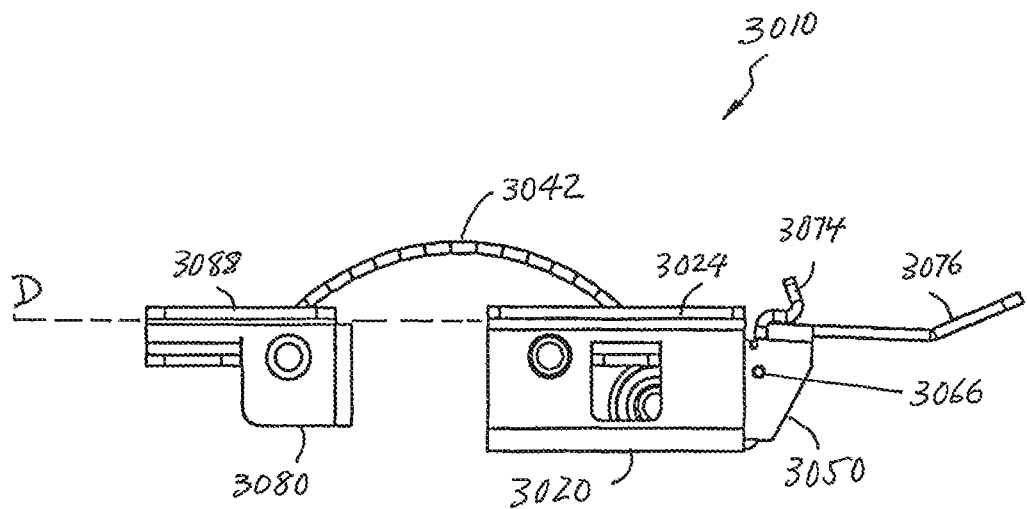
FIG. 40B is a side view of the latching device as shown in FIG. 40A.
Figure 40C:
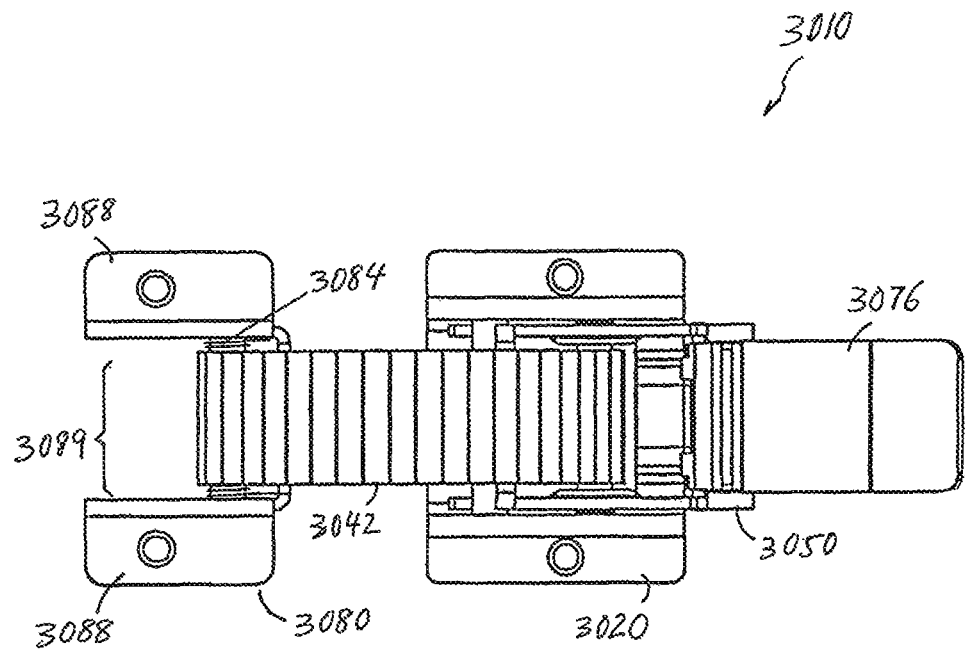
FIG. 40C is a top view of the latching device as shown in FIG. 40A.
Figure 40D:
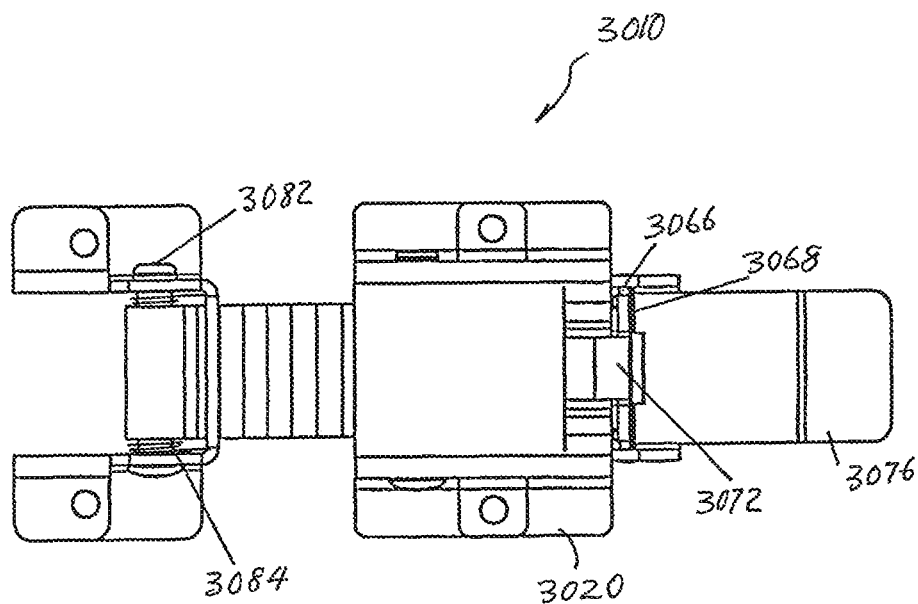
FIG. 40D is a bottom view of the latching device as shown in FIG. 40A.
Figure 40E:
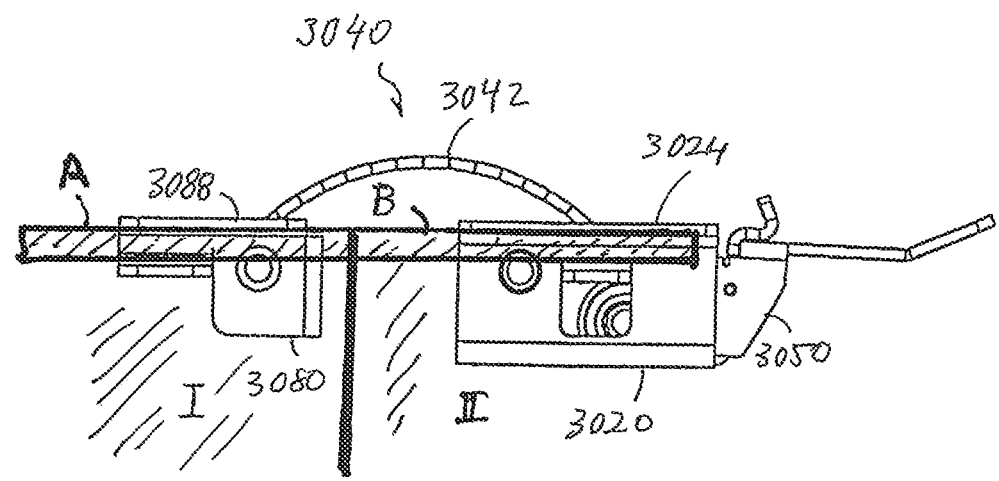
FIG. 40E shows how the spring mount of the latch unit and the striker unit are typically mounted.

FIGS. 40A to 40D are different views of the latching device 3010 when the latch support 3050 of the latch unit 3040 is engaged with the striker unit 3020 as if the striker unit 3020 and the spring mount 3080 are separately attached to two adjacent objects (see FIG. 40E). Preferably, the mounting pads 3088 of the spring mount 3080 and the mounting pads 3024 of the striker unit 3020 are coplanar as indicated by the dotted line D as shown in FIG. 40B. FIGS. 40C and 40D are top and bottom views of the engaged latching device 3010. As seen in FIGS. 40C and 40D, the spring mount 3080 also has a shaft spring 3084 mounted on the second shaft 3082. When the latch support 3050 is disengaged from the striker unit 3020, the shaft spring 3084 is arranged to urge the band spring 3042 to rotate about the second shaft 3082 away from the striker unit 3020.

FIG. 40E shows how the spring mount 3080 of the latch unit 3040 and the striker unit 3020 are typically mounted. As seen in FIG. 40E, the spring mount 3080 is embedded in object I with the mounting pads 3088 mounted on surface A of object I and the striker unit 3020 is embedded in object II with the mounting pads 3024 mounted on surface B of object II. It is understood that as the striker unit 3020 is mounted on surface B, the striker unit 3020 allows the insertion of the latch support 3050 between the channel walls 3034 as shown in FIG. 37A. While the latch 3052 is engaged with the striker 3022, the latch support 3050 is rotated about the striker 3022 until the hook 3072 of the latch support 3050 is engaged with the catch 3038 of the striker unit 3020 (see FIG. 38B).

Figure 41:
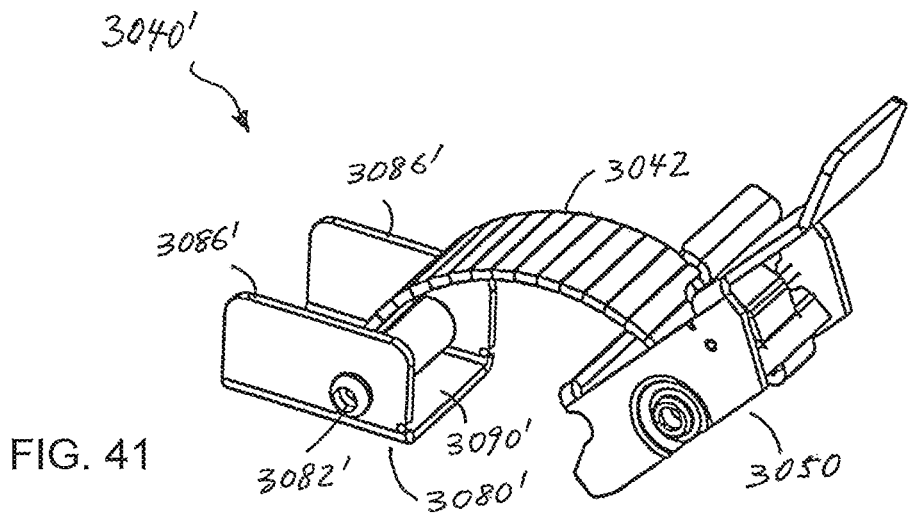
FIG. 41 is a trimetric view of the latch unit, according to another embodiment of the present invention.

FIG. 41 is a trimetric view of the latch unit 3040', according to another embodiment of the present invention. As seen in FIG. 41, the latch unit 3040' has a different spring mount 3080'. The spring mount 3080' has a connecting pad 3090' fixedly attached two spaced-apart mounting walls 3086' that have a second shaft 3082' for rotatably mounting the second spring end 3044 of the band spring 3042. The connecting pad 3090' has one or more mounting holes (not shown) for mounting the spring mount 3080' on a surface.

Figure 42C:
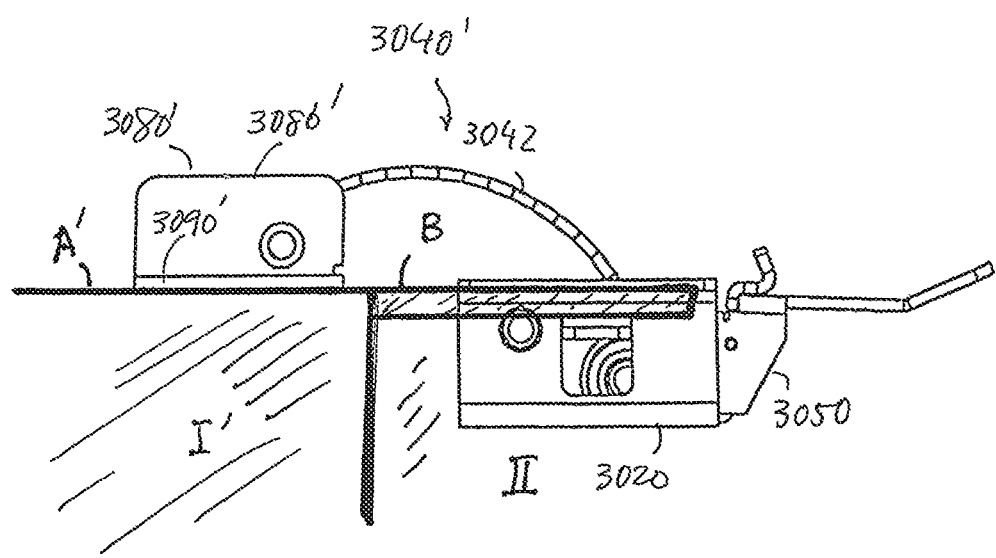
FIG. 42C shows how the spring mount of the latch unit of FIG. 42A and the striker unit are typically mounted.
Figure 42A:
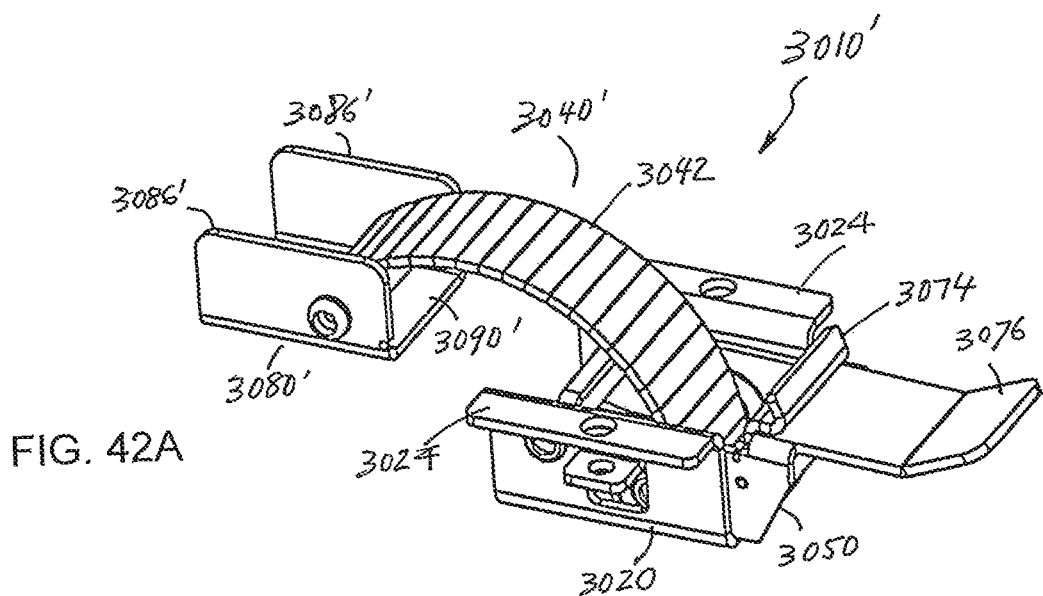
FIG. 42A is a trimetric view of the latching device when the latch support of the latch unit as shown in FIG. 41 is engaged with the striker unit.
Figure 42B:
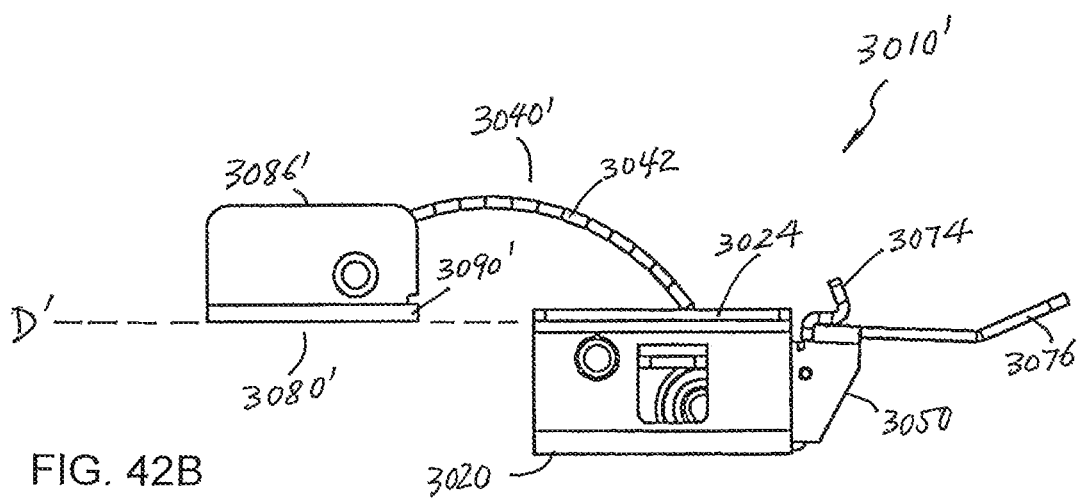
FIG. 42B is a side view of the latching device as shown in FIG. 42A.

FIG. 42A is a trimetric view of the latching device 3010' when the latch support 3050 of the latch unit 3040' is engaged with the striker unit 3020. FIG. 42B is a side view of the latching device 3010'. Preferably, the connecting pad 3090' of the spring mount 3080' and the mounting pads 3024 of the striker unit 3020 are coplanar as indicated by the dotted line D'.

FIG. 42C shows how the spring mount 3080' of the latch unit 3040' and the striker unit 3020 are typically mounted. As seen in FIG. 42C, the spring mount 3080' is mounted on the surface A' of object I' and the striker unit 3020 is embedded in object II with the mounting pads 3024 mounted on surface B of object II.

Referring back to the right and left side views of FIGS. 22 and 23, intermediate portions of the six sections are labelled on the bottom of each side view with reference numerals one through six, with the even intermediate sections 2, 4, and 6 labeled as such in the right side view of FIG. 22 and the odd intermediate sections 1, 3, and 5 labeled as such in the left side view of FIG. 23. This is similar to the description of the body sections of FIG. 3. Thus, in a way also similar to the description used for FIG. 3, each of the six body sections has two opposing end sections marked with reference numerals.

In FIG. 23, the first body section 2101 is shown having an outer end section $2301_1$ and an inner end section $2301_2$. A first inner end $2202_1$ of the second section 2102, as shown in FIG. 22, mates with the inner end section $2301_2$ of the first body section 2101. For instance, three latch units 3040 of the type shown in FIG. 40E may be used to join the two body sections 2101, 2102 together, with three striker units 3020 embedded in the first inner end $2202_1$ of body section 2102 and three spring mounts 3080 embedded in the inner end section $2301_2$ of the first body section 2101. The three latch units may be located symmetrically around the periphery of the joint or may be placed in positions dictated by available structural features and other design choices such as accessibility for the user.

Likewise, a second inner end $2202_2$ of the second section 2102, as shown in FIG. 22, mates with a first end section $2303_1$ of the third body section 2103 using several latch units. For instance, four latch units 3040' of the type shown in FIG. 40C may be used to join the two sections 2102, 2103 together, with four striker units 3020 embedded in the second inner end $2202_2$ of body section 2102 and four corresponding spring mounts 3080' surface mounted in the first inner end section $2303_1$ of the third body section 2103.

Likewise, a second inner end $2303_2$ of the third body section 2103, as shown in FIG. 23, mates with a first end section $2204_1$ of the fourth body section 2104 using several latch units. For instance, five latch units 3040 of the type shown in FIG. 40E may be used to join the two sections 2103, 2104 together, with five striker units 3020 embedded in the first inner end $2204_1$ of body section 2104 and five corresponding spring mounts 3080 embedded in the second inner end section $2303_2$ of the third body section 2103.

Likewise, a second inner end $2204_2$ of the second section 2104, as shown in FIG. 22, mates with a first end section $2305_1$ of the fifth body section 2105 using several latch units. For instance, four latch units 3040' of the type shown in FIG. 40C may be used to join the two sections 2104, 2105 together, with four striker units 3020 embedded in the first inner end $2305_1$ of body section 2105 and four corresponding spring mounts 3080' surface mounted in the second inner end section $2204_2$ of the fourth body section 2104.

Finally, a second inner end $2305_2$ of the fifth body section 2105, as shown in FIG. 23, mates with a first end section $2206_1$ of the sixth body section 2106 using several latch units. For instance, three latch units 3040 of the type shown in FIG. 40E may be used to join the two sections 2105, 2106 together, with three striker units 3020 embedded in the second inner end $2305_2$ of body section 2105 and three corresponding spring mounts 3080 embedded in the first inner end section $2206_1$ of the sixth body section 2106.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A latching device comprising:
   a latch unit comprising a latch support, a spring mount and a band spring, the band spring having a first spring end and a second spring end, wherein
   the latch support comprises a latch and a first shaft positioned in relationship to the latch, the first shaft configured for rotatably mounting the first spring end of the band spring, and
   the spring mount comprises a second shaft configured for rotatably mounting the second spring end of the band spring, wherein the latch support further comprises a first support end, a second support end, and two spaced-apart supporting walls configured for mounting the first shaft between the first support end and the second support end, and wherein each of the supporting walls comprises a recess made thereon for forming the latch at the first support end.

2. The latching device according to claim 1, further comprising:
a striker unit separable from the latch unit, the striker unit comprising a striker, wherein the latch in the latch support is dimensioned to receive the striker, and wherein the striker unit further comprises a channel plate having a first channel end and a second channel end, the channel plate comprising two spaced-apart channel walls and a connecting plate connecting the channel walls, the channel walls configured for mounting the striker near the first channel end, the channel plate dimensioned to receive the latch of the latch support between the channel walls.

3. The latching device according to claim 2, wherein the connecting plate comprises a catch formed thereon near the second channel end, and wherein the latch support further comprises:
a pin mounted between the supporting walls near the second support end;
a pin spring, and
a pivoting member rotatably mounted on the pin, the pivoting member comprising a hook on one end and a lift on another end of the pivoting member, wherein when the latch is caused to engage with the striker so as to establish an engagement between the latch support and the striker unit, the hook on the pivoting member is arranged to engage with the catch on the connecting plate of the channel member, and the pin spring is configured to provide an urging force on the hook for securing the engagement between the latch support and the striker unit.

4. The latching device according to claim 3, wherein when the pivoting member is caused to rotate against the urging force of the pin spring so as to disengage the hook from the catch, the latch support can be disengaged from the striker unit.

5. The latching device according to claim 4, wherein the latch support further comprises a lever located at the second support end, the lever is arranged to assist disengagement of the latch support from the striker unit while the lift is caused to rotate the pivoting member against the urging force of the pin spring.

6. The latching device according to claim 5, wherein the latch support further comprises a connecting bridge between the supporting walls at the first support end, providing an opening between the connecting bridge and the pivoting member to allow the band spring to move within the opening.

7. The latching device according to claim 5, wherein the spring mount further comprises one or more mounting holes arranged for mounting the spring mount on a first surface, and the striker unit further comprises one or more mounting holes arranged for mounting the striker unit on a second surface.

8. The latching device according to claim 7, the spring mount further comprises a shaft spring configured to urge the band spring to rotate away from the striker unit when the latch support is disengaged from the striker unit.

9. The latching device according to claim 8, wherein the spring mount further comprises two spaced-apart mounting walls and two mounting pads, the mounting walls arranged for mounting the second shaft, each of the mounting pads connected to one of the mounting walls, the mounting pads having the mounting holes for mounting the spring mount on the first surface, wherein the mounting pads are spaced from each other to provide a gap to allow the band spring to rotate about the second shaft within the gap.

10. The latching device according to claim 8, wherein the spring mount further comprises two spaced-apart mount walls arranged for mounting the second shaft, and a connecting pad connecting the mounting walls, the connecting pad having the mounting holes for mounting the spring mount on the first surface.

11. The latching device according to claim 3, wherein when the latch is engaged with the striker, the latch unit can be rotated about the striker toward the channel plate on the second channel end until the hook on the pivoting member is engaged with the catch on the connecting plate of the channel member.

* * * * *